(12) United States Patent
Schiller et al.

(10) Patent No.: US 12,471,787 B2
(45) Date of Patent: Nov. 18, 2025

(54) IMPLANTABLE MEDICAL DEVICE WITH MECHANICAL STRESS SENSOR

(71) Applicant: CANARY MEDICAL SWITZERLAND AG, Baar (CH)

(72) Inventors: Peter J. Schiller, Shakopee, MN (US); Jeffrey M. Gross, Carlsbad, CA (US); Heidi Sharipov, San Diego, CA (US)

(73) Assignee: Canary Medical Switzerland AG, Baar (CH)

( * ) Notice: Subject to any disclaimer, the term of this patent is extended or adjusted under 35 U.S.C. 154(b) by 0 days.

(21) Appl. No.: 18/949,919

(22) Filed: Nov. 15, 2024

(65) Prior Publication Data
US 2025/0098964 A1    Mar. 27, 2025

Related U.S. Application Data

(63) Continuation of application No. PCT/US2024/048713, filed on Sep. 26, 2024.
(Continued)

(51) Int. Cl.
*A61B 5/00* (2006.01)
*A61B 5/0205* (2006.01)
(Continued)

(52) U.S. Cl.
CPC .......... *A61B 5/02055* (2013.01); *A61B 5/026* (2013.01); *A61B 5/28* (2021.01); *A61B 5/4809* (2013.01); *A61B 5/686* (2013.01); *A61B 5/01* (2013.01); *A61B 5/08* (2013.01); *A61B 5/11* (2013.01); *A61B 5/14503* (2013.01); *A61B 5/14539* (2013.01); *A61B 2560/0214* (2013.01); *A61B 2562/0204* (2013.01); *A61B 2562/0219* (2013.01); *A61B 2562/0247* (2013.01); *A61B 2562/0271* (2013.01); *A61B 2562/16* (2013.01)

(58) Field of Classification Search
CPC ....... A61B 5/02055; A61B 5/026; A61B 5/28; A61B 5/686; A61B 5/01; A61B 5/11; A61B 5/14503; A61B 2562/0247; A61B 2562/16
See application file for complete search history.

(56) References Cited

U.S. PATENT DOCUMENTS 5,363,848 A   11/1994  Spani et al.
5,496,361 A    3/1996  Moberg et al.
(Continued)

FOREIGN PATENT DOCUMENTS

WO    9711575 A1    3/1997
WO    2024148301 A1   7/2024

OTHER PUBLICATIONS

MEMnet, Material: Barium Titanate (BaTiO3), bulk, https://www.memsnet.org/material/bariumtitanatebatio3bulk/, viewed on Jun. 7, 2025 (Year: 1994).*
(Continued)

*Primary Examiner* — James M Kish
*Assistant Examiner* — James Moss

(57) ABSTRACT

Disclosed are devices, systems, and methods for in vivo monitoring of internal mechanical stress associated with physiological phenomena of an internal body structure, such as the heart, lungs and/or gastrointestinal tract, from within the host. The disclosed devices, systems, and methods include an in vivo mechanical stress sensor implantable in the host's body.

15 Claims, 31 Drawing Sheets

Related U.S. Application Data

(60) Provisional application No. 63/669,647, filed on Jul. 10, 2024, provisional application No. 63/643,322, filed on May 6, 2024, provisional application No. 63/552,582, filed on Feb. 12, 2024, provisional application No. 63/540,888, filed on Sep. 27, 2023.

(51) Int. Cl.
*A61B 5/026* (2006.01)
*A61B 5/28* (2021.01)
*A61B 5/01* (2006.01)
*A61B 5/08* (2006.01)
*A61B 5/11* (2006.01)
*A61B 5/145* (2006.01)

(56) References Cited

U.S. PATENT DOCUMENTS

| | | | |
|---|---|---|---|
| 6,409,675 B1 | 6/2002 | Turcott | |
| 6,432,050 B1 | 8/2002 | Porat et al. | |
| 6,522,926 B1 | 2/2003 | Kieval et al. | |
| 7,470,233 B2 | 12/2008 | Karamanoglu et al. | |
| 8,014,863 B2 | 9/2011 | Zhang et al. | |
| 8,506,495 B2 | 8/2013 | Mi et al. | |
| 2003/0074029 A1 | 4/2003 | Deno et al. | |
| 2008/0236297 A1 | 10/2008 | Fleet et al. | |
| 2008/0269627 A1 | 10/2008 | Cho et al. | |
| 2008/0269822 A1 | 10/2008 | Ljungstrom et al. | |
| 2010/0094147 A1 | 4/2010 | Inan et al. | |
| 2010/0317978 A1* | 12/2010 | Maile .................. | A61B 5/0031 600/300 |
| 2011/0004117 A1 | 1/2011 | Neville et al. | |
| 2011/0004124 A1 | 1/2011 | Lessar et al. | |
| 2011/0009760 A1 | 1/2011 | Zhang et al. | |
| 2013/0053711 A1 | 2/2013 | Kotlanka et al. | |
| 2013/0066169 A1 | 3/2013 | Rys et al. | |
| 2013/0197597 A1 | 8/2013 | Anderson et al. | |
| 2013/0289641 A1 | 10/2013 | Gustafsson et al. | |
| 2015/0126878 A1 | 5/2015 | An et al. | |
| 2016/0029952 A1 | 2/2016 | Hunter | |
| 2016/0038087 A1 | 2/2016 | Hunter | |
| 2016/0192878 A1 | 7/2016 | Hunter | |
| 2016/0310077 A1 | 10/2016 | Hunter et al. | |
| 2017/0181825 A1 | 6/2017 | Hunter | |
| 2017/0196499 A1 | 7/2017 | Hunter | |
| 2017/0196508 A1 | 7/2017 | Hunter | |
| 2017/0196509 A1 | 7/2017 | Hunter | |
| 2017/0202513 A1* | 7/2017 | Schmidt ............. | A61N 1/36167 |
| 2018/0035898 A1 | 2/2018 | Gunderson | |
| 2018/0035924 A1 | 2/2018 | Gunderson et al. | |
| 2018/0035956 A1 | 2/2018 | Gunderson et al. | |
| 2018/0064350 A1 | 3/2018 | Thakur et al. | |
| 2018/0168460 A1 | 6/2018 | Morris et al. | |
| 2018/0168461 A1 | 6/2018 | Morris et al. | |
| 2018/0168463 A1 | 6/2018 | Morris et al. | |
| 2019/0054304 A1* | 2/2019 | Maile .................. | A61N 1/3756 |
| 2019/0150771 A1 | 5/2019 | Jeong et al. | |
| 2019/0282173 A1 | 9/2019 | Starr et al. | |
| 2020/0037899 A1* | 2/2020 | Nakano .................... | G01L 9/08 |
| 2020/0178850 A1 | 6/2020 | Thakur et al. | |
| 2021/0059568 A1 | 3/2021 | Gunderson | |
| 2021/0085262 A1* | 3/2021 | Kramer ................ | A61B 5/0008 |
| 2021/0100513 A1* | 4/2021 | Bahmanyar .......... | A61B 5/0215 |
| 2021/0153751 A1 | 5/2021 | Gunderson et al. | |
| 2021/0228886 A1 | 7/2021 | Pronovici et al. | |
| 2022/0096845 A1 | 3/2022 | Deininger et al. | |
| 2022/0167922 A1 | 6/2022 | Gross et al. | |
| 2022/0192600 A1 | 6/2022 | Bang et al. | |
| 2022/0273223 A1 | 9/2022 | Dopierala et al. | |
| 2023/0114876 A1 | 4/2023 | Brincat et al. | |
| 2023/0200650 A1 | 6/2023 | Hunter et al. | |
| 2023/0201605 A1 | 6/2023 | Shute et al. | |
| 2023/0218260 A1 | 7/2023 | Squeri et al. | |
| 2023/0233159 A1 | 7/2023 | Shute et al. | |
| 2023/0293104 A1 | 9/2023 | Gross et al. | |

OTHER PUBLICATIONS

Solid Carbide Tools, Titanium Properties, https://web.archive.org/web/20220705231820/https://kyocera-sgstool.co.uk/titanium-resources/titanium-information-everything-you-need-to-know/titanium-properties/, Jul. 5, 2022, viewed on Jun. 7, 2025 (Year: 2022).*

International Search Report and Written Opinion for International Application No. PCT/US2024/010540, dated May 17, 2024, 15 pages.

Tang C., et al., "Mechanical Sensors for Cardiovascular Monitoring: From Battery-Powered to Self-Powered", Biosensors, Aug. 17, 2022, pp. 1-19.

Veletic M., et al., "Implants with Sensing Capabilities", Chemical Reviews, Aug. 18, 2022, pp. 1-112.

Yogev D., et al., "Current State of the Art and Future Directions for Implantable Sensors in Medical Technology: Clinical needs and Engineering Challenges", APL Bioengineering, Sep. 27, 2023, 30 Pages.

International Search Report and Written Opinion for International Application No. PCT/US2024/048713, mailed Jan. 16, 2025, 28 Pages.

* cited by examiner

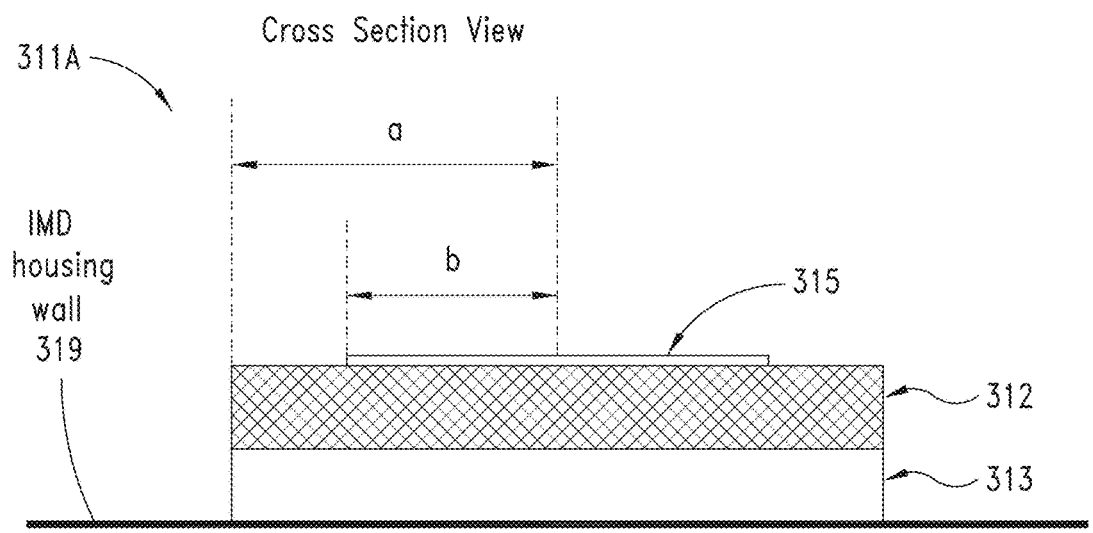
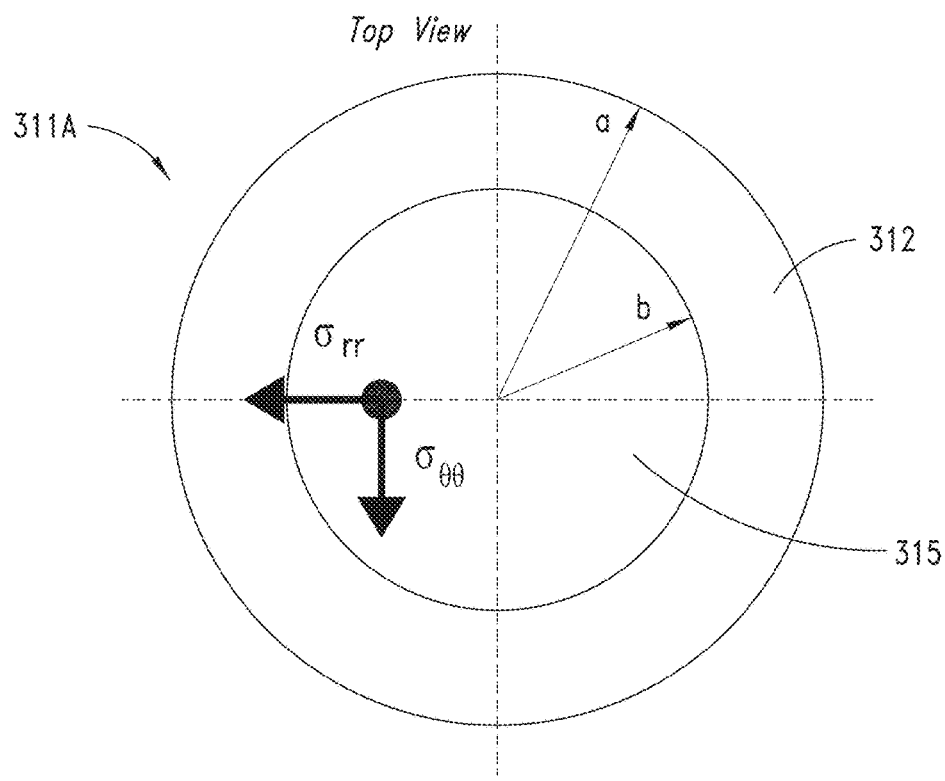
FIG. 3A

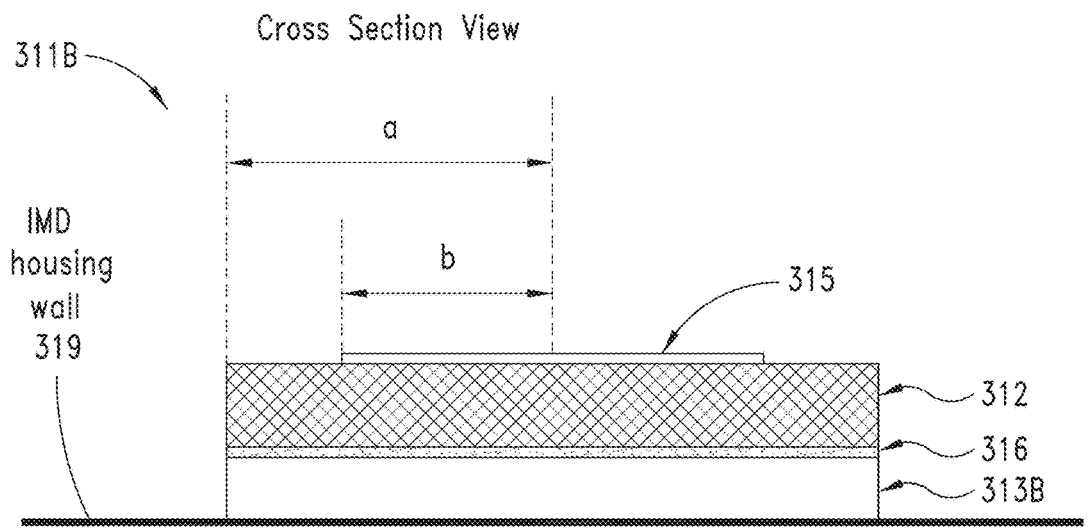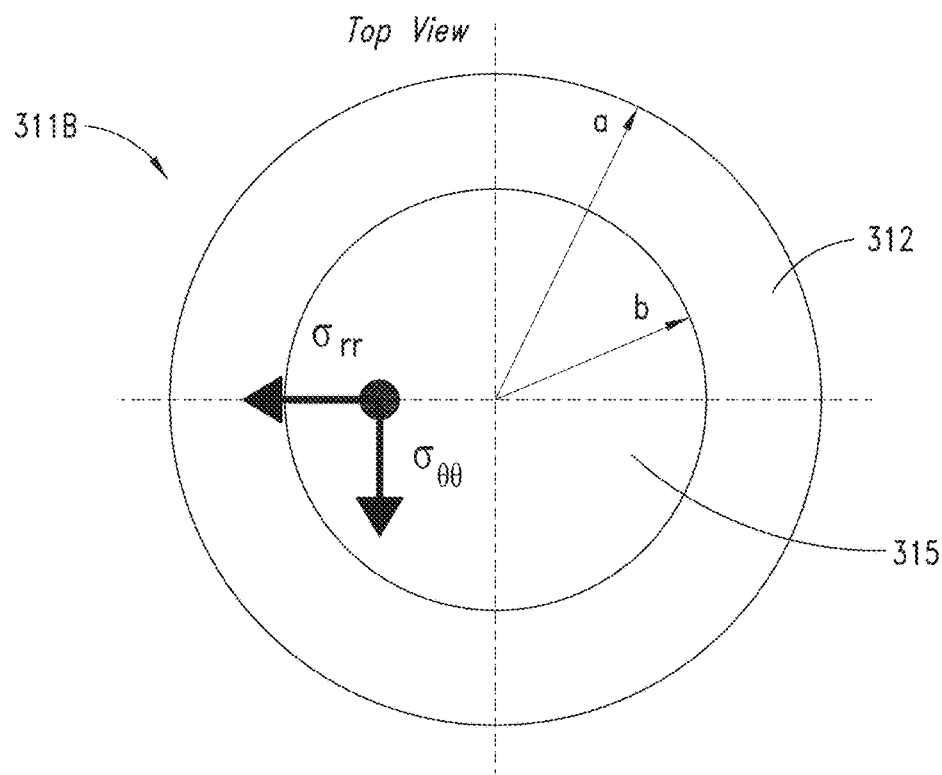
FIG. 3B

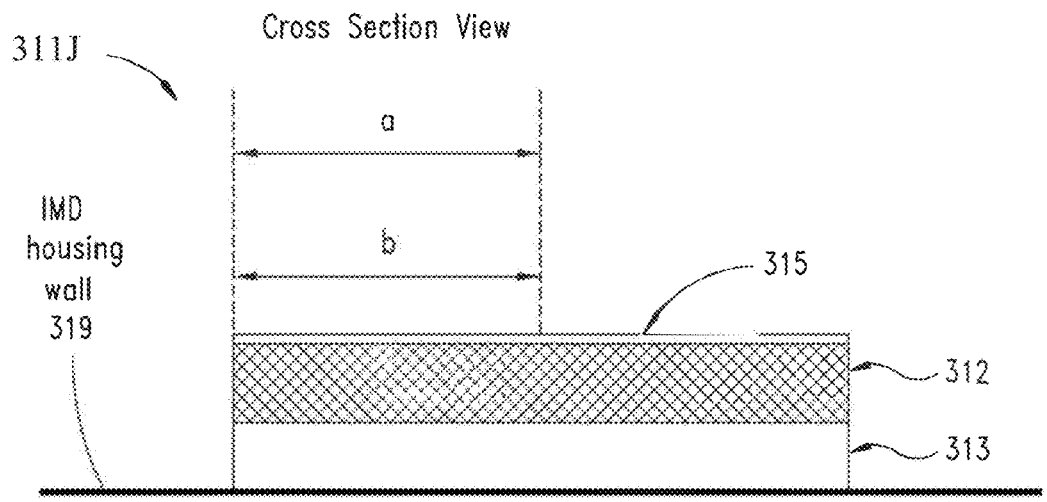
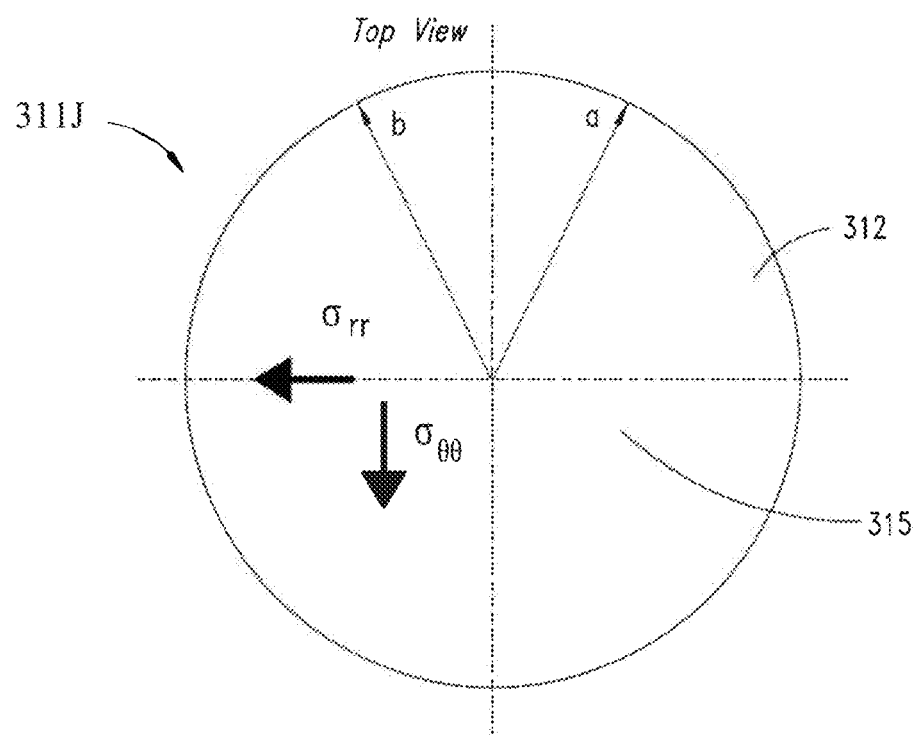
FIG. 3J

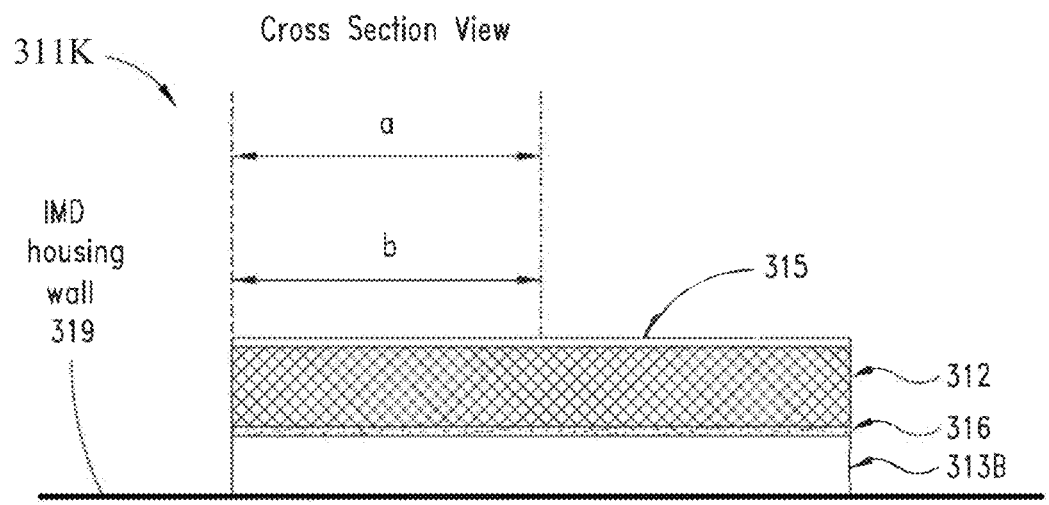
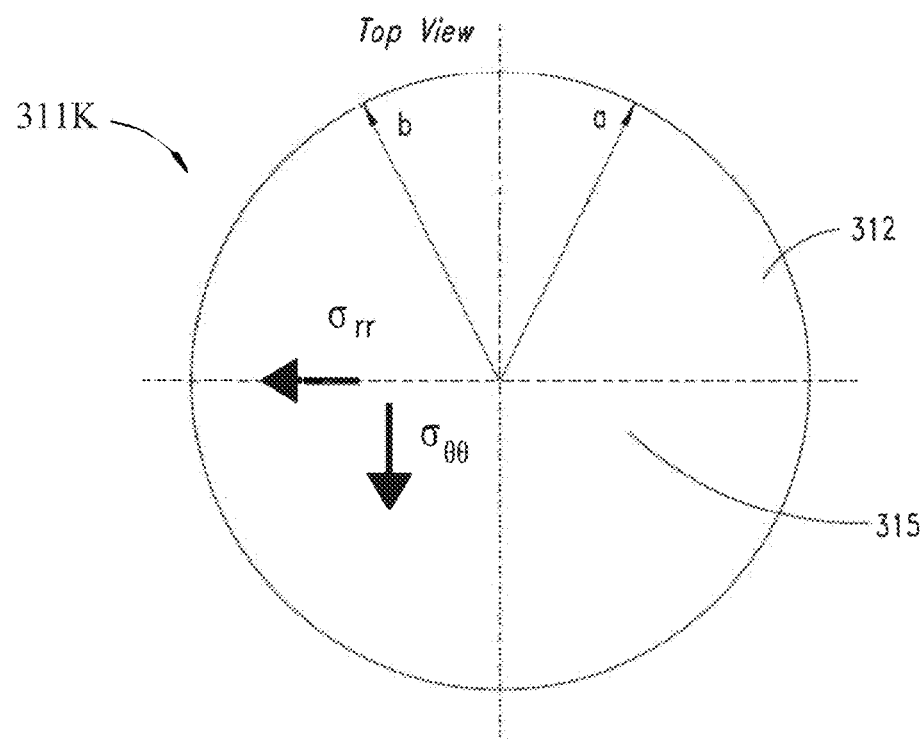
FIG. 3K

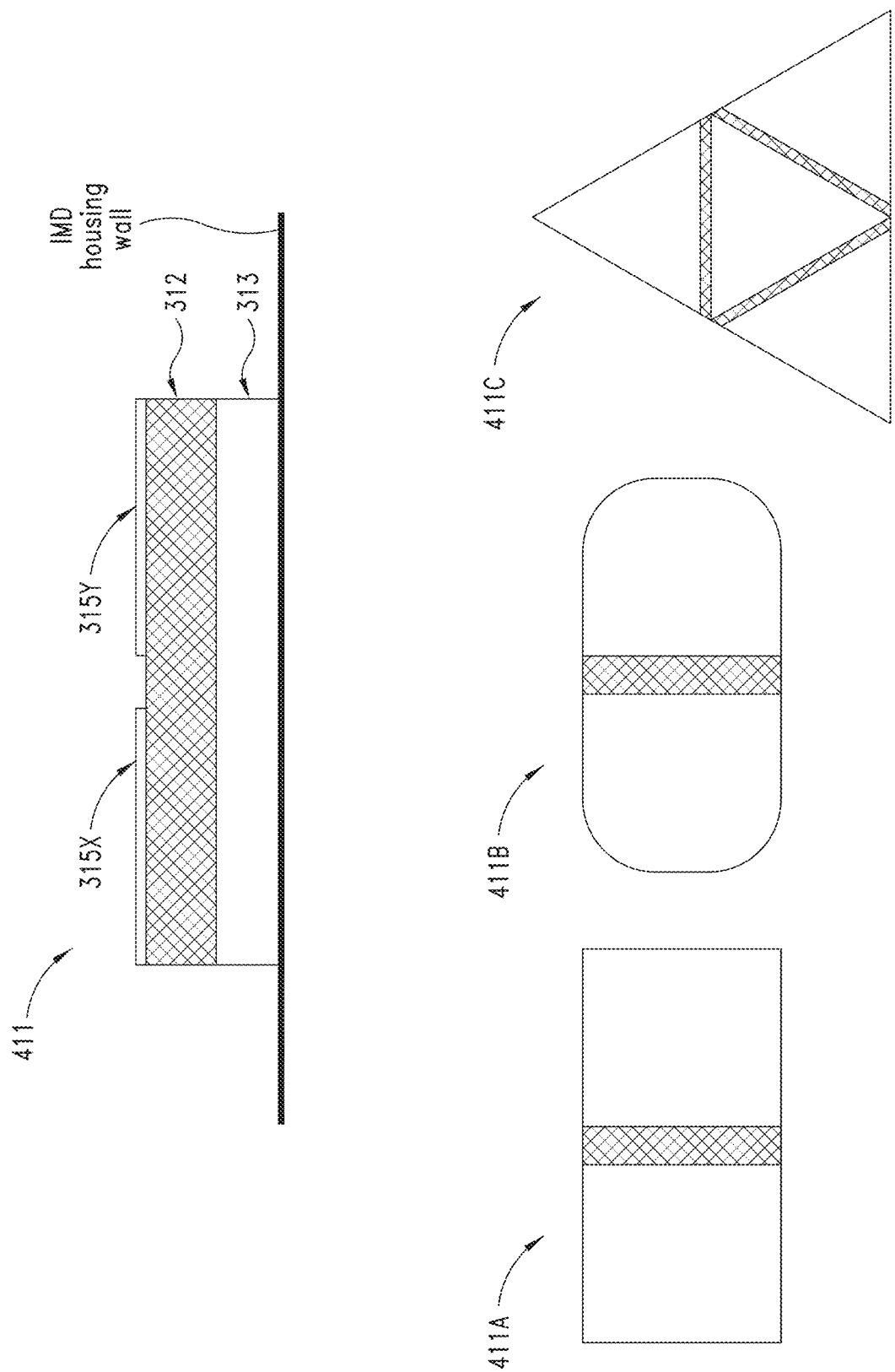

IMPLANTABLE MEDICAL DEVICE WITH MECHANICAL STRESS SENSOR

CROSS REFERENCE TO RELATED APPLICATIONS

All applications for which a foreign or domestic priority claim is identified in the Application Data Sheet as filed with the present application are hereby incorporated by reference.

TECHNICAL FIELD

This patent document relates generally to monitoring methods and devices including devices having a physical stress sensor such as implantable medical devices capable of detecting and distinguishing internal mechanical energy associated with physiological phenomena originating within the host.

BACKGROUND

According to the World Health Organization (WHO), cardiovascular diseases are among the leading causes of death globally, resulting in an estimated 17.9 million lives lost each year. In the United States, heart disease is the leading cause of death, with coronary artery disease (CAD) being the most pernicious class by causing decreased blood flow to the heart that often leads to a heart attack. CAD and other heart valve diseases, like mitral valve prolapse (MVP) and mitral valve regurgitation (MVR), are silent killers because persons typically do not know the existence of their underlying heart problems and therefore are not diagnosed until the person experiences signs or symptoms of a heart attack, heart failure, or an arrhythmia-which may be too late to survive or recover with a reasonable quality of life. Even now, a person must typically have a secondary medical condition, such as diabetes or obesity, or be identified with one or more significant risk factors, such as high blood pressure, high cholesterol, high alcohol use, or smoking, for the physician to initiate a round of testing and remote monitoring of the person's heart. This is because there is not an accessible, uncomplicated, and affordable device or technique to observe and track a person's heart function.

Presently, examination of heart function to potentially diagnose heart disease is limited to the clinical environment. Typically, a patient would undergo a variety of different tests, including analyte testing from blood samples; imaging such as a chest X-ray, CT-scan, or magnetic resonance imaging (MRI) of the heart; and physiological signal monitoring, such as an electrocardiogram (ECG or EKG), which are electrical signal recordings of the heart that can indicate heart rate and detect irregular heartbeats when monitored remotely (e.g., by a Holter monitor), or an echocardiogram, which is a noninvasive sound signal monitoring technique used to create images of the heart and blood in motion. Moreover, patients are only prescribed such tests after experiencing an acute or emergency medical treatment, such as cardiac arrest, stroke, severe dizziness or unconsciousness, or extreme chest pain.

To date, there have been some advancements in remote monitoring to begin turning the tide against heart disease. For instance, wearable heart rate monitors are becoming a ubiquitous option for tracking heart rate during exercise or daily activity, monitoring stress and movement levels, tracking sleep habits at night, and in some versions of these wearable devices, testing certain vital signs outside of the clinic, such as ECG to determine singular heart rhythm events, such as a healthy sinus rhythm or risky atrial fibrillation. While these devices are well suited to promote healthier active lifestyles that may contribute to preventing the onset of heart disease or mitigating minor-to-moderate heart disease in the long run, they are ill equipped to identify symptoms or hallmarks of the vast array of heart diseases and incapable of determining any underlying biological or physiological factors at the root of heart disease.

The challenge for clinicians is to catch heart disease early or manage and monitor diagnosed heart disease post-treatment. Yet, monitoring heart function relies on patient participation and compliance; and existing systems and methods are too time intensive, costly, and under-resourced to be effective.

There is a need for a new paradigm of sensors deployable in the body of a patient user and capable of monitoring, in vivo, mechanical energy associated with physiological phenomena, such as blood flow across a valve of the heart, to characterize overall heart function. There is also a need for adapting this new paradigm of sensors to be worn out-of-body or ex vivo to be capable of externally monitoring the internal mechanical energy associated with the physiological phenomena.

SUMMARY

In brief, in one aspect disclosed are devices, systems, and methods for in vivo monitoring of internal mechanical stress (also referred to as physical stress) associated with physiological phenomena of an internal body structure, such as the heart, lungs and/or gastrointestinal tract, from within the host. The disclosed devices, systems, and methods include an in vivo physical stress sensor implantable in the host's body. The in vivo physical stress sensor may be implanted in the host's body without causing damage to the host. For example, the in vivo stress sensor may be one or more of hermetically sealed, biocompatible and sterile.

In brief, in one aspect disclosed are devices, systems, and methods for monitoring of internal mechanical stress associated with physiological phenomena of an internal body structure, such as the heart, lungs and/or gastrointestinal tract, from outside the host. The disclosed non-implantable devices, systems, and methods include an in vivo or ex vivo physical stress sensor that may be associated with the outside of, e.g., worn by, the host's body. Discussion herein about in vivo stress sensors may also be wholly or partially applicable to an ex vivo stress sensor, where the ex vivo stress sensor does not necessarily need to be harmless when implanted in the host's body, e.g., it may not be sterile, or it may not be biocompatible with the host's internal body structures, or it may be larger than is practical for an implantable device with an in vivo stress sensor, or it may not be hermetically sealed.

In some implementations of the disclosed in vivo physical stress sensor technology, mechanical energy associated with a physiological phenomenon or phenomena, such as mechanical waves, is involuntarily generated by an anatomical structure or structures of the host that emanate internally within the host's body and are detectable by the in vivo physical stress sensor as an applied mechanical force or moment that transduces the mechanical stress into an electrical signal corresponding to one or more parameters of the mechanical energy, which are analyzed to determine information about the physiological phenomenon or phenomena that occurred in the host.

For example, the source of the mechanical wave may be associated with movement of tissue within the host. Also, for example, the source of the mechanical wave may be associated with the movement of fluid within the host. Also, for example, the source of the mechanical wave may be associated with the movement of liquid within the host. Also, for example, the source of the mechanical wave may be associated with the movement of gas within the host. In some implementations, the source of the mechanical wave is an organ. In some implementations, the organ can include the heart, lungs and/or gastrointestinal tract of the patient. In some implementations, the organ can include the small and/or large intestines, stomach, or other gastrointestinal organ of the host. In some implementations, for example, mechanical energy originating within the body are generated by pressure changes, blood and air flow, and the mechanical motion of organs and tissues. Examples of mechanical waves detectable by the in vivo physical stress sensor of the present technology can be turbulent flow of fluids, such as air flow in/out of the lungs or blood flow in structures of the heart or the vasculature, or the impulses from motion/movement of the heart structures (e.g., valves).

In some embodiments in accordance with the present technology, the disclosed implantable in vivo physical stress sensor technology provides an implantable medical device (IMD) which can be used to characterize mechanical waves generated by the host, e.g., the frequency, intensity, duration, number, and/or quality of a mechanical wave. In some embodiments in accordance with the present technology, the disclosed implantable in vivo physical stress sensor technology provides a method that includes measuring internal mechanical energy as stress, via a transducing element, to characterize a physiological phenomenon, and using the measured stress data to diagnose and/or detect and/or quantify a health and/or disease state of the host, e.g., the cardiac health of the host including information about the host's heart disease state, and/or the respiratory health of the host. Thus, the disclosed methods may include monitoring mechanical energy from cardiac function, e.g., heart health or disease, for some embodiments, while in the same or other embodiments, the disclosed methods monitoring mechanical energy from pulmonary function, e.g., respiration, for some embodiments.

In some implementations of the disclosed implantable in vivo physical stress sensor technology, an inertial measurement unit (IMU), capable of monitoring movement parameters, is included in an implantable sensor for detecting, monitoring, and/or quantifying heart disease of a host, such as a valvular disease selected from stenosis, incontinence, and myxomatous, where the valvular disease is associated with a valve selected from tricuspid, pulmonary, pulmonic, mitral and aortic, e.g., the medical condition may be myxomatous mitral valve disease, congestive heart failure, atrial fibrillation; and coronary artery disease, as examples. In some implementations of the disclosed implantable in vivo and/or ex vivo physical stress sensor technology, an IMU, capable of monitoring movement parameters, is included in an IMD for detecting, monitoring, and/or quantifying respiratory conditions of the host, including but not limited to pulmonary disease, chronic obstructive pulmonary disease (COPD, a condition involving constriction of the airways and difficulty or discomfort in breathing), sleep apnea, emphysema, pulmonary embolism (PE), and asthma. These are examples of respiratory quality that may be evaluated by way of the devices and methods of the present technology.

In some embodiments in accordance with the present technology, an implantable medical device includes an in vivo mechanical stress sensor. In some implementations, for example, the in vivo mechanical sensor is configured to detect an internal mechanical energy signal associated with a physiological phenomenon of an internal body structure from within a host in which the implantable medical device is deployed. In some embodiments, for example, the in vivo mechanical stress sensor includes a hermetically sealed housing, and a transducer element configured to receive the internal mechanical energy signal that emanates within the host from the internal body structure such that the transducer element converts the internal mechanical energy signal to an electrical signal indicative of a physiological function by the internal body structure, wherein the transducer element is enclosed in the hermetically sealed housing. In some embodiments the mechanical stress sensor is sterile in order to facilitate its deployment in a patient. In some embodiments the mechanical stress sensor is biocompatible in order to facilitate its use in the patient. In some embodiments the mechanical stress sensor is hermetically sealed in order to facilitate its use in the patient.

In brief, in one aspect, disclosed are devices and systems, for example an animal monitoring system comprising: at least one sensor device configured to be associated with an animal, the sensor device including: one or more sensors configured to detect and/or measure one or more biomarkers of the animal, and an electronics unit in electrical communication with the one or more sensors and configured to process signals from the one or more sensors and transmit data corresponding to the processed signals; and a receiver device configured to receive the data transmitted by the sensing unit and to process the received data and output a representation of the processed data. Also, for example, a sensor device configured to be associated with an animal is disclosed, the sensor device including: an apparatus configured to be attached to the animal; and one or more sensors integrated with the apparatus and configured to detect and/or measure one or more biomarkers of the animal. Optionally, the sensor device may further comprise an electronics unit in electrical communication with the one or more sensors and configured to process signals from the one or more sensors and transmit data corresponding to the processed signals.

The above-mentioned and additional features of the present technology and the manner of obtaining them will become apparent, and the disclosed technology may be best understood by reference to the following more detailed description. It is noted that all references disclosed herein are hereby incorporated by reference in their entirety as if each was incorporated individually.

This Summary has been provided to introduce certain concepts in a simplified form that are further described in detail below in the Detailed Description. Except where otherwise expressly stated, this Summary is not intended to identify key or essential features of the claimed subject matter, nor is it intended to limit the scope of the claimed subject matter.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments. Other features, objects and advantages will be apparent from the description, the drawings, and the claims.

BRIEF DESCRIPTION OF THE DRAWINGS

Many aspects of the present disclosure can be better understood with reference to the following drawings. The features in the drawings are not necessarily to scale, fully shown, or depicted in the same manner as would be physically constructed. Instead, emphasis is placed on clearly illustrating the principles of the present disclosure. The drawings should not be taken to limit the disclosure to the specific embodiments depicted but are for explanation and understanding only.

FIGS. 3A, 3B, 3C, 3D, 3E, 3F, 3G, 3J, and 3K show diagrams depicting example embodiments of a unimorph piezoelectric sensor device, in accordance with the present technology.

FIG. 4 shows diagrams depicting example geometries of some example embodiments of a unimorph piezoelectric sensor device, in accordance with the present technology.

DETAILED DESCRIPTION

Figure 1A:
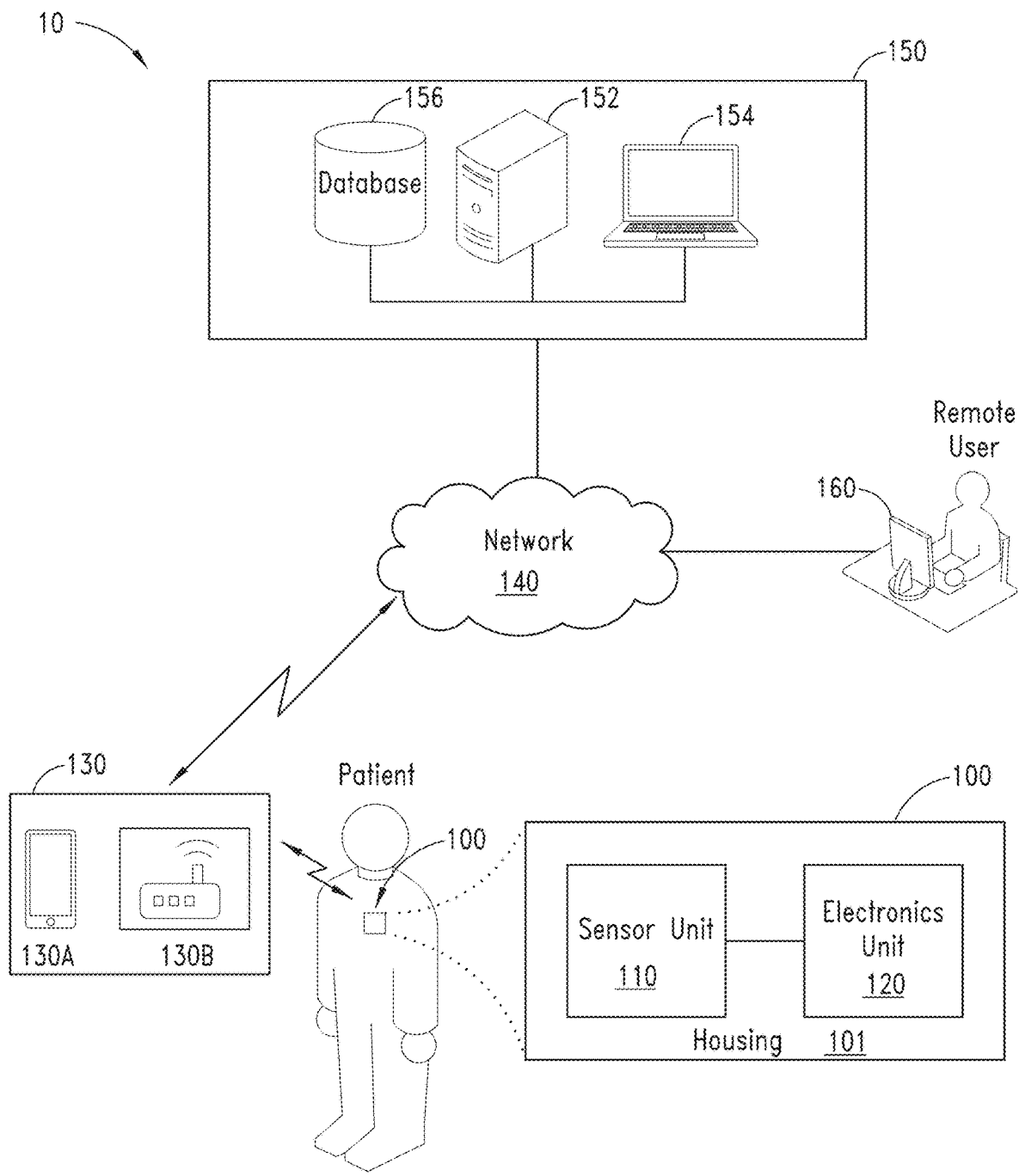
FIG. 1A shows a diagram illustrating an example embodiment of a system for monitoring, analyzing, and reporting events associated with the cardiovascular and/or pulmonary health of a patient with an implantable medical device (IMD) including a physical stress sensor device, in accordance with the present technology.

The present technology provides an implantable medical device (IMD) and system for monitoring and collecting data from the IMD implanted into a host for assessment of clinical condition, also referred to herein as a subject or a patient. The IMD of the present technology may be surgically removed from host. In some embodiments, for example, an IMD includes an in vivo physical stress sensor that can detect and measure mechanical energy generated by the host. For example, the disclosed devices, systems, and methods can be configured to monitor internal mechanical stress (referred to as physical stress) associated with physiological phenomena of an internal body structure, including but not limited to the heart, lungs and/or gastrointestinal tract, from within the host. The disclosed devices, systems, and methods provide an in vivo physical stress sensor implantable in the host's body, where the physical stress sensor may be sterile and/or may be biocompatible. Herein, the terms "host," "patient," "user" and "patient user," and "subject" may be used interchangeably.

As used herein, mechanical energy can refer to mechanical waves in gases, liquids, and solids, including vibration, sound, ultrasound, and infrasound. The present technology provides IMDs that may detect and measure mechanical waves that travel through the gases, liquids and/or solids that make up the internal anatomy of the host. In some embodiments, the IMD includes one or more auxiliary sensors to detect and measure motion and/or position or orientation of the patient, electrophysiological signals associated with one or more anatomic structures of the host, such as the heart, and/or an analyte or multiple analytes in an in vivo fluid of the patient.

The mechanical energy detected by an IMD in accordance with the present technology may propagate with a frequency in a range of, for example, 0.1 Hz to 50 kHz, or a portion thereof. As such, the disclosed in vivo physical stress sensor may be responsive to a variety of physiological phenomena associated with the host's health and/or disease from mechanical energy generated by the host, e.g., the beating of a heart, the flow of blood moving through a blood vessel or organ, or the inhale and exhale of respiration.

The disclosed implantable medical devices, systems, and methods of the present technology can be implemented for monitoring the state of a patient's cardiovascular and/or pulmonary disease for management of the patient's treatment and care of the disease, which includes heart failure, a valvular disease, a coronary disease, thoracic aortic aneurysm, chronic obstructive pulmonary disease (COPD), sleep apnea, asthma, and/or other acute or chronic disease or conditions. In particular, the disclosed implantable medical devices, systems, and methods of the present technology can be implemented to assist the patient's HCP(s) in the medication management for the patient's disease or condition.

For example, in some embodiments, an exemplary IMD can monitor cardiovascular function using an in vivo physical stress sensor of the IMD for continuously detecting abnormal blood flow associated with aortic stenosis (AS) and mitral valve regurgitation (MVR) for valvular disease drug management. Also, as an example, some embodiments of the exemplary IMD can be implemented to monitor both cardiovascular and pulmonary function using the IMD's in vivo physical stress sensor for continuously detecting mechanical energy associated with abnormal blood flow, as in AS and/or MVR, and for continuously detecting other mechanical waves generated by heart valve in conjunction with or exclusive from mechanical energy associated with breathing and other pulmonary function, including but not limited to edema in the lungs, asthma, COPD, or other pulmonary conditions, for cardiovascular and pulmonary disease drug management.

Among the greatest challenges for patients and their HCPs in managing their cardiovascular and/or pulmonary disease conditions is patient compliance. Patients must comply with two facets of their own health care: (1) regularly (e.g., multiple times daily) take their prescribed medications precisely when and how they are prescribed, and (2) regularly (e.g., one or more times daily) measure and record multiple physiological measurements, including blood pressure (BP), body weight (BW), and blood oxygen level (PulseOx). Current heart monitoring systems are a compilation of external sensors, such as a blood pressure cuff (digital), body weight scale (digital), and pulse oximeter (digital), which require discrete and separate measurements of the patient's BP, BW, and PulseOx, respectively. Yet, when patients comply, the system can gauge risk levels for whether the patient is successfully managing his/her heart disease or trending toward DHF. For instance, if a patient is developing a lot of fluid in his/her lungs and the patient's heart rate is increasing, then the patient's BW increases and is measurable by the body weight scale and the patient's heart rate increase and is measurable by the blood pressure cuff—which can collectively indicate the patient may be decompensating and in need of immediate medical attention (e.g., trip to emergency room where an HCP can adjust the concentrations of the ACE inhibitors, Beta blockers, and diuretics for avoiding DHF).

While studies have shown patients generally can be relied upon to regularly take their medications as prescribed, most patients struggle to keep with the strict protocols to measure and record their BP, BW, and PulseOx. The conventional approach for treating cardiovascular and pulmonary disease is severely flawed because of the reliance on patient compliance. The disclosed implantable medical devices, systems, and methods of the present technology can be implemented to continuously, passively, and autonomously (i.e., no patient interaction) monitor, from within the patient's body, a multitude of physiological markers associated with cardiovascular and/or pulmonary health and disease, thereby taking patient compliance out of the equation for the physiological monitoring component of the patient's treatment and care.

The disclosed implantable medical devices, systems, and methods of the present technology can continuously, autonomously, and passively monitor one or more clinically useful host properties including heart rate, cardiac valvular function, respiratory rate, respiratory quality, myocardial function, and degree of coronary artery disease, each based on information obtained from the IMD's in vivo physical stress sensor. The device of the present technology having a physical stress sensor may be configured in conjunction with one or more auxiliary sensors, such as an ultrasonic transducer array, a motion sensor such as an inertial measurement unit (IMU), an electrophysiological sensor such as an ECG sensor, or other sensor, as disclosed herein. For example, in some implementations of the IMD using the in vivo physical stress sensor and an ECG sensor as a temporal qualifier, i.e., a timing marker for events during the cardiac cycle, the IMD can interrogate for particular mechanical energy phenomena to distinguish between healthy and unhealthy markers of cardiac function. For example, in some embodiments of the IMD using the in vivo physical stress sensor and the ultrasonic transducer array, the ultrasonic transducer array can be configured to detect vascular blood flow, vessel wall thickness, and/or vessel diameter, e.g., either at a reference point in the cardiac cycle or as a function of time during the cardiac cycle. For example, vascular refers to both arterial and venous vessels, in non-limiting examples. Such implementation of the IMD the in vivo physical stress sensor and the ultrasonic transducer array can obtain both static measurements (e.g., any point in the cardiac cycle) and dynamic measurements (e.g., measurements during the cardiac cycle as a function of time).

The in vivo physical stress and auxiliary sensors of an IMD of the present technology are not blood-contacting, i.e., the sensors are engineered to detect physiological phenomena, particularly including those associated with blood flow, without being positioned inside blood vessels. For example, once the IMD, having the in vivo physical stress sensor and certain auxiliary sensors (e.g., such as the ECG and IMU), is implanted proximate the patient's heart, the IMD can monitor multiple disease states for each of the four valves of the heart, e.g., (1) stenosis (narrowing of the valve in a large blood vessel branching off or into the heart, which typically is caused due to calcification); (2) regurgitation (backwards flow of blood through due to a valve defect); and (3) myxomatous, a combination of stenosis and regurgitation (degeneration of the cardiac valves). The continuous, autonomous, and passive in vivo monitoring capability by the disclosed embodiments of the IMD of the present technology is important for the advancement of cardiovascular healthcare because none of these disease states are easy to observe presently due to the fact that it is the change over time in these disease states that allows for their diagnosis, and conventional diagnostic systems, devices, and techniques are incapable of or severely limited to accurately, reliably, and conveniently track the physiological markers over such time durations to effectively and optimally enable HCPs to make proper diagnoses. In addition, the IMD of the present technology can utilize its IMU sensor(s) to controllably collect and distinguish data at both a resting state and a state of activity which can simulate a stress test, thereby increasing the IMD's capability to assess patient disease conditions. In such implementations, the disclosed embodiments of the IMD of the present technology are capable of inconspicuously characterizing cardiovascular and/or pulmonary function in multiple states and situations of the patient's condition—without reliance on patient compliance.

In some implementations of the IMD of the present technology, for example, the IMD can operate like an internal stethoscope for the HCP that is continuously measuring patient respiration. The IMD may, for example, measure or monitor the host's respiration rate. Respiration rate, which is also known as respiratory rate or breathing rate or breathing frequency, refers to the rate at which breathing occurs, and is usually measured in breaths per minute. The IMD may, for example, measure or monitor or otherwise provide data that may be used to characterize the host's respiration quality. Healthy quality breathing is sometimes referred to as unlabored respiration, while gasping and wheezing are examples of labored respiration. Identifying the quality of a host's breathing (respiration quality) may be used to characterize a disease state of the host, for example, to identify and characterize one or more of congestive heart failure (CHF), pneumonia, COPD, asthma, etc. These signatures and the graduations of these signatures as a function of disease severity have been characterized with external auscultation. The devices and methods of the present technology provide improved signal to noise ratio for respiration-related signals since those signals do not have to pass through a skin/air interface such as occurs when respiration-related signals are obtained by an external digital stethoscope. The devices and methods of the present technology may be used to monitor pulmonary conditions, such as asthma or COPD, and may also pick up mitral valve regurgitation and heart failure because the breathing acoustics are changed when there is fluid in the lungs, and MVR and heart failure can cause such fluid accumulation. Thus, the disclosed embodiments of the IMD of the present technology can supplement or replace external digital stethoscopes, which suffer from poor fidelity and reliability (poor compliance) due to over 90% signal loss from transmission of the acoustic signals from the tissues of the body through air to be transduced by the external microphone of the digital stethoscope.

In some embodiments, for example, an IMD in accordance with the present technology includes a stress-mediated sensor operable to measure mechanical force applied to a transducer element that causes physical stress within the transducer material. In some embodiments, the IMD includes a stress-mediated microelectromechanical sensor (MEMS) device to transduce mechanical waves that apply force on the MEMS device into electrical signals. Some examples of a MEMS stress-mediated sensor can include a piezoelectric stress sensor, and in some embodiments, for example, the piezoelectric stress sensor includes a unimorph piezoelectric sensor device.

These and other example embodiments are discussed in further detail below.

EXAMPLE EMBODIMENTS

FIG. 1A shows a diagram illustrating an example embodiment of a sensor system 10 for monitoring, analyzing, and reporting events associated with the physical health condition of a user, e.g., the cardiovascular and/or pulmonary health of a user (also referred to as a patient or host) based on an implantable medical device (IMD) 100, including an in vivo physical stress sensor, in accordance with the present technology. The IMD 100, which includes the in vivo physical stress sensor, may also include one or more additional sensors, including but not limited to electrophysiological sensor(s), temperature sensor(s), position sensor(s), rate sensor(s), acceleration sensor(s), chemical sensor(s), or biological sensor(s), or other. Therefore, the IMD 100 is also referred to herein as an/the "implantable sensor device 100," "implantable stress sensor device 100," "implantable mechanical stress sensor device 100," "implantable physical stress sensor device 100," or just "sensor device 100;" but it is understood that the IMD 100 may or may not include the one or more additional sensors with the in vivo physical stress sensor regardless of the particular name referred to in the disclosure.

The system 10 includes an example embodiment of the implantable stress sensor device 100 that is implanted in the body of the patient and capable of detecting and distinguishing signals from mechanical energy (e.g., mechanical waves) originating within the host, such as one or more structures of the heart, vasculature, and/or lungs. The implantable stress sensor device 100 includes a sensor unit 110 in communication with an electronics unit 120, which are encased within a housing 101. The system 10 includes a data processing system 150 in communication with the implantable stress sensor device 100. In some embodiments, the system 10 includes an external receiver device 130 operable to receive a wireless transmission carrying data indicative of detected signals acquired from the implantable stress sensor device 100 and to transmit and/or store the data to the data processing system 150. In some embodiments, the implantable stress sensor device 100 and/or the external receiver device 130 is/are in communication with the data processing system 150 via a network 140 of computers in communication with each other and accessible through the Internet (e.g., referred to as the "cloud"), where the data from the implantable stress sensor device 100 and/or the external receiver device 130 can be transferred to the data processing system 150. Similarly, information from the data processing system 150 can be transferred to the external receiver device 130 and/or the implantable stress sensor device 100. For example, the data processing system 150 can manage data compilation(s) into a directional or changing modality to provide a continuous, long-term representation (i.e., far more than a moment representation) informative of the patient's health and disease, and which can also provide a delta change representation (whether on a short-term or long-term temporal scale) to aid in the analysis of the patient's health and disease from a point in time (e.g., any point in time defined as an initial point ($T_0$) to a point in future time ($T_f$)), thereby functionally providing deterioration or improvement of the physical state from a point of implant and treatment of the implantable stress sensor device 100.

In some implementations, the implantable stress sensor device 100 wirelessly communicates the acquired data (associated with the detected mechanical waves propagating within the body) directly to the external receiver device 130. For example, the implantable stress sensor device 100 can transfer the data to the external receiver device 130 using a low power wireless communication protocol, e.g., such as Bluetooth Low Energy (BLE), Near Field Communication (NFC), low frequency radio frequency (RF) signal in a range of 3 kHz to 1.3 MHZ, or other. Example embodiments of the external receiver device 130 include a computing device 130A or a dedicated base station 130B. For example, the computing device 130A can include, but is not limited to, a smartphone, tablet, a home device (e.g., Alexa, Nest, Echo, Google Home, Smart TVs, etc.), a wearable computing device (e.g., smartwatch, smart-glasses or headgear, etc.), a laptop or desktop computer, or other. The dedicated base station 130B can include data storage and/or data communication units that facilitate the communication of data from the implantable stress sensor device 100 to the data processing system 150 through a Wi-Fi access or cellular link to the network 140. In some implementations, for example, the external receiver device 130 can be embodied on multiple receiver devices, such as both the computing device 130A (e.g., smartphone, tablet, etc.) and the dedicated base station 130B, as illustrated in the example of FIG. 1A. In some implementations, for example, the external receiver device 130 can (i) process, at least partially, the received data for display on a display screen of the external receiver device 130 and/or for transfer of the received data to an external computer or computing system, such as the data processing system 150. In some embodiments, for example, the system 10 optionally includes a software application ("app") that is resident on the external receiver device 130 to control various data processing, storage, and communication functionalities for management of the received data.

In the example of the system 10 illustrated in FIG. 1A, the data processing system 150 can include one or more server computer devices 152, one or more client computer devices 154, and/or one or more databases 156, in data communication with each other. In implementations, for example, the computer device(s) 152, 154 and the database(s) 156 are in communication with each other and/or in communication with the other devices of the system 10 via the network 140. In some implementations, for example, the data processing system 150 can remotely monitor data associated with the patient user obtained by the implantable stress sensor device 100 and/or remotely operate aspects of the system 10, e.g., such as modify sensing parameters or protocols of the implantable stress sensor device 100, data display or processing features of the app on the receiver device 130, or other.

In some embodiments, for example, the system 10 optionally includes a remote computing device 160 operated by a remote user to remotely monitor data associated with the patient user obtained by the implantable stress sensor device 100 that is transferred to the data processing system 150. For example, the remote computer 160 can include a personal computer such as a desktop or laptop computer, a mobile computing device such as a smartphone, tablet, smartwatch, etc., or other computing device. In some implementations, for example, the remote computing device 160 is configured to only receive data that is curated (e.g., selected, pre-processed, and/or formatted) by the data processing system 150. In some implementations, for example, the remote computing device 160 is configured to remotely operate one or more aspects (e.g., functionalities) of the system 10. For example, the remote computing device 160 can implement a remote user software application (remote user app) that is configured to provide the remote user with such display, storage, and/or management features. The remote user, for example, can include a health care provider (HCP), such as a physician, nurse, family member of the patient user, or other caregiver, or a medical insurance payer, or other type of stakeholder entity or individual with respect to the patient user's health.

Figure 1B:
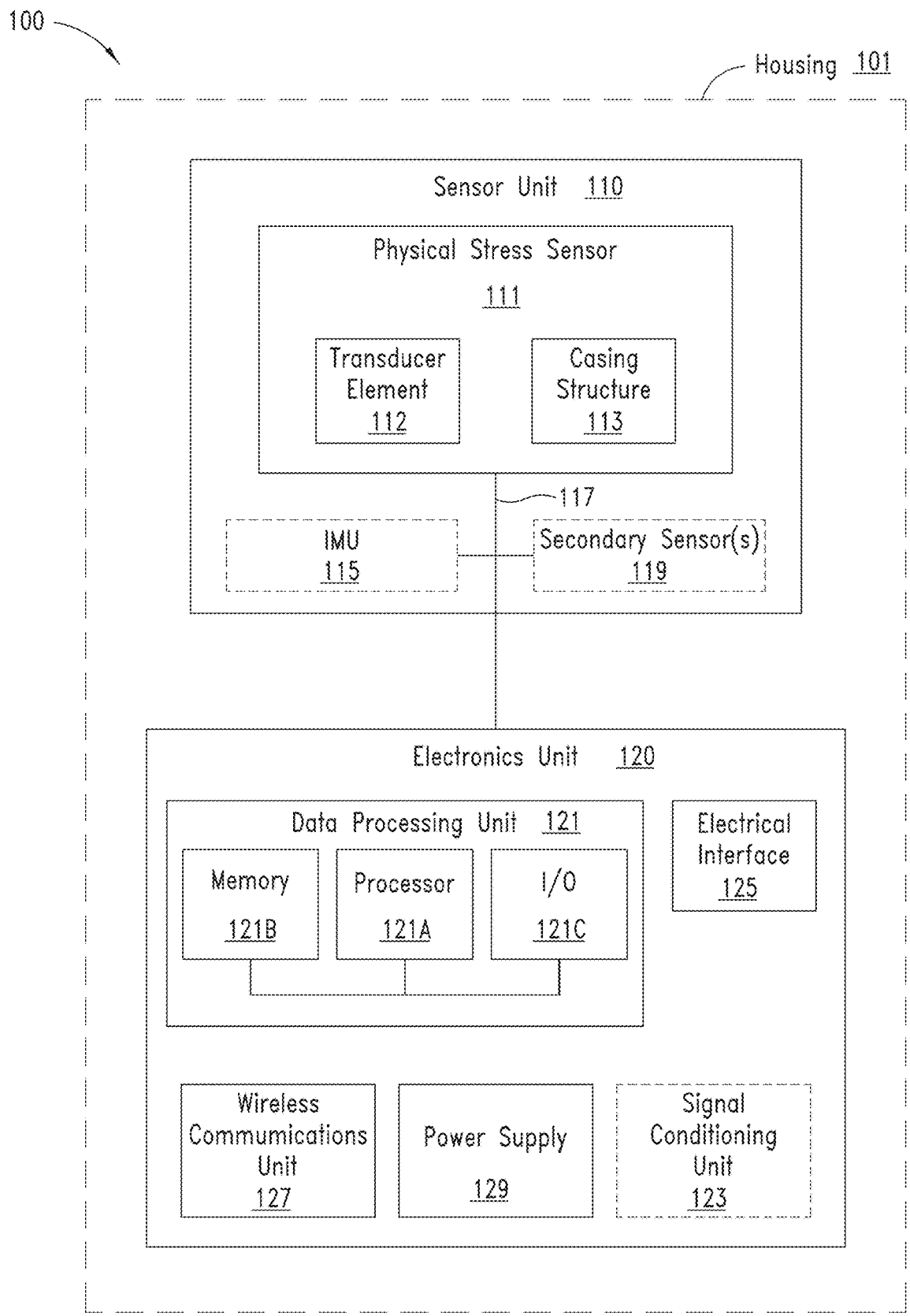
FIG. 1B shows a block diagram of an example embodiment of an IMD including a physical stress sensor device, in accordance with the present technology.

FIG. 1B shows a block diagram of the stress sensor device 100, depicting an example embodiment of the sensor unit 110 and the electronics unit 120. While the stress sensor device 100 is described in the context of an implantable sensor device in FIG. 1B, it is understood that the example embodiment of the implantable stress sensor device 100 shown in FIG. 1B may also be implemented in non-implantable or ex vivo medical devices, such as in examples described later in this disclosure. The sensor unit 110 includes at least one physical stress sensor 111 to detect stress caused from internal mechanical energy associated with physiological phenomena of an internal body structure from within the host that is received by the at least one physical stress sensor 111. One or both of the sensor unit 110 and the electronics unit 120 are housed, fully or at least partially, in and/or coupled via a casing or housing 101 that is deployable and biocompatible within the host's body. In some embodiments, for example, the physical stress sensor 111 includes a transducer element 112 coupled to a casing structure 113. The transducer element 112 is able to receive a mechanical wave that emanates from a source (e.g., tissue, organ, bodily fluid, or other) within the host's body such that the transducer element converts energy of the received mechanical wave to electrical energy, thereby producing an electrical signal corresponding to the mechanical wave. In some embodiments, for example, the transducer element 112 includes a piezoelectric material, including but not limited to lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$). In example embodiments where the transducer element 112 includes PZT, the PZT can be PZT-5A, PZT-5H, or PZT-5K. In implementations of the physical stress sensor 111, for example, the casing structure 113 provides a firm, inflexible material and is configured to secure and/or position the transducer element 112 in the physical stress sensor 111 to receive a mechanical wave for transduction to the electrical signal indicative of an in vivo mechanical energy signal within the body. In some embodiments, for example, the casing structure 113 of the physical stress sensor is a hermetically sealed containment structure, which can include a metal, plastic, composite, or other material. The physical stress sensor 111 is configured in electrical communication with the electronics unit 120 via electrical interconnection(s) 117.

In some embodiments, the sensor unit 110 may include an inertial measurement unit (IMU) 115 to monitor motion (in multiple degrees of freedom) and/or determine an orientation of the implantable stress sensor device 100. The IMU 115 is configured in electrical communication with the electronics unit 120 via the electrical interconnection(s) 117.

In some embodiments of the sensor unit 110, for example, the IMU 115 can include an accelerometer and/or a rotational rate sensor (e.g., gyroscope) to monitor patient motion and/or position. In some embodiments of the sensor unit 110, for example, the IMU 115 can include a magnetometer. In example embodiments including the IMU 115, the IMU 115 is in communication with a data processing unit 121 of the electronics unit 120.

In some embodiments of the implantable stress sensor device 100, for example, the sensor unit 110 may optionally include one or more secondary sensor(s) 119, also referred to herein as auxiliary sensor(s). For instance, in some implementations, the secondary sensor(s) 119 may include an analyte sensor to measure a parameter (e.g., concentration) of an analyte in the region proximate the location (e.g., surrounding tissue) where the implantable stress sensor device 100 is deployed within the host, such as at or proximate the heart, lungs and/or gastrointestinal tract. In some examples, the optional secondary analyte sensor can include, but is not limited to, a glucose sensor.

Additionally or alternatively to a secondary analyte sensor, the secondary sensor(s) 119 may optionally include a pH sensor to measure the pH level in the region proximate the location where the implantable stress sensor device 100 is deployed.

Additionally or alternatively to a secondary analyte sensor and/or secondary pH sensor, the secondary sensor(s) 119 may optionally include a temperature sensor to measure the temperature in the region proximate the location where the implantable stress sensor device 100 is deployed. This temperature may be referred to as the host's core (or internal) body temperature, as opposed to a host's surface (or peripheral) temperature. A surface temperature is measured at a host's surface, e.g., a skin temperature, or a temperature measured under the host's tongue, or a temperature measured in the host's ear canal. A surface temperature can fluctuate based on external environmental conditions. A core body temperature refers to temperature within the body and/or internal organs of the host, such as the heart, liver, brain or internal bodily fluid such as blood.

Additionally or alternatively to a secondary analyte sensor and/or a secondary pH sensor and/or a secondary temperature sensor, the optional one or more secondary sensor(s) 119 may include an ECG sensor that includes two electrodes separated by a space that creates an electrical potential, e.g., positioned at or toward opposing ends of the housing 101, where the two electrodes are operable to measure an electrical signal (e.g., spike) that is indicative of the electrophysiological signals of the cardiac muscle tissue for controlling the patient's heartbeat, where the spikes give rise to the ECG signal of the patient. A device 100 of the present technology including both a physical stress sensor and an ECG as a secondary sensor 119, may be implanted in a host and then utilized to estimate the pulmonary arterial pressure (PAP) of the host. The physical stress sensor is responsive to, i.e., can detect, mechanical waves generated by the heart as it proceeds through the aortic (A2) and the pulmonary (P2) components of the second heart sound (S2). Simultaneously collected ECG data may be used to identify the S2 region of the data obtained from the stress sensor. That detection of A2 and P2 allows for the data from the device to be used to determine the A2-P2 splitting interval (S1), i.e., the time interval between the A2 and the P2, which is recognized to be a useful parameter for estimating the PAP. See, e.g., Wu J., Durand L-G, and Pibarot, P. Heart 2002, vol. 88, pp. 76-80.

In such cases, for example, the optional one or more secondary sensor(s) 119 comprising, for example, the analyte sensor, the pH sensor, the temperature sensor and/or the ECG sensor can be used to obtain data indicative of clinically-relevant conditions about the anatomic structure and/or conditions of the in vivo environment of the heart, lungs and/or gastrointestinal tract, such as a potential infection or inflammatory response to the implantation of the implantable stress sensor device 100. In some embodiments, for example, the optional one or more secondary sensor(s) 119 can be attached to the housing 101 of the implantable stress sensor device 100, e.g., via weld, chemical adhesion, clip, clamp, or other attachment means.

In some embodiments of the implantable stress sensor device 100, the housing 101 can itself be a hermetically sealed containment structure, e.g., comprising a metal, plastic, composite, or other material. In some embodiments, for example, the housing 101 includes a titanium (Ti) container that houses the one or more sensors of the sensor unit 110 and/or electronic components of the electronics unit 120, e.g., which may include but is not limited to any of sensor(s), a telemetry system, a microprocessor, memory, and/or a battery. For example, the housing 101 is configured to shield components of the electronics unit 120 from fluids or substances of the body when the implantable stress sensor device 100 is deployed inside the patient. As depicted in the diagram of FIG. 1B, the housing 101 can include a containment structure that fully covers the electronics unit 120 and at least partially covers at least one or some or all of the components of the sensor unit 110; whereas in some embodiments, the containment structure of the housing 101 can fully cover at least one or some or all of the components of the sensor unit 110.

The electronics unit 120 of the implantable stress sensor device 100 includes a data processing unit 121, an optional signal conditioning unit 123, a power supply 129, a wireless communications unit 127, and an electrical interface 125, which can include electrically conductive contact sites (e.g., pads, pins, or other contact configuration) that electrically interface with the electrical interconnection(s) 117 of the sensor unit 110. The electronics unit 120 is configured to receive and at least partially process electrical signals acquired from the physical stress sensor 111 of the sensor unit 110 (and signals acquired from optional IMU 115 or optional secondary sensor(s) 119). For example, in some embodiments, the electrical signals are received at the corresponding contact sites of the electrical interface 125 and provided to the data processing unit 121 (or, optionally, first to the signal conditioning unit 123 to improve the quality of the acquired electrical signals from the sensor unit 110 prior to providing to the data processing unit 121). In such implementations, the output of the data processing unit 121 can include raw or processed data associated with the detected data from the sensor unit 110, to be wirelessly transmitted to an external device by the wireless communications unit 127. In example embodiments of the electronics unit 120, the power supply 129 can include a battery (e.g., primary or rechargeable), fuel cell or other power source to supply power to the components of the electronics unit 120 and/or the sensor unit 110. In some implementations, for example, the power supply 129 includes an ultra-low power system (e.g., operating in the micro amp or nano amp range).

In some implementations, the data processing unit 121 is configured to at least partially process the conditioned electrical signals to (i) produce data, e.g., in an analog or a digital form, and/or (ii) control functionality of the electronics unit 120 and/or the sensor unit 110. For example, the data processing unit 121 can be configured to manage data acquisition on data channels associated with the physical stress sensor 111 and (optional) IMU 115 and/or (optional) secondary sensor(s) 119 of the sensor unit 110.

In some implementations, for example, the data processing unit 121 can be configured to control and manage the power consumption by at least one of the sensors of the sensor unit 110. For example, in embodiments of the implantable stress sensor device 100 including an example secondary sensor 119, e.g., such as an accelerometer (e.g., low power accelerometer), rate sensor, IMU, or other sensor operable to detect movement, the data processing unit 121 can be configured to process the data from the motion sensing secondary sensor 119 to determine an activity state or rest state of the patient, and based on the determined activity state or rest state of the patient, the data processing unit 121 can manage power allocation from the power supply 129 to the one or more sensor(s) of the sensing unit 110 and/or to the components of the electronics unit 120. As an illustrative example, in some embodiments, for example, the data processing unit 121 processes the data signal from an exemplary motion sensing secondary sensor 119 (e.g., low power accelerometer) to determine the activity state or rest state of the patient and generates an power control signal that controls allocation of electrical power from the power supply 129 to the physical stress sensor 111 to perform sensing for a certain period or periods of time when the patient is in the activity state and when the patient is in the resting state. In this manner, an appropriate amount of sensing activity is carried out by the physical stress sensor 111. Also, in some implementations, for example, the power control signal may power up some or all of the sensors on the device 100 at the same time or in a cascading times, whether intermittently or continuously, and/or for the same or differing time periods, e.g., such as power supplied for sensing functionality for 1-2 seconds or any appropriate time cadence based on the desired sensing application.

In some embodiments, for example, the wireless communications unit 127 includes a wireless transmitter, receiver, and/or transceiver device, e.g., including an antenna, which is capable of communicating with an external device to communicate raw, partially-processed, or fully-processed data from the signal conditioning unit 123 (and/or the data processing unit 121, discussed below). For example, the wireless communications unit 127 can be configured to manage the communication protocol for transmission or reception via the antenna. Examples of antenna can include, but are not limited to, a whip antenna, a loop antenna, or a conformal antenna. For example, an antenna system can be attached to the housing 101 (e.g., Ti containment structure) to enable bi-directional communication for data transfer and device management between the implantable stress sensor device 100 and one or more remote devices, e.g., various embodiments of the external receiver device 130 (see FIG. 1A), such as a base station or phone-based interface system or other computing device. An example transceiver unit can include a BLE chipset to communicate with a BLE-enabled device, e.g., a smartphone, tablet, or other external computing device. Additionally or alternatively, in some embodiments, for example, the wireless communications unit 127 is configured as a scaffolding around the electronics unit 120, e.g., such as coupled to or integrated with the housing 101, that is structured to provide wireless communication means for the implantable stress sensor device 100.

In some optional embodiments, for example, the optional signal conditioning unit 123 can include a circuit including one or more filters and/or one or more amplifiers to augment the raw electrical signals detected by the physical stress sensor 111 of the sensor unit 110 (e.g., transducer element 112) to increase a signal-to-noise ratio (SNR) of the electrical signals, thereby producing data containing the signal-processed electrical signals. In some optional embodiments, the optional signal conditioning unit 123 can include drive circuitry to produce operating electrical signals that generate electrical potentials and/or currents at the sensors, e.g., including but not limited to example embodiments of the optional secondary sensor(s) 119, such as analyte sensor electrode contingent(s) and/or temperature sensor contingent for operating an electrochemical sensing technique and/or electrophysiological or kinetic sensing technique to be performed at electrode(s) in some implementations of the optional secondary sensor(s) 119 of the sensor unit 110.

In some embodiments of the data processing unit 121, for example, the data processing unit 121 can include a processor 121A to process data and a memory 121B in communication with the processor 121A to store and/or buffer data. In various embodiments, for example, the processor 121A can include one or multiple processors, and the memory 121B can include one or multiple memory units. For example, the processor 121A can include a central processing unit (CPU), a microcontroller unit (MCU), a graphics processing unit (GPU), or other type of processor. For example, the memory 121B can include and store processor-executable code, which when executed by the processor, configures the data processing unit 121 to perform various operations, e.g., such as receiving information, commands, and/or data, processing information and data, and transmitting or providing information/data to another device. To support various functions of the data processing unit 121, the memory 121B can store information and data, such as instructions, software, values, images, and other data processed or referenced by the processor 121A. For example, various types of random access memory (RAM) devices, read only memory (ROM) devices, flash memory devices, and other suitable storage media can be used to implement storage functions of the memory 121B. In some embodiments, the data processing unit 121 includes an input/output (I/O) unit 121C to interface the processor 121A and/or memory 121B to other modules, units or devices. In some embodiments, the processor 121A, the memory 121B, and/or the I/O unit 121C is in communication with the wireless communications unit 127, e.g., such as a transmitter (Tx) or a transmitter/receiver (Tx/Rx) unit. For example, in such embodiments, the I/O unit 121C can interface the processor 121A and memory 121B with the wireless communications unit 127, e.g., to utilize various types of wireless interfaces compatible with typical data communication standards, which can be used in communications of the data processing unit 121 with other devices. The data communication standards include, but are not limited to, Bluetooth, Bluetooth Low Energy (BLE), Zigbee, Medical Implant Communication Service (MICS), industrial, scientific, and medical (ISM) band, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G/6G cellular communication methods, and parallel interfaces. In some implementations, the data processing unit 121 can interface with other devices using a wired connection via the I/O unit 121C, e.g., such as prior to implantation to be in data communication and/or power connection with another implanted device inside the patient user's body or wearable device worn on or attached to the outside of the patient user's body. The data processing unit 121 can also interface, e.g., via wireless communication, with other external interfaces, sources of data storage, and/or visual or audio display devices, etc. to retrieve and transfer data and information that can be processed by the processor 121A, stored in the memory 121B, or exhibited on an output unit of the external receiver device 130 (see FIG. 1A, e.g., smartphone, tablet, etc.) or other external device to the implantable stress sensor device 100. In some embodiments, for example, the electronics unit 120 can include a global positioning system (GPS) to determine a location of the patient user of the implantable stress sensor device 100.

IMD with Stress-Mediated Sensor

An exemplary stress-mediated sensor in accordance with the present technology is configured to measure stress—not displacement—to provide in vivo sensing of mechanical energy (mechanical waves) that emanate from within the body, e.g., from anatomical structures of the cardiovascular system and/or pulmonary system, such as the heart and lungs. The disclosed stress-mediated sensor is operable to detect an in vivo mechanical signal by measuring an applied force or moment upon the electromechanical transducer component of the sensor to convert the received mechanical energy (mechanical stress signal) into electrical energy (electrical signal), which is addressable and processible to decipher the physiological phenomenon associated with the detected mechanical signal and to determine clinically relevant information about the patient's health and/or disease. In some embodiments of the stress-mediated sensor, the transducer component includes a piezoelectric material and electrically-conductive non-piezoelectric material(s) configured in a piezoelectric sensing unit.

Figure 2A:
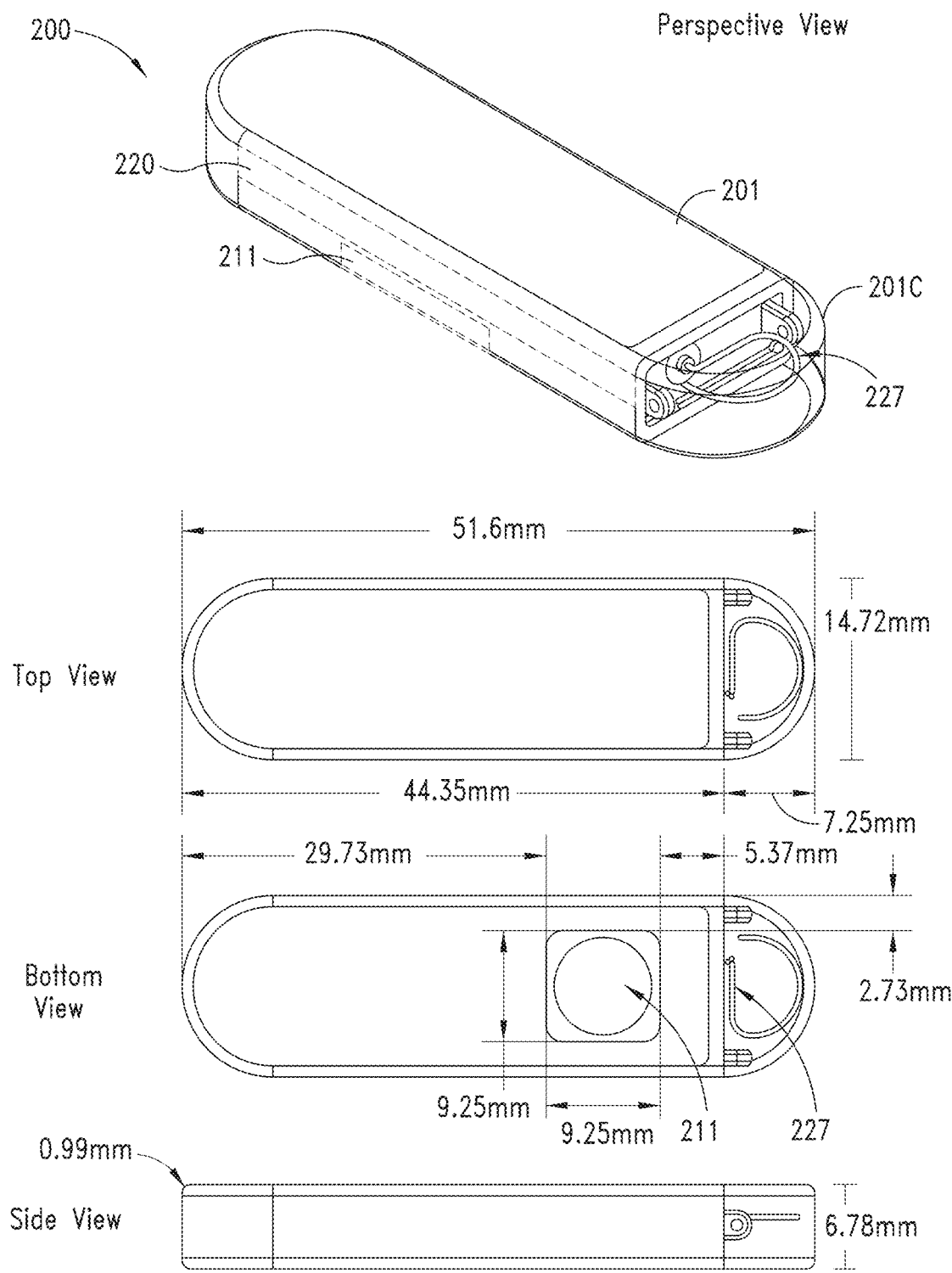
FIGS. 2A and 2B show diagrams depicting an example embodiment of an IMD of the present technology having an in vivo physical stress sensor, in accordance with the present technology, hermetically sealed with an electronics unit within a housing.
Figure 2B:
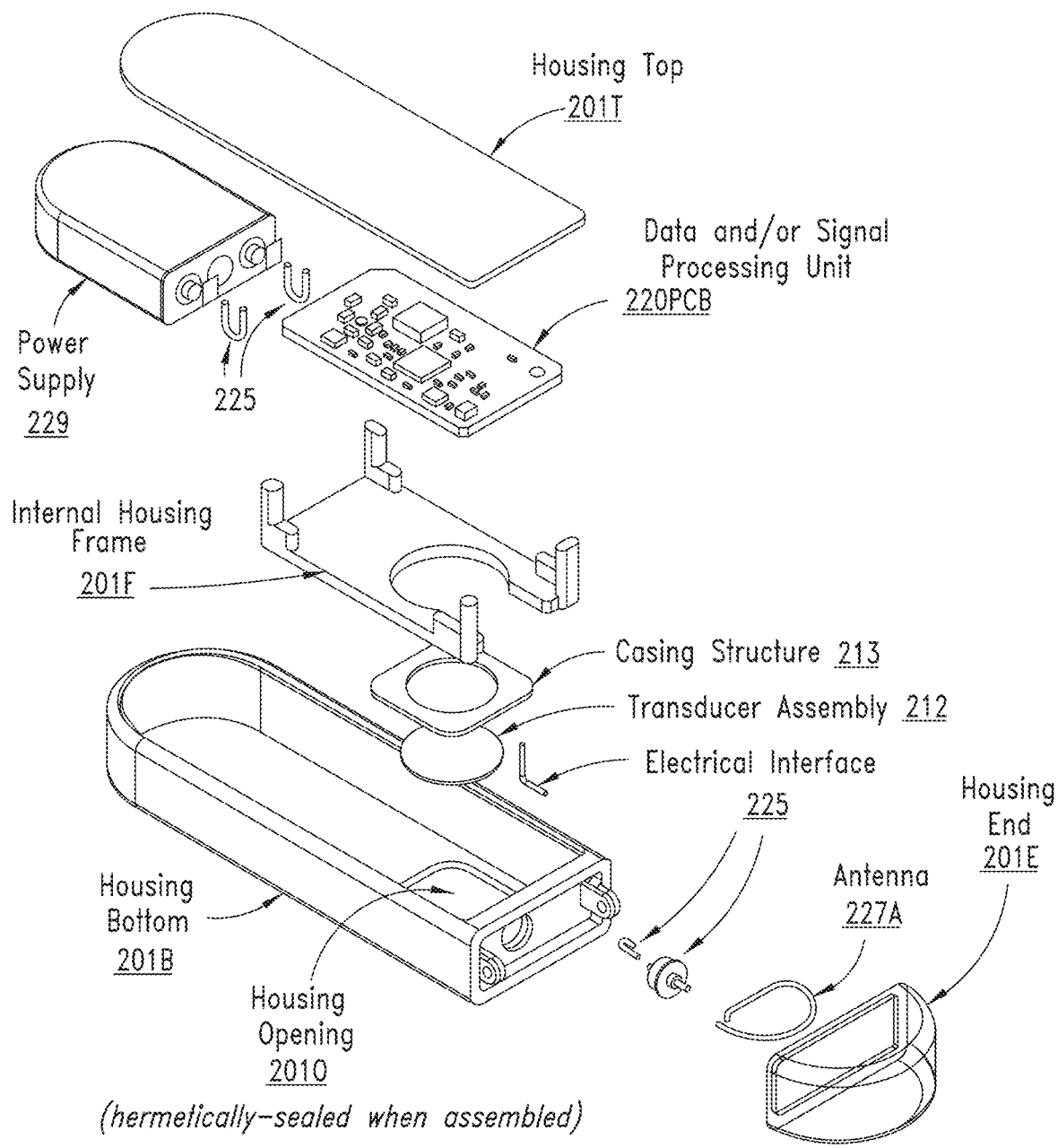

FIGS. 2A and 2B show diagrams depicting an exemplary IMD of the present technology, labeled 200, having a stress-mediated sensor. FIG. 2A shows multiple views of the exterior of the IMD 200 depicting an exemplary body structure; and FIG. 2B shows an exploded view of the IMD 200 depicting an example configuration of the components of the IMD 200.

FIG. 2A shows a perspective view illustrating an exemplary body of the IMD 200, showing a housing 201 that hermetically-seals within a sensor unit of the IMD 200, which includes stress-mediated sensor 211 (illustrated in broken lines), and an electronics unit 220 (illustrated in broken lines) in communication with the stress-mediated sensor 211. The perspective view diagram of FIG. 2A also show an example embodiment of a wireless communication unit 227, e.g., embodied as a wire antenna, which is disposed in a distal chamber 201C of the housing 201, e.g., to facilitate wireless communication transmission(s) and/or reception(s) between the IMD 200 and an external device (e.g., the external receiver device 130).

Also shown in FIG. 2A are a top view, a bottom view, and a side view of the exemplary body of the IMD 200, which illustrates one example of the shape, size and dimensions of an example embodiment of the housing 201 of the IMD 200. It is understood that the IMD 200 can be configured to have a range of sizes and shapes to accommodate the stress-mediated sensor 211 and electronics unit 220 contained therein, which are beyond the particular sizes, dimensions, and shapes shown in FIG. 2A for the example IMD 200. In the non-limiting example shown in FIG. 2A, the end-to-end length of the housing 201 is configured to be 51.6 mm, the end-to-end width of the housing 201 is configured to be 14.72 mm, and the end-to-end height of the housing 201 is configured to be 6.78 mm. Other non-limiting example shapes for the IMD 200 and for various portions of the housing 201 are contemplated, including rectangular, square, triangular, elliptical, circular, cylindrical, conical, or others or combinations thereof or of others.

FIG. 2B shows an exploded view of an example embodiment of the IMD 200, featuring components of the stress-mediated sensor 211 and the electronics unit 220 that are hermetically-sealed within the housing 201, which includes a first chamber enclosed by a housing top 201T and a housing bottom 201B and an adjacent second chamber (i.e., distal chamber 201C) enclosed by housing end 201E. In some embodiments of the IMD 200, for example, the stress-mediated sensor 211 includes transducer assembly 212 that is coupled to a casing structure 213, which is configured to secure the transducer assembly 212. For example, in some embodiments of the stress-mediated sensor 211, the transducer assembly 212 includes a piezoelectric material and at least one electrically-conductive non-piezoelectric material coupled to the piezoelectric material to receive the transduced electrical signals generated upon applied stress to the stress-mediated sensor 211 that is received by the piezoelectric material. In some embodiments, for example, the at least one electrically-conductive non-piezoelectric material is positioned on an interior-facing side of the piezoelectric material and coupled to electrical interface component(s) 225. In some embodiments, for example, the electrical interface components can be configured in or on the casing structure 213. In some embodiments, for example, the casing structure 213 or a portion thereof can include at least a portion of the at least one electrically-conductive non-piezoelectric material to receive and transfer the generated electrical signals. In some embodiments, for example, the transducer assembly 212 includes a non-piezoelectric material (not shown in FIG. 2B) that is positioned on an exterior-facing side of the piezoelectric material and to be disposed at the housing opening 2010 (i.e., opening through a side of housing bottom 201B), which is hermetically-sealed when assembled. In some embodiments, for example, the non-piezoelectric material has a Young's modulus close to (e.g., within 2×-3× of) or substantially matching (e.g., within 20% of) that of the piezoelectric material.

In some embodiments of the IMD 200, for example, the electronics unit 220 includes a data and/or signal processing unit 220PCB, which can be embodied by any of the exemplary embodiments of the data processing unit 121 and/or the optional signal conditioning unit 123, respectively, disclosed herein. In the example shown in FIG. 2B, the data and/or signal processing unit 220PCB includes a processor coupled to a memory which receives digital signal data from a signal processing circuit, all mounted on a printed circuit board (PCB). In some example embodiments, for example, the signal processing circuit includes a differential amplifier and/or charge amplifier to amplify the electrical signals received from the stress-mediated sensor 211 (e.g., from the at least one electrically-conductive non-piezoelectric material via the electrical interface component(s) 225 that connect the stress-mediated sensor 211 to the electronics unit 220), and/or an analog-to-digital (A/D) converter to digitize the electrical signals. In some example embodiments, for example, the signal processing circuit includes filter circuit(s) to remove signal outside frequency range(s) of non-interest, which can include low-pass, bandpass, and/or high-pass filters, e.g., to improve signal-to-noise ratio of the detected mechanical energy signal of interest. The exemplary data and/or signal processing unit 220PCB can be programmable for some embodiments. In some embodiments, for example, the data and/or signal processing unit 220PCB can be secured and/or positioned within the first chamber of the housing 201 by an (optional) internal housing frame 201F, which may also be used to secure and/or position one or more components of the stress-mediated sensor 211 for some example embodiments.

In some embodiments of the IMD 200, for example, the electronics unit 220 includes a power supply 229 electrically connected, via components (e.g., wires or other connectors) of the electrical interface 225, to the data and/or signal processing unit 220PCB and other components of the electronic unit 220 (or other unit of the IMD 200, such as some embodiments of the stress-mediated sensor 211, when electrical power is needed to be supplied to such units). The power supply 229 can be embodied by any of the exemplary embodiments of the power supply 129 disclosed herein. For example, the power supply 229 can include a battery (e.g., primary or rechargeable), fuel cell, or other power source to supply power to the components of the electronics unit 220 (and, optionally, the stress-mediated sensor 211). In some example embodiments, for example, the power supply 229 can be an electrical receiving port to receive a wire that can supply the IMD 200 from a remote power source, e.g., such an implantable (in vivo) power supply (e.g., a battery associated with one or more other implanted medical device(s)) and/or a wearable (in vitro) power supply (e.g., a battery worn by the user with the wire connecting the battery to another in vivo device implanted into the body of the patient).

In some embodiments of the IMD 200, for example, the electronics unit 220 includes a wireless communications unit 227 electrically connected, via components (e.g., wires or other connectors) of the electrical interface 225, to the data and/or signal processing unit 220PCB and other components of the electronic unit 220 (or other unit of the IMD 200, such as some embodiments of the stress-mediated sensor 211, e.g., for transmitting raw electrical signals transduced by the sensor). The wireless communication unit 227 can include a wireless transmitter, receiver, and/or transceiver device, e.g., antenna 227A as shown in FIG. 2B, which is capable of communicating with an external device to communicate raw, partially-processed, or fully-processed data from the data and/or signal processing unit 220PCB. For example, the wireless communications unit 227 can be configured to manage the communication protocol for transmission or reception via the antenna. The wireless communication unit 227 can be embodied by any of the exemplary embodiments of the wireless communication unit 127 disclosed herein. Examples of the antenna 227A can include, but are not limited to, a whip antenna, a loop antenna, a chip antenna, a planar inverted F antenna (PIFA), a bipolar antenna, and/or a conformal antenna.

Unimorph Piezoelectric Sensor

In some embodiments, for example, the exemplary stress-mediated sensor includes a unimorph structure for sensing stress, also referred to as physical stress or mechanical stress, which causes a pressure differential on a detecting region of the unimorph stress sensor of the disclosed technology that is measurable to characterize a physical phenomenon (e.g., including but not limited to sound) occurring at a volume of interest for sensing. Example embodiments of a unimorph stress-mediated sensor includes a piezoelectric material coupled to a biocompatible, non-piezoelectric material to absorb stress applied on the sensor and coupled to an electrically conductive material, providing a piezoelectric sensing unit that generates a measurable electrical signal proportionate to the applied stress (force or moment) on the unimorph structure, and which is electrically addressable by a receiving circuit (e.g., for signal processing and/or data processing). Such a stress-mediated unimorph-structured piezoelectric sensor (also referred to herein as a "unimorph piezoelectric sensor") is substantially less sensitive (e.g., insensitive) to any potential tissue encapsulation and overgrowth (e.g., biofouling) due to (i) the stress sensing modality that does not require displacement of the transducing component and (ii) the material selection of the tissue-facing outer (non-piezoelectric) material component to minimize granulation tissue formation (e.g., from an immune response to implantation of the IMD). For example, for long-term (chronic) monitoring, the body naturally responds to a foreign material (such as an implantable medical device) by encapsulating the material with tissue (e.g., fibrous encapsulation of "scar tissue" on the surface of the foreign material produced by myofibroblasts and fibrocytes) and/or clotting (e.g., thrombi formation composed of platelet aggregates and fibrin). The disclosed implantable stress sensor devices, such as the exemplary unimorph stress-mediated sensor, is engineered with a structural configuration that enables the stress detection components (assembly) to operate at high sensitivity and resolution (i.e., high signal-to-noise) within a living subject's body while also shielding the stress detection assembly from biofouling, and thus protecting the integrity of the sensor device to allow for long-term, continuous operation in vivo. The exemplary unimorph stress-mediated sensor is configured to hermetically seal the stress detection assembly, which protects the stress sensor from damage and protects its stable and highly sensitive physical stress sensing capability while also protects the living subject from exposure to potentially toxicity from materials of the sensor device.

Example embodiments of the unimorph piezoelectric sensor in accordance with the present technology are configured to have a rigid unimorph piezoelectric structure that includes a rigid piezoelectric transducer coupled to a biocompatible stress absorption material and to an electrode. The biocompatible stress absorption material is operable to receive the internal mechanical energy signal for the unimorph piezoelectric sensor and transfer the internal mechanical energy signal to the piezoelectric transducer, and the electrode is operable to receive the electrical signal operable to transduced by the piezoelectric transducer. In some embodiments, the biocompatible stress absorption material can include an electrically conductive material and serve a second electrode; whereas in other embodiments the biocompatible stress absorption material can include an electrically insulative material, such that the rigid unimorph piezoelectric structure includes a second electrode coupled between the piezoelectric transducer and the biocompatible stress absorption material.

While in operation to detect and measure host-generated internal mechanical energy signals (e.g., pressure waves that propagate within the host's body), the physical stress sensor of an exemplary IMD of the present technology (e.g., exemplary unimorph stress-mediated sensor) transduces a pressure differential upon the sensor portion caused by the internal mechanical energy signal and undergoes little or no displacement on a macroscopic or microscopic scale. If minute displacement does occur, the extent of displacement is of a sub-nanometer magnitude (less than 1 nm), or low nanometer magnitude (e.g., less than 10 nm). The stress sensor of the present technology is not intended to measure displacement but is instead measuring the pressure differential between the inside and outside of the physical stress sensor (e.g., with respect to IMD housing, where that pressure differential creates a stress inside the housing that is detectable and measurable by the piezoelectric transducer layer that directly or indirectly contacts the inside wall of the housing).

Thus, the exemplary unimorph stress-mediated sensor is able to successfully operate in vivo based on a sensing modality (i.e., force or moment (pressure) differential) that is different than a conventional displacement—or bending-type (movement-based) piezoelectric sensor, which lack the sensitivity to detect the minute movements (e.g., sub-nanometer, angstrom and/or sub-angstrom level(s)) induced upon the piezoelectric material-whether upon initial implantation (just prior to biofouling) and certainly after the body's response (biofouling of the sensor). Furthermore, the unimorph piezoelectric sensor is capable of exhibiting substantially lower noise and substantially higher mechanical signal resolution for improved sensitivity to dynamic range, e.g., as compared to a displacement-mediated sensor. In some embodiments, for example, the stress-mediated sensor includes a charge amplifier circuit to condition the electrical signal generated by the piezoelectric material in various embodiments of the stress-mediated sensor, including but not limited to the unimorph piezoelectric sensor.

In some embodiments of the unimorph piezoelectric structure, the device structure includes an active piezoelectric material (e.g., piezoelectric film) capable of imparting or detecting a stress and a stable, non-piezoelectric material (e.g., metal substrate) disposed on a side of the active piezoelectric material; which, after a load is applied on the unimorph piezoelectric structure (e.g., on the metal substrate), it causes a moment (stress) that propagates to the active piezoelectric film, thereby generating an electrical signal corresponding to the applied stress that is detectable as a mechanical force sensor, i.e., capable to detect mechanical energy signals (mechanical waves). In some embodiments of the physical stress sensor 111, the piezoelectric material of the exemplary unimorph piezoelectric sensor can include, but is not limited to, PZT (e.g., PZT-5A, PZT-5H, or PZT-5K), PLZT, quartz, ZnO, AlN, ScAlN, $BaTiO_3$, $PbTiO_3$, $KNbO_3$, $LiNbO_3$, $LiTaO_3$, and/or $Na_2WO_4$. In some embodiments of the physical stress sensor 111, the non-piezoelectric material of the exemplary unimorph piezoelectric sensor can include, but is not limited to, titanium (Ti), a biocompatible stainless-steel, cobalt-chromium, nitinol, or high-purity ceramic (e.g., alumina $Al_2O_3$). For instance, the unimorph stress-mediated sensor includes a rigid structure that provides stability to piezoelectric-detection assembly, allowing detection of pressure differential. The rigid structure of the unimorph piezoelectric sensor will not deflect when exposed to mechanical energy. The rigid structure of the unimorph piezoelectric sensor is in contrast with a flexible piezoelectric sensor designed to deflect upon incidence of mechanical energy, which, over time, deflection causes the sensor structure to physically degrade. And, at some point, the sensor structure of a flexible piezoelectric sensor may break due to the amount of deflections undergone by the sensor structure (e.g., including range or extent of deflections and large occurrences or frequency of deflections), which could result in disastrous consequences for the patient with the flexible piezoelectric sensor implanted within the patient's body. The rigid structure of the disclosed unimorph piezoelectric sensor is configured to not break under internal mechanical energy throughout the lifetime of the patient, as well as can withstand unintended external forces, and thereby provide safety for the patient throughout the use of the implanted IMD having the unimorph piezoelectric sensor.

In example embodiments of the implantable stress sensor device 100, the unimorph piezoelectric sensor can be integrated in a sterile, biocompatible, hermetically-sealed housing structure for longevity and safety when implanted into a patient, where the non-piezoelectric component (e.g., Ti) is positioned on the device housing (or forms the device housing) and is exposed to the outer environment (tissue-facing); and where piezoelectric component (e.g., PZT material) is not exposed on the outer environment of the implantable stress sensor device 100, but is instead contained within the hermetically-sealed interior of the IMD. In such embodiments, for example, the piezoelectric material and non-piezoelectric material are selected and engineered such that the unimorph piezoelectric sensor is sufficiently sensitive to receive and transduce low amplitude mechanical signals of a large frequency range, i.e., having large dynamic range. For example, the unimorph piezoelectric sensor is capable of measuring and resolving sound levels as low as 20 dB SPL (e.g., barely above threshold of human hearing) and as high as 110 dB SPL (e.g., approaching human pain threshold).

Figure 3C:
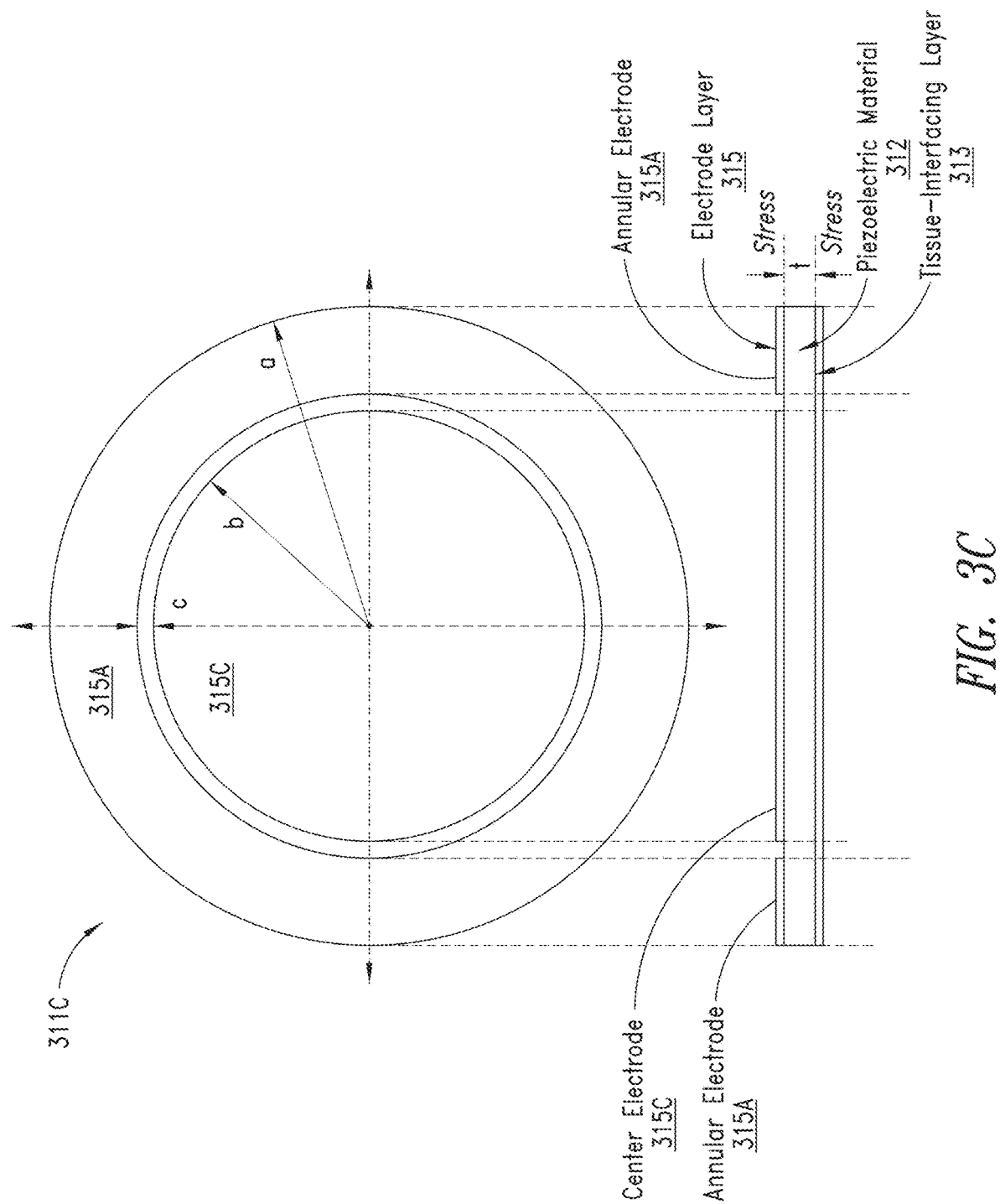

FIGS. 3A-3C, 3J, and 3K show diagrams depicting example embodiments of a unimorph piezoelectric sensor device 311, labeled 311A, 311B, 311C, 311J, and 311K, in FIGS. 3A-3C, 3J, and 3K, respectively, in accordance with the present technology. FIG. 3A shows a cross-sectional view and a top view (below the cross-sectional view) of an example embodiment of the unimorph piezoelectric sensor device having at least one electrode electrically-interfaced with and of a smaller diameter than a piezoelectric transducer material coupled to a biocompatible, electrically-conductive, non-piezoelectric material. FIG. 3B shows a cross-sectional view and a top view (below the cross-sectional view) of an example embodiment of the unimorph piezoelectric sensor device having at least one electrode electrically-interfaced with and of a smaller diameter than a piezoelectric transducer material coupled to a biocompatible, non-electrically-conductive, non-piezoelectric material with an intermediary electrically-conductive material layer therebetween. FIG. 3C shows an example embodiment of the unimorph piezoelectric sensor device having at least two electrodes electrically-interfaced with a piezoelectric transducer material. FIG. 3J shows a cross-sectional view and a top view (below the cross-sectional view) of an example embodiment of the unimorph piezoelectric sensor device having at least one electrode electrically-interfaced with and of the same diameter as a piezoelectric transducer material coupled to a biocompatible, electrically-conductive, non-piezoelectric material. FIG. 3K shows a cross-sectional view and a top view (below the cross-sectional view) of an example embodiment of the unimorph piezoelectric sensor device having at least one electrode electrically-interfaced with and of the same diameter as a piezoelectric transducer material coupled to a biocompatible, non-electrically-conductive, non-piezoelectric material with an intermediary electrically-conductive material layer therebetween.

As shown in FIG. 3A, the unimorph piezoelectric sensor device 311A includes a piezoelectric material 312 (also referred to as "piezoelectric layer 312") disposed between and coupled to a first layer 313 and a second layer 315. The first layer 313 includes a biocompatible, electrically conductive, non-piezoelectric material. In some embodiments, the biocompatible, electrically conductive, non-piezoelectric material of the first layer 313 has a Young's modulus close within to (e.g., within 2×-3× of) or substantially the same as (e.g., within 20% of) the Young's modulus of the piezoelectric material 312. In implementations of the unimorph piezoelectric sensor device 311A, the first layer 313 is configured to be a sensing layer that receives the mechanical wave emanated from within the patient's body, such that an applied force on the first layer 313 is transferred through the first layer 313 and into the piezoelectric material 312, which acts to transduce the mechanical energy (stress) into electrical energy. In some embodiments of the unimorph piezoelectric sensor device 311A, the first layer 313 is positioned at a location of the IMD, where the first layer 313 is tightly coupled to an IMD housing wall 319, e.g., which can be made of the same material as the first layer 313, in order to hermetically seal the other components of the unimorph piezoelectric sensor device 311A within the enclosure. Yet, in some embodiments, the first layer 313 is positioned in the unimorph piezoelectric sensor device 311A to be at an aperture of the IMD housing wall 319 (not shown), where the IMD housing wall 319 is tightly coupled to a portion (e.g., outer region) of the first layer 313 in order to hermetically seal the other components of the unimorph piezoelectric sensor device 311A within the enclosure.

The second layer 315 includes a non-piezoelectric, electrically conductive material. In implementations of the unimorph piezoelectric sensor device 311A, the second layer 315 provides at least one electrically-addressable electrode to receive the electrical signal generated from the piezoelectric material 312; and the electrically conductive material of the first layer 313 provides an electrically-addressable electrode for the piezoelectric sensing unit. Moreover, for some embodiments of the unimorph piezoelectric sensor device 311A, because the material of the first layer 313 is biocompatible, the housing of the IMD (e.g., IMD housing wall(s) 319) can be configured as the first layer 313, thereby allowing the piezoelectric material 312 (and second layer 315) to be manufactured directly on a region of the housing structure of the IMD.

In some embodiments of the unimorph piezoelectric sensor device 311A, for example, the piezoelectric material 312 includes PZT (e.g., PZT-5A, PZT-5H, or PZT-5K), the first layer 313 includes titanium, and the second layer 315 includes at least one of titanium, gold, platinum, silver, copper, nickel, aluminum, palladium, or other conductive material, including an alloy thereof. In such example embodiments where the first layer 313 is electrically conductive, biocompatible, and mechanically matched (e.g., close Young's modulus) to the piezoelectric material 312, such as Titanium is with PZT-5A, for example, the first layer 313 can be coupled to the electronics unit 220, as is the non-piezoelectric, electrically conductive material of the second layer 315, so that both sides of the piezoelectric material 312 can connect to an amplifier circuit (not shown) to amplify the transduced electrical signal, i.e., the captured charge generated by the piezoelectric material 312 in response to the applied stress. The unimorph piezoelectric sensor device 311A can be configured to have a variety of material configurations for the first layer 313, the piezoelectric layer 312, and the second layer 315, including but not limited to the following examples. For example, the piezoelectric material of the piezoelectric layer 312 can include, but is not limited to, PZT (e.g., PZT-5A, PZT-5H, or PZT-5K), PLZT, quartz, ZnO, AlN, ScAlN, $BaTiO_3$, $PbTiO_3$, $KNbO_3$, $LiNbO_3$, $LiTaO_3$, and/or $Na_2WO_4$. The biocompatible material of the first layer 313 can include, but is not limited to, titanium (Ti), a biocompatible stainless-steel, cobalt-chromium, nitinol, or high-purity ceramic (e.g., alumina $Al_2O_3$). The electrically conductive material of the second layer 315 can include, but is not limited to, titanium, gold, platinum, silver, copper, nickel, aluminum, palladium, or other conductive material, including an alloy thereof. The unimorph piezoelectric sensor device 311A can be configured to have a variety of size configurations for the first layer 313, the piezoelectric layer 312, and the second layer 315, including but not limited to the following examples. For example, the first layer 313 can be configured to have a thickness in a range of 150 µm to 250 µm, and the piezoelectric layer 312 can be configured to have a thickness in a range of 150 µm to 250 µm. In some examples, the thickness of the first layer 313 and the piezoelectric layer 312 are configured to be the same thickness. For example, the second layer 315 can be configured to have a thickness in a range of 100 nm to 20 µm. In some examples, the second layer 315 can be configured to be thinner than 100 nm (e.g., up to 50% thinner than 100 nm, i.e., 50 nm). In some examples, the second layer 315 can be configured to be thicker (e.g., up to 10× or more than 20 µm, i.e., 200 µm or 250 µm). The thickness of the second layer 315 is preferably thinner (e.g., sub-micron thickness) to minimize the flexural rigidity and ultimate sensitivity on the piezoelectric layer 312.

In some embodiments of the unimorph piezoelectric sensor device 311A, the amplifier circuit can be configured as a charge amplifier (or other type of amplifier) which conditions, processes, and passes the transduced stress signal (i.e., electrical signal) for higher-order electronic functions by the IMD, e.g., such as data processing, data storage, wireless transmission, or other. The amplifier circuit that is part of or integrated with example embodiments of the unimorph piezoelectric sensor device 311A can be included as part of the sensor unit 110, as part of the electronics unit 120 (e.g., part of the optional signal conditioning unit 123), or as part of both the sensor unit 110 and the electronics unit 120 for various embodiments of the unimorph piezoelectric sensor device 311A in accordance with the IMD 100. Example embodiments of an amplifier circuit that can be electrically interfaced to the unimorph piezoelectric sensor device 311A, or to other embodiments of a mechanical stress sensor for example embodiments of the sensor device 100, is shown later in FIGS. 3H-3I.

Yet, in some example embodiments of a unimorph piezoelectric sensor device of the disclosed technology, the first layer 313 can be configured of a material that is biocompatible but not electrically conductive, where, in such embodiments, an intermediary electrically conductive layer is included for the unimorph piezoelectric sensor device, i.e., coupled to the piezoelectric material 312 and the first layer 313.

FIG. 3B shows an example embodiment of the unimorph piezoelectric sensor device 311B that includes the piezoelectric material 312 disposed between (i) a first layer 313B comprising a biocompatible, non-electrically conductive, non-piezoelectric material and (ii) the electrically-conductive, non-piezoelectric second layer 315, where the piezoelectric material 312 is coupled to the second layer 315 and an intermediary layer 316 comprising an electrically conductive, non-piezoelectric material. Also shown in the example of FIG. 1B, in some embodiments of the unimorph piezoelectric sensor device 311B, the first layer 313B is positioned at a location of the IMD and tightly coupled to the IMD housing wall 319, e.g., which can be made of the same material as the first layer 313B, in order to hermetically seal the other components of the unimorph piezoelectric sensor device 311B within the enclosure. Yet, in some embodiments, the first layer 313B is positioned in the unimorph piezoelectric sensor device 311B to be at an aperture of the IMD housing wall 319 (not shown), where the IMD housing wall 319 is tightly coupled to a portion (e.g., outer region)

of the first layer 313B in order to hermetically seal the other components of the unimorph piezoelectric sensor device 311B within the enclosure. Like the first layer 313 of FIG. 3A, the first layer 313B of FIG. 3B includes a biocompatible, non-piezoelectric material, but is non-conductive. In some embodiments of the first layer 313B of the unimorph piezoelectric sensor device 311B, for example, the biocompatible, non-electrically conductive, non-piezoelectric material of the first layer 313B can be selected to have a Young's modulus close to (e.g., within 0.5×-3× of) the Young's modulus of the piezoelectric material 312. In implementations of the unimorph piezoelectric sensor device 311B, the at least one electrode of the second layer 315 and the electrically conductive material of the intermediary layer 316 and electrically interfaced with the piezoelectric material 312 and an amplifier circuit (e.g., of the electronics unit 220) to receive the transduced electrical signal generated from the piezoelectric material 312 for signal processing at the amplifier.

In some embodiments of the unimorph piezoelectric sensor device 311B, for example, the piezoelectric material includes PZT (e.g., PZT-5A, PZT-5H, or PZT-5K), the first layer 313B includes a high purity ceramic (e.g., alumina), and the second layer 315 and/or the intermediary layer 316 includes at least one of titanium, gold, platinum, silver, copper, nickel, aluminum, palladium, or other conductive material, including an alloy thereof. In some example embodiments, the first layer 313 includes an electrically insulative, biocompatible material such as Alumina, which can be mechanically matched (e.g., close Young's modulus and/or optimized thickness) to the piezoelectric material 312 of the unimorph piezoelectric sensor device 311B. The intermediary layer 316 and the first layer 315 are coupled to the electronics unit 220, so that both sides of the piezoelectric material 312 can connect to an amplifier circuit (not shown) to amplify the transduced electrical signal, i.e., the captured charge generated by the piezoelectric material 312 in response to the applied stress. The unimorph piezoelectric sensor device 311B can be configured to have a variety of size configurations for the first layer 313B, the piezoelectric layer 312, the intermediary layer 316, and the second layer 315, including but not limited to the following examples. For example, the first layer 313B (e.g., alumina) can be configured to have a thickness in a range of 150 μm to 250 μm, and the piezoelectric layer 312 can be configured to have a thickness in a range of 150 μm to 250 μm. In some examples, the thickness of the first layer 313B and the piezoelectric layer 312 are configured to be the same thickness. For example, the second layer 315 can be configured to have a thickness in a range of 100 nm to 20 μm. In some examples, the second layer 315 can be configured to be thinner (e.g., up to 50% thinner) than 100 nm. In some examples, the second layer 315 can be configured to be thicker (e.g., up to 10× than 20 μm). Similarly, for example, the intermediary layer 316 can be configured to have a thickness in a range of 100 nm to 20 μm. In some examples, the intermediary layer 316 can be configured to be thinner than 100 nm (e.g., up to 50% thinner than 100 nm, i.e., 50 nm). In some examples, the intermediary layer 316 can be configured to be thicker (e.g., up to 10× or more than 20 μm, i.e., 200 μm or 250 μm). The thicknesses of the second layer 315 and the intermediary layer 316 are preferably thinner (e.g., sub-micron thickness) to minimize the flexural rigidity and ultimate sensitivity on the piezoelectric layer 312.

The unimorph piezoelectric sensor device 311A and 311B can be configured in a variety of shapes and geometries of the IMD within which it is employed. For example, the unimorph piezoelectric sensor device 311A and 311B can be configured with a cylindrical geometry and a circular-shaped sensor profile. The lower diagrams of FIGS. 3A and 3B (i.e., top views) show a top side of the device 311A and 311B, respectively, that is contained within the housing of the IMD, where the at least one electrically-addressable electrode 315 is centrally positioned on the piezoelectric material 312. For example, in the top side view of the device 311A and 311B in the diagrams of FIGS. 3A and 3B, respectively, the electrode 315 has a radius b, and the piezoelectric material 312 has a radius a, where a>b. In such embodiments where the radius of the piezoelectric material 312 is greater than radius of the electrode 315 (i.e., a>b), this design can provide immunity from noise sources, e.g., environmental noise sources such as temperature, stray RF signals, etc. Whereas in some embodiments of the unimorph piezoelectric sensor device 311, like the unimorph piezoelectric sensor device 311J and 311K shown in FIGS. 3J and 3K, respectively, for example, the radius b of the electrode 315 can be configured to be the same length as the radius a of the piezoelectric material 312, e.g., where radius a=b. In such embodiments where the radius of the piezoelectric material 312 and the electrode 315 are matched (i.e., a=b), the overall noise floor for a given amount of electronic power consumption can be lower and the unimorph piezoelectric sensor device 311A and 311B may be easier and/or cheaper to manufacture (e.g., no masking process). Notably, the lower diagrams of FIGS. 3A, 3B, 3J, and 3K (top views) show stress vectors Orr and gee, i.e., radial stress vector and/or tangential stress vectors, that radiate from center or tangentially, respectively. The stress vectors add linearly to produce a net polarization (charge) in the piezoelectric material 312.

FIG. 3C shows a top view of an example embodiment of the unimorph piezoelectric sensor device 311C, which is in accordance with either of the unimorph piezoelectric sensor device 311A or the unimorph piezoelectric sensor device 311B, or other example embodiments such as the unimorph piezoelectric sensor device 311D, 311E, 311F, and 311G (shown later). The unimorph piezoelectric sensor device 311C includes a circular/cylindrical shape/geometry having two electrode structures of the second layer 315: center electrode 315C and annular electrode 315A that is positioned around and separated from the center electrode 315C by a gap c. The gap c provides an electrical discontinuity between the two electrode structures 315C and 315A to create a voltage differential (potential) across the two electrodes, such that when a mechanical wave is incident (i.e., applied force or moment) on the first layer 313 or 313B (i.e., tissue-interfacing layer in an IMD), the compressive stress caused by the applied force or moment propagates through the piezoelectric material 312, which generates electric fields due to dipoles in the material structure causing different electrical potentials at the two electrode structures, resulting an addressable electrical signal across the center electrode 315C and the annular electrode 315A for the IMD.

The circular electrode, cylindrical shape of the example unimorph piezoelectric device 311C shown in FIG. 3C possesses many advantages, including (but not limited to) the capability to provide an even distribution of stress in the materials of the unimorph piezoelectric device 311C, so that there are no "hotspots" which can nucleate fracture/crack propagation; as well as reliability and safety for the unimorph piezoelectric device 311, especially because the example unimorph piezoelectric device 311C is part of a hermetic enclosure for an implantable device, where the circular/cylindrical configuration of the example unimorph piezoelectric device 311C mitigates against potential degradation issues, such as corners that create stress risers and/or nucleation sites for cracks.

Figure 3D:
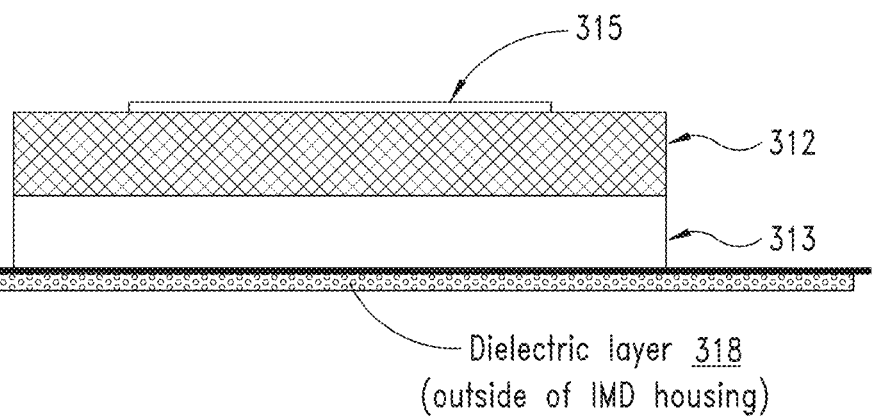
Figure 3E:
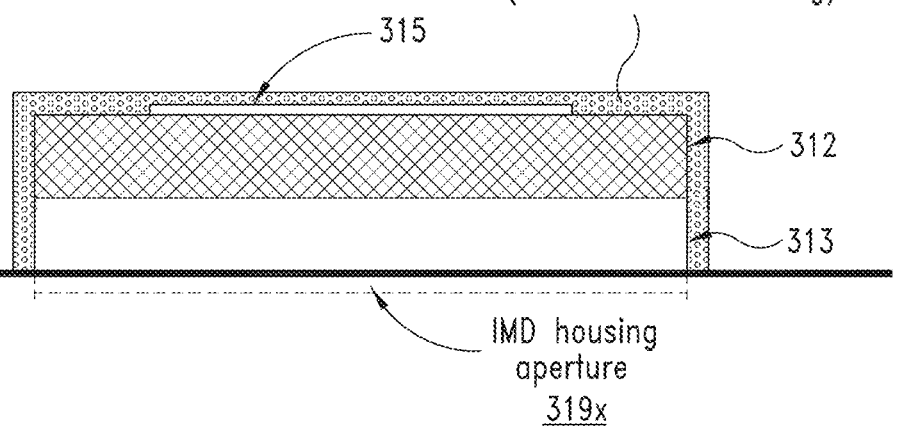

FIGS. 3D and 3E show diagrams depicting example embodiments of the unimorph piezoelectric sensor device 311A, labeled as device 311D and 311E, respectively. As shown in FIG. 3D, the unimorph piezoelectric sensor device 311D includes a dielectric layer 318 configured on the outside of the IMD housing wall 319. For example, the dielectric layer 318 configured on the outside of the IMD housing wall 319 can provide a physical and electrical barrier layer to protect the IMD from corrosion, moisture, contaminants, or others and electrically shield the components of the IMD from the tissue of the body, and vice versa. In some embodiments, for example, the dielectric layer 318 can comprise or be parylene or other biocompatible dielectric material that is chemically inert, configurable as a thin film, and conformable to titanium or other material of the first layer 313 and/or IMD housing wall 319. For example, parylene is a biocompatible dielectric material that can provide a low surface tension and low insertion friction for the dielectric layer 318; and parylene is a material that is relatively inexpensive and readily manufacturable for medical devices. In some example embodiments, the dielectric layer 318 may comprise parylene, alumina ($Al_2O_3$), sapphire (a crystal form of alumina), a urethane, or a silicone, or a combination of any two or more thereof.

As shown in FIG. 3E, the unimorph piezoelectric sensor device 311E includes the dielectric layer 318 configured on the inside of the IMD to encompass the piezoelectric sensing components including the first layer 313, the piezoelectric layer 312, and the second layer 315. In the example shown in FIG. 3E, the first layer 313 is positioned in the unimorph piezoelectric sensor device 311E to be at an aperture 319x of the IMD housing wall 319, where the IMD housing wall 319 is tightly coupled to a portion (e.g., sidewall outer region) of the first layer 313 in order to hermetically seal the piezoelectric sensing components within the enclosure, and where the dielectric layer 318 encompasses the interiorly-exposed surfaces of the first layer 313, the piezoelectric layer 312, and the second layer 315 to restrict their exposure. In some embodiments of the unimorph piezoelectric sensor device (not shown), the IMD does not include the aperture 319x and instead the first layer 313 is tightly coupled to the IMD housing wall 319 (like for the unimorph piezoelectric sensor device 311D), but where the dielectric layer 318 is configured on both (i) the outside of the IMD housing wall 319 (like for the unimorph piezoelectric sensor device 311D) and (ii) the inside of the IMD to encompass the piezoelectric sensing components including the first layer 313, the piezoelectric layer 312, and the second layer 315 (like for the unimorph piezoelectric sensor device 311E).

Figure 3F:
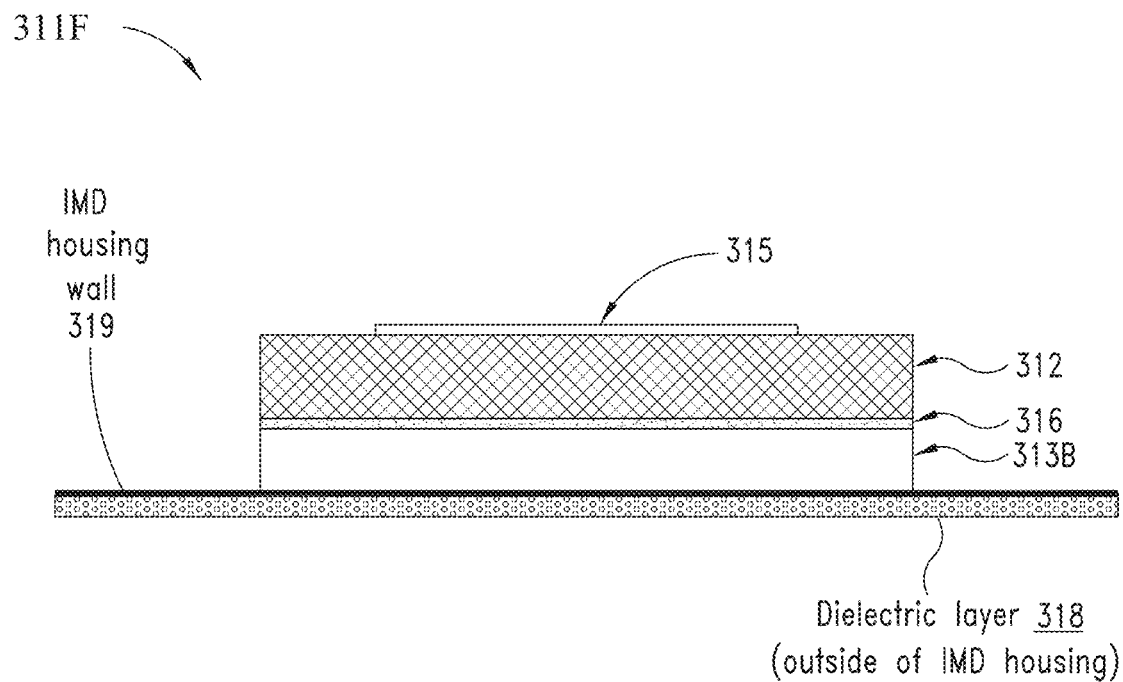
Figure 3G:
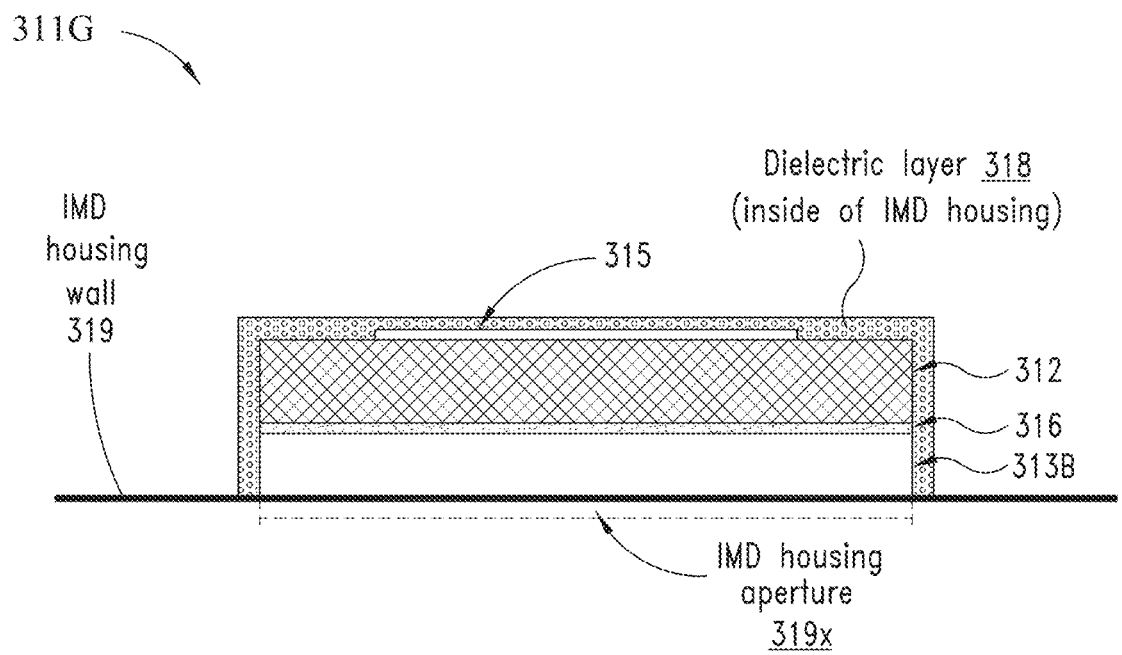

FIGS. 3F and 3G show diagrams depicting example embodiments of the unimorph piezoelectric sensor device 311B, labeled as device 311F and 311G, respectively. As shown in FIG. 3F, the unimorph piezoelectric sensor device 311F includes the dielectric layer 318 configured on the outside of the IMD housing wall 319, in manner like that for the unimorph piezoelectric sensor device 311D of FIG. 3D. And, as shown in FIG. 3G, the unimorph piezoelectric sensor device 311G includes the dielectric layer 318 configured on the inside of the IMD to encompass the piezoelectric sensing components including the first layer 313B, the intermediary layer 316, the piezoelectric layer 312, and the second layer 315, in manner like that for the unimorph piezoelectric sensor device 311E of FIG. 3E. In some embodiments of the unimorph piezoelectric sensor device (not shown), the IMD does not include the aperture 319x and instead the first layer 313B is tightly coupled to the IMD housing wall 319 (like for the unimorph piezoelectric sensor device 311D or 311F), but where the dielectric layer 318 is configured on both (i) the outside of the IMD housing wall 319 (like for the unimorph piezoelectric sensor device 311D or 311F) and (ii) the inside of the IMD to encompass the piezoelectric sensing components including the first layer 313B, the intermediary layer 316, the piezoelectric layer 312, and the second layer 315 (like for the unimorph piezoelectric sensor device 311E or 311G). While not shown, it is understood that the unimorph piezoelectric sensor device 311D or 311F and the unimorph piezoelectric sensor device 311E and 311G can be configured where the piezoelectric layer 312 and the second layer 315 have the same diameter, like the unimorph piezoelectric sensor device 311J and the unimorph piezoelectric sensor device 311K, respectively, shown later in FIGS. 3J and 3K, respectively.

Figure 3H:
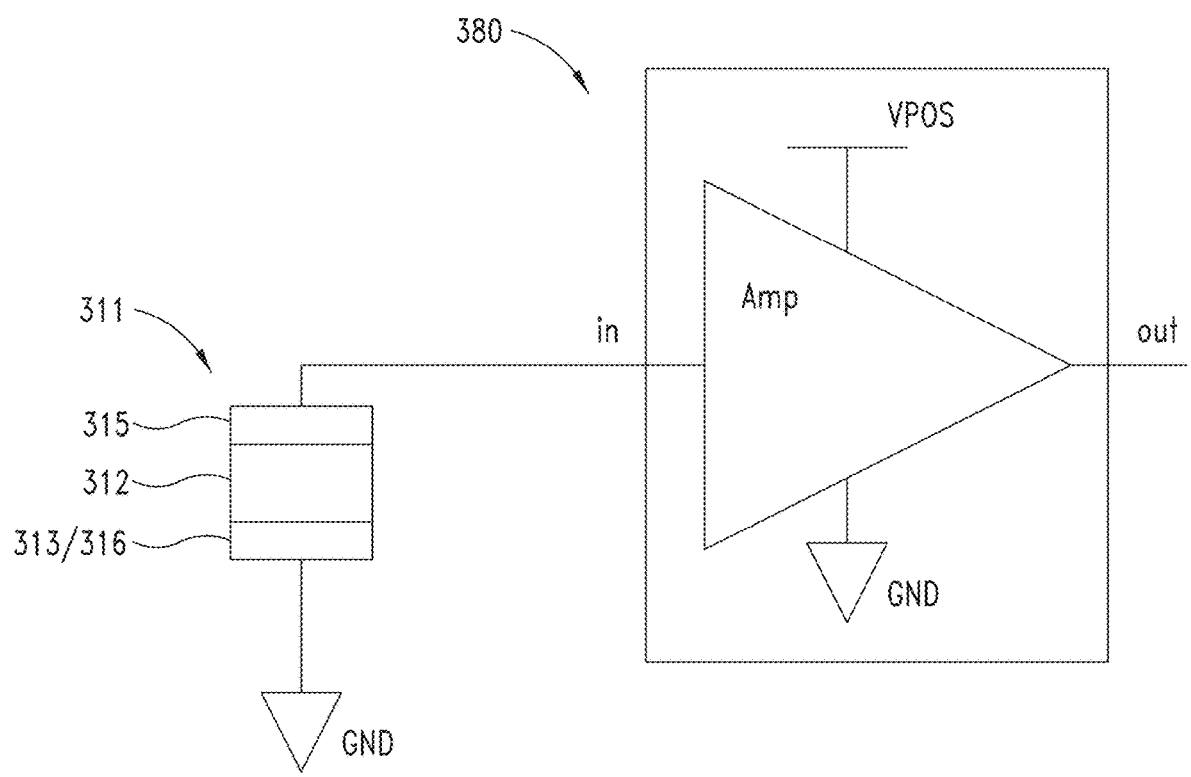
FIGS. 3H and 3I show diagrams depicting example embodiments of an amplifier circuit, in accordance with the present technology, which interfaces with an example embodiment of the unimorph piezoelectric sensor device shown in FIGS. 3A, 3B, 3C, 3D, 3E, 3F, 3G, 3J, and 3K.
Figure 3I:
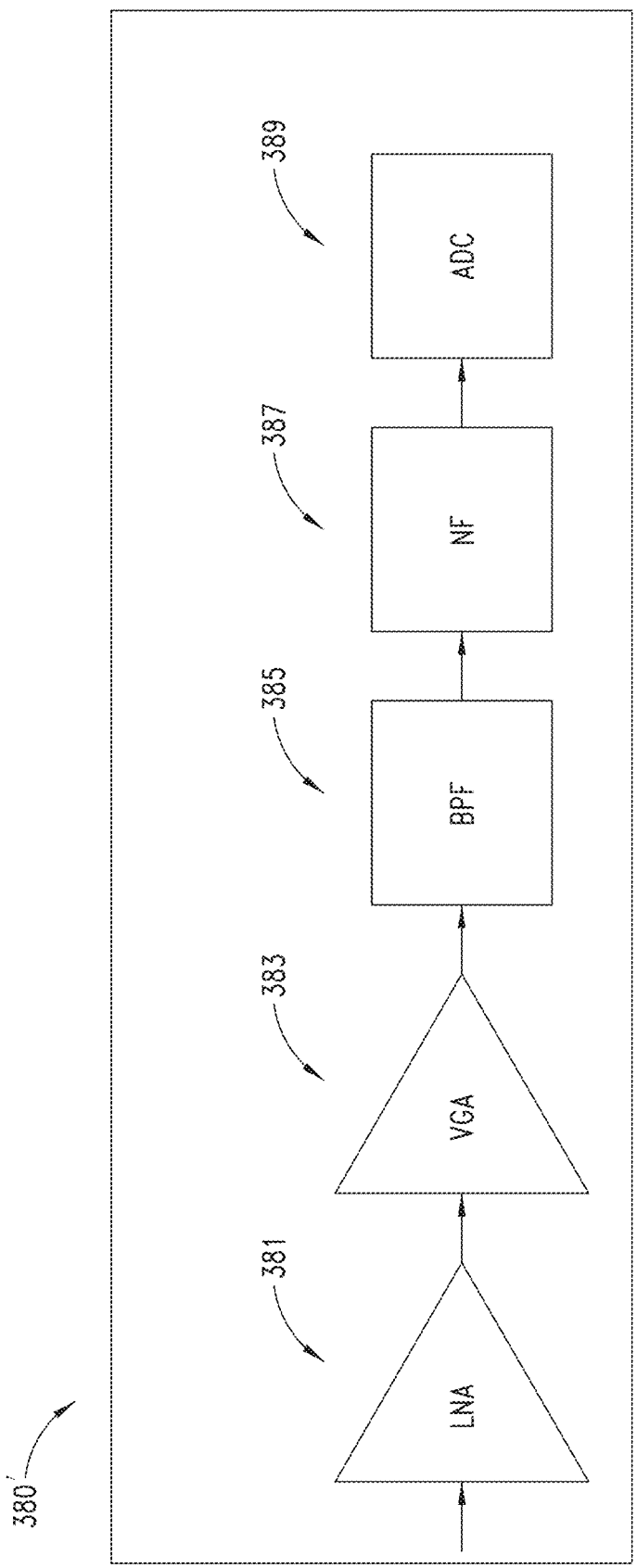

FIGS. 3H and 3I show diagrams depicting example embodiments of an amplifier circuit, in accordance with the present technology, which can be electrically interfaced with an example embodiment of the unimorph piezoelectric sensor device in accordance with the present technology. In some embodiments, the signal conditioning unit 123 of the sensor unit 110 and/or the electronics unit 120 of the stress sensor device 110 (shown in FIG. 1B) may be embodied by the example embodiments of the amplifier circuit shown in FIGS. 3H and 3I.

FIG. 3H shows a block diagram of an amplifier circuit 380 that is electrically interfaced to an example unimorph piezoelectric sensor device, such as the unimorph piezoelectric sensor device 311A, 311B, 311C, 311D, 311E, 311F, 311G, 311J, and 311K shown in FIGS. 3A, 3B, 3C, 3D, 3E, 3F, 3G, 3J, and 3K, respectively. The amplifier circuit includes amplifier configured to amplify the electrical signal provided by the unimorph piezoelectric sensor device for circuit frequency band(s) of the detected physical stress signal (transduced by the unimorph piezoelectric sensor device as the electrical signal output). The amplifier circuit 380 includes an input that is electrically connected to the second layer 315 (e.g., each of the at least one electrically-addressable electrode(s)). Notably, the first layer 313 (for example embodiments like unimorph piezoelectric sensor device 311A and the like) or the intermediary layer 316 (for example embodiments like in unimorph piezoelectric sensor device 311B and the like) can be electrically connected to ground of the amplifier circuit 380 or an independent electrical ground. In some embodiments (not shown), for example, the first layer 313 (for example embodiments like unimorph piezoelectric sensor device 311A and the like) or the intermediary layer 316 (for example embodiments like in unimorph piezoelectric sensor device 311B and the like) can be electrically connected to the input of the amplifier circuit 380, and the second layer 315 (e.g., each of the at least one electrically-addressable electrode(s)) can be connected to the ground of the amplifier circuit 380 or an independent electrical ground. The output of the amplifier circuit 380 is electrically connected to a data processing unit and/or wireless signal communication unit of the IMD 100 to further process the amplified signal, e.g., digitize, data-process, and/or transmit the amplified signal. The amplifier circuit 380 can be configured with one or more operational amplifier (op-amp) circuit components in electrical connection with other circuit components (e.g., resistors, capacitors, inductors, etc.) to create a desired frequency band filter that removes undesired signal components of the transduced electrical signal from the detected physical stress signal. The desired frequency range can be based on the expected frequency of the physical phenomena to be detected by the unimorph piezoelectric stress sensor. For example, in some embodiments, the amplifier circuit 380 can be configured to have a bandpass filter to amplify a pass band signal in a range of 1 Hz to 2 kHz; whereas in some embodiments, the amplifier circuit 380 can be configured to have bandpass filter to amplify a pass band signal in a range of 1 Hz to 5 kHz; whereas in some embodiments, the amplifier circuit 380 can be configured to have a bandpass filter to amplify a pass band signal in a range of 1 Hz to 10 kHz; whereas in some embodiments, the amplifier circuit 380 can be configured to have a bandpass filter to amplify a pass band signal in a range of 10 Hz to 1 kHz; whereas in some embodiments, the amplifier circuit 380 can be configured to have a bandpass filter to amplify a pass band signal in a range of 10 Hz to 10 kHz; whereas in some embodiments, the amplifier circuit 380 can be configured to have a bandpass filter to amplify a pass band signal in a range of 10 Hz to 100 kHz. In some embodiments, the amplifier circuit 380 can be configured to have a bandpass filter to amplify a pass band signal in a range of 1 Hz to 100 kHz.

FIG. 3I shows a circuit diagram of an example embodiment of the amplifier circuit 380, which is configured as a differential amplifier and/or charge amplifier circuit 380'. The exemplary charge amplifier circuit 380' can include at least one of a low noise amplifier (LNA) 381, a variable gain amplifier (VGA) 383, a band-pass filter (BPF) 385, a notch filter (NF) 387, and an analog-to-digital converter (ADC) 389.

In some example embodiments of the charge amplifier circuit 380', the LNA 381 is configured to receive the output of the physical stress sensor 111 (e.g., such as embodiments of the unimorph piezoelectric stress sensor 311A, 311B, 311C, 311D, 311E, 311F, 311G, 311J, 311K, etc.) as the input to the charge amplifier circuit 380', e.g., the raw analog electrical signal transduced by the physical stress sensor 111. In such embodiments, the LNA 381 is electrically coupled to the VGA 383, which is electrically coupled to the BPF 385, which is electrically coupled to the NF 387, which is electrically coupled to the ADC 389. It is understood that in other embodiments, one or more the amplifier and filter units (e.g., LNA 381, VGA 383, BPF 385, and NF 387) can be configured in a different electrical connection arrangement. Yet, in some embodiments, the charge amplifier circuit 380' includes the LNA 381, the ADC 389, the VGA 383, and optionally one or more of the BPF 385, and/or the NF 387. For example, in some embodiments, the LNA 381 in electrical connection with the output of the physical stress sensor 111, and optionally one of the VGA 383 and/or the optional BPF 385, and/or the optional NF 387 is coupled to the output of the LNA 381 (in any sequence of the VGA 383, the optional BPF 385, and/or the optional NF 387), from which the output of the VGA 383 and/or the optional BPF 385 and/or the optional NF 387 is electrically connected to the input of the ADC 389.

The exemplary charge amplifier circuit 380' shown in FIG. 3I can be implemented in the following way. For example, the physical stress sensor 111 produces a transduced electrical signal (output) in response to applied mechanical stress on the physical stress sensor 111 of the IMD 100. The produced electrical signal is received at the LNA 381, which amplifies the electrical signal from stress sensor and is the first stage of the signal conditioning process. In some embodiments, for example, depending on specifications or constraints of the implementation of the physical stress sensor 111, the LNA may be configured as a voltage amplifier with voltage input and amplified voltage output, or may be a charge amplifier with a charge input and voltage output. The low-noise amplified electrical output signal from the LNA 381 is received at the VGA 383. For example, it can be beneficial to have a variable gain amplifier in the signal conditioning process, e.g., particularly one where the gain may be programmable by the user or the gain may be varied automatically, for instance, to keep the output level in a desired range. The variable-gain amplified electrical output signal of the VGA 383 is received at the BPF 385. For example, in some implementations, the BPF 385 provides an audio/acoustic amplifier to the charge circuit amplifier 380' and is configured to band-pass filter its input signal to only allow frequency components within a certain range to pass (e.g., which can be pre-determined) and to block (or at least substantially attenuate) frequency components outside that band. In some examples, the frequency bands to which the BPF 385 will allow can include one or more ranges among, but not limited to, a range of 1 Hz to 10 kHz; a range of 1 Hz to 5 kHz; a range of 10 Hz to 1 kHz; a range of 10 Hz to 10 kHz; a range of 10 Hz to 100 kHz, or a range of 1 Hz to 100 kHz. In some embodiments, the charge amplifier circuit 380' includes the NF 387 to block certain frequency components within the band-passed signal that is the output of the BPF 385. For example, in some implementations, the NF 387 can be configured to block frequencies at substantially 60 Hz and/or at substantially 50 Hz, which may be noise artifacts in some environment(s) of the body of the subject hosting the IMD 100. The output of the BPF 385 (or optional NF 387) is received at the ADC 389, which converts an analog signal (e.g., the electrical signal representative of the detected mechanical stress signal (e.g., audio/acoustic signal)) to a digital electrical signal. In various embodiments, the Nyquist sampling frequency can be set at a frequency of at least 2× the largest frequency of the passed frequency band to ensure full signal preservation in the digitization of the output electrical signal. Examples of the digital sampling frequency can include 200 kHz, 500 kHz, 1 MHZ, 2 MHZ, 5 MHZ, or higher. Whereas, in some examples, the digital sampling frequency can include 2 kHz, 20 kHz, 50 kHz, or higher. In some implementations, for example, preferred data conversion rates of the ADC are typically in the range 1,000-10,000 samples per second, which are suitable for heart and respiratory sound and physical phenomena monitoring, e.g., providing a data resolution between 8-24 bits with preference for 16 bits. The digitized signal output of the exemplary charge amplifier circuit 380' can be transferred to a data processing unit (e.g., microcontroller) of the electronics unit 120 of the IMD 100, e.g., for storage in memory, subsequent data processing (e.g., based on algorithms programmed in the data processing unit), and/or transmission from the IMD 100 to an external device.

FIG. 4 shows diagrams depicting example geometries of example embodiments of the unimorph piezoelectric sensor device of FIG. 3A, labeled as 411 in FIG. 4. The unimorph piezoelectric sensor device 411 includes at least two electrode structures of the second layer 315, shown in the top diagram of FIG. 4 as first electrode 315X and second electrode 315Y, which are separated from the each other by a gap, and are coupled to the piezoelectric material 312 that is coupled to the first layer 313 (e.g., positioned in an IMD's housing to be exposed through an aperture). As depicted in lower diagrams 411A, 411B, and 411C of FIG. 4, the at least two electrodes of the unimorph piezoelectric sensor device 411 can be configured in a variety of geometries and configurations, including but not limited to rectangular, elliptical, and triangular, and can include three or more electrodes.

Exemplary Methods and Data

In some embodiments in accordance with the present technology, there are provided methods for in vivo monitoring of internal mechanical energy, including acoustic energy such as sound, associated with physiological phenomena originating from an anatomic structure within a host. In some embodiments, for example, the methods include monitoring one or more aspects of a body tissue, e.g., body anatomy, physiology, metabolism, and/or function, via an implanted device having a physical stress sensor, including a physical stress sensor as disclosed herein. Monitoring may include, for example monitoring, detecting, measuring, identifying, and/or characterizing one or more of the aspects of a body tissue. The physical stress sensor, optionally with one or more auxiliary sensors, may be incorporated into an implantable device as disclosed herein, such as a mechanical stress sensor device, a piezoelectric sensor device, a unimorph piezoelectric sensor device. The method may include obtaining an internal mechanical energy signal via the implanted physical stress sensor. The method may include processing, via a data processing device, the internal mechanical energy signal, such as measuring the intensity of the internal mechanical energy signal, to produce biomedical data. The method may include using the biomedical data to characterize a status of the host, e.g., to detect a health and/or disease state of the host, to diagnose a health and/or disease state of the host, and/or to quantify a health and/or disease state of the host. Methods in accordance with the present technology, for in vivo monitoring of internal mechanical energy associated with physiological phenomena originating from an anatomic structure within a host, may be described below or elsewhere herein.

In some embodiments, there are provided methods for in vivo monitoring of internal mechanical energy associated with physiological phenomena originating from a heart within a host. The host may be a human. The host may be a non-human mammal, such as a dog, pig or a horse, where optionally the mammal is at least 30 pounds in weight. The method may include obtaining an internal mechanical energy signal from the heart of the host via the implanted physical stress sensor. For example, the device having a physical stress sensor may monitor internal mechanical energy associated with activity of the heart, such as a series of heart beats, i.e., the beating of the heart. The present technology may thus provide a measure of the host's heart rate, which refers to the number of times the heart beats within a certain time period, usually a minute. The measure of the host's heart rate may allow the clinician to know whether the host's heart rate is within the normal range, or whether the heart rate is faster or slower than normal. The present technology may also provide a measure of the regularity of the host's heart beats, e.g., whether the host has regular or irregular heartbeats. The mechanical energy signal may be processed, via a data processing device, to provide biomedical data. The biomedical data may be plotted as shown in, e.g., FIG. 10A and FIG. 10B.

Figure 10A:
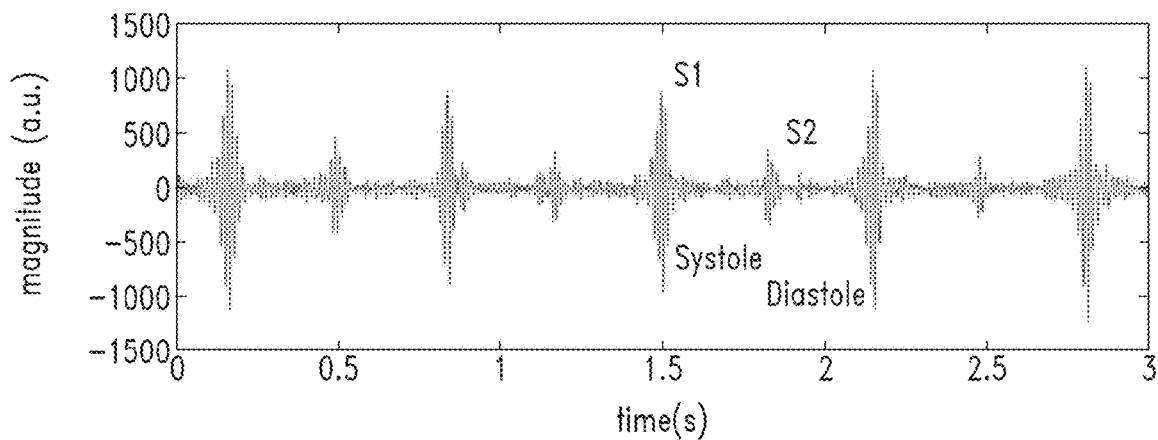
FIG. 10A shows biomedical data, more specifically a time course (x-axis) of an intensity of mechanical energy signals (y-axis) received by a physical stress sensor implanted in the vicinity of the heart of a healthy pig.
Figure 10B:
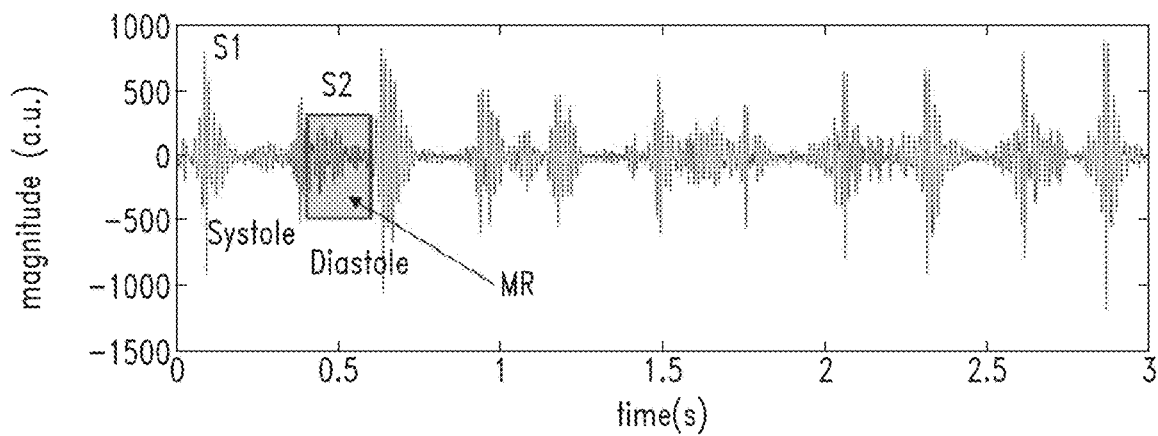
FIG. 10B shows biomedical data, more specifically a time course (x-axis) of an intensity of mechanical energy signals (y-axis) received by a physical stress sensor implanted in the vicinity of the heart of a pig that is experiencing mitral valve regurgitation.

FIGS. 10A and 10B show biomedical data depicting an intensity of mechanical energy signals measured by an example embodiment of an implantable physical stress sensor that was implanted in the vicinity of the heart of a healthy pig for normal heart function (FIG. 10A) and induced mitral valve regurgitation (FIG. 10B).

To obtain the data shown in FIG. 10A, an example embodiment of the mechanical stress sensor of the present technology was implanted into a living pig, in the vicinity of the pig's heart. The y-axis provides the intensity of the mechanical energy signal and the x-axis provides the corresponding time course of measuring the mechanical energy signal. The data shows the cardiac cycle events including the systole and diastole events. Diastole represents ventricular filling, and systole represents ventricular contraction/ejection. The point designated S1 identifies the biological event of mitral/tricuspid valve closure and the point designated S2 identifies the biological event of aortic/pulmonic valve closure.

After obtaining the baseline data of FIG. 10A, the pig host was artificially induced to exhibit mitral regurgitation (MR), also known as mitral valve regurgitation (MVR) or mitral insufficiency. MR is a common heart valve disorder in mammals including humans. When MR is present, blood leaks backwards through the mitral valve when the heart contracts. This reduces the amount of blood that is pumped out to the body. Upon instigation of MR in the host pig, additional mechanical energy signals were obtained over a monitoring period of time. Some of the resulting biomedical data is plotted to provide the image of FIG. 10B. FIG. 10B shows that during the diastole period of the cardiac cycle, the pig's heart is emanating new mechanical energy signals not observed in the baseline environment. These new mechanical energy signals are attributed to the mechanical energy that emanates from the beating heart due to the MR problem, including the blood regurgitation that is occurring by virtue of the malfunctioning of the mitral valve.

Figure 10C:
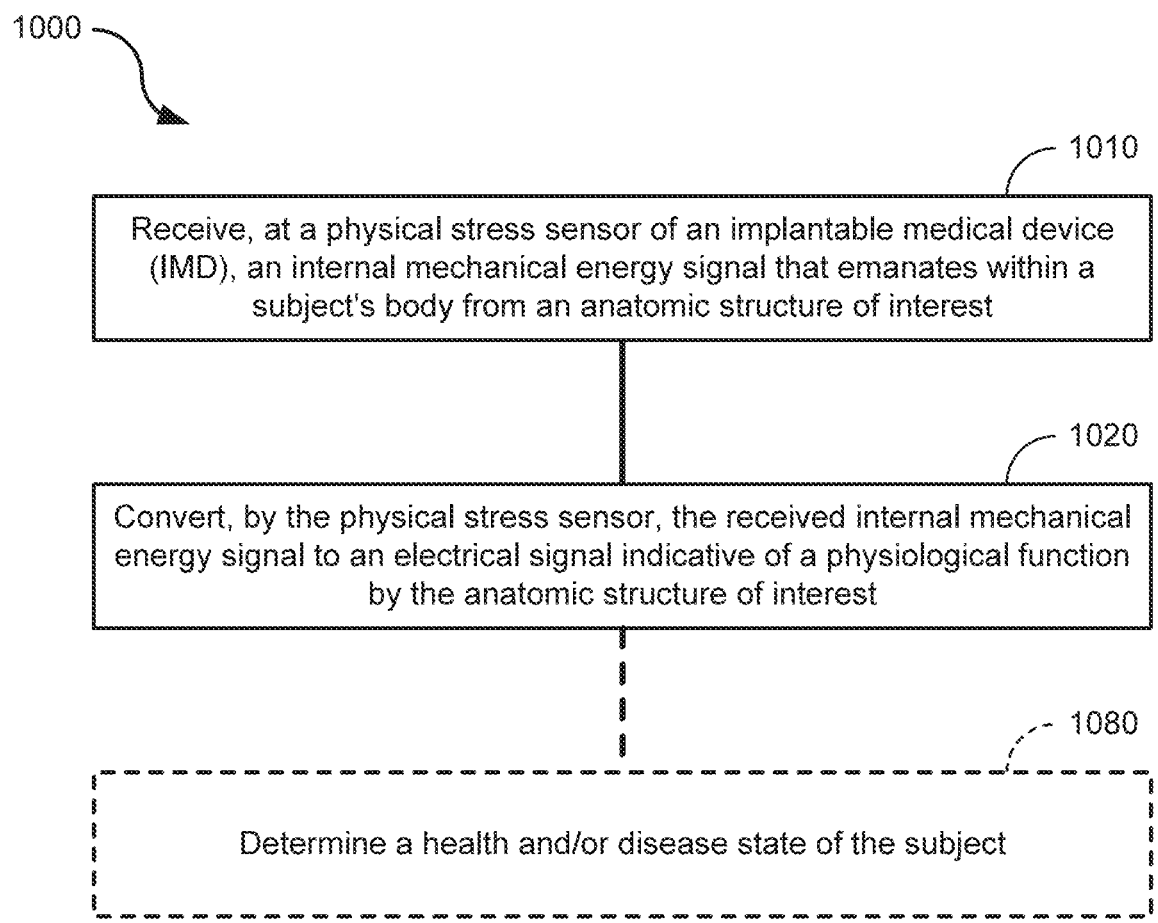
FIG. 10C shows a diagram of an example embodiment of a method for monitoring an anatomic structure of a subject from an implantable medical device, in accordance with the present technology.

FIG. 10C shows a diagram of an example embodiment of a method for monitoring an anatomic structure, such as a blood vessel or multiple blood vessels, the heart, an airway or multiple airways, and/or the lung(s) of a subject, from an implantable medical device, in accordance with the present technology, including but not limited to IMD 100, 200, 1200, 1300, or other embodiments disclosed herein. The method 1000 includes a process 1010 to receive, at a physical stress sensor of an IMD, an internal mechanical energy signal that emanates within the subject's body from the anatomic structure of interest. The method 1000 includes a process 1020 to convert, by the physical stress sensor, the received internal mechanical energy signal to an electrical signal indicative of a physiological function by the anatomic structure of interest. In various example implementations, the anatomic structure of interest includes a heart of the subject, a lung or lungs of the subject, or both the heart and the lung or lungs of the subject. In various example implementations, the method 1000 detects an acoustic signal (e.g., sound) generated from an event or events associated with the anatomic structure of interest that is measured by the physical stress sensor.

In some embodiments of the method 1000, the method 1000 may include (optionally) a process 1080 to determine a health and/or disease state of the subject. For example, the method can be implemented to detect a fluid turbulence within or proximate of the anatomic structure. In some examples, the fluid turbulence includes at least one of a breathing turbulence or blood flow turbulence as blood travels through the heart or a blood vessel of the subject. For example, the method can be implemented to detect a tissue contact of the anatomic structure. In some examples, the tissue contact includes closing of a heart valve or at least two heart valves closing. For example, the method can be implemented to detect a blood flow through a lesion caused by a restenosis of a blood vessel. In various implementations of the method 1000, for example, the process 1080 to determine the health and/or disease state of the subject can include data-processing the electrical signal indicative of the physiological function for the subject into an individual data set; and comparing the individual data set of the subject with a standard reference data set of a population of subjects (e.g., standard clinical study data) to identify the health and/or disease state, e.g., by correlating the individual data set or at least a portion of the individual data set with the standard reference data set or at least a portion of the standard reference data set associated with one or more classification(s) of a health state or a disease state.

In some embodiments of the method 1000, the method 1000 may include (optionally), implemented prior to the process 1010, a process to provide the IMD that comprises the physical stress sensor to a region within the subject's body, wherein the IMD is positioned proximate to the anatomic structure of interest in the subject's body. In some implementations, for example, the IMD is positioned to be coupled to the anatomic structure of interest or is positioned within 50 mm or less of the anatomic structure. In some implementations, for example, the IMD is positioned within 0.5 cm or more from the anatomic structure. In some example implementations, the region can include a subcutaneous space or pocket under the skin. In some example implementations, the IMD is positioned within the subcutaneous space or pocket under the skin above a pectoralis major muscle near the subject's heart. In some examples, the process 1010 can include implanting the IMD in the subcutaneous space or pocket under the skin above the pectoralis major muscle near the subject's heart by making an incision in the skin near but not at the target position site and inserting the IMD about 1 cm or so past the incision and at a sub-centimeter depth under the skin. For example, the process to provide the IMD to the subcutaneous space or pocket under the skin can be an outpatient procedure performed under one hour or under two hours, e.g., which may require a single incision of 1-2 cm or less, only local anesthesia (i.e., injection of a fluid anesthetic within an inch of the incision site), and some stiches or bandages to close the incision. The rigid structural design of the physical stress sensor (e.g., example embodiment of the unimorph piezoelectric sensor 311) and the IMD overall allows for the IMD to be implantable at various subcutaneous locations of the subject's body because the structural rigidity of the physical stress sensor and IMD ensure safety to the subject from potential, unintended damage (e.g., ability to withstand external or internal forces and preserve structural integrity) while effectively carrying out its intended sensing monitoring functions.

Figure 11:
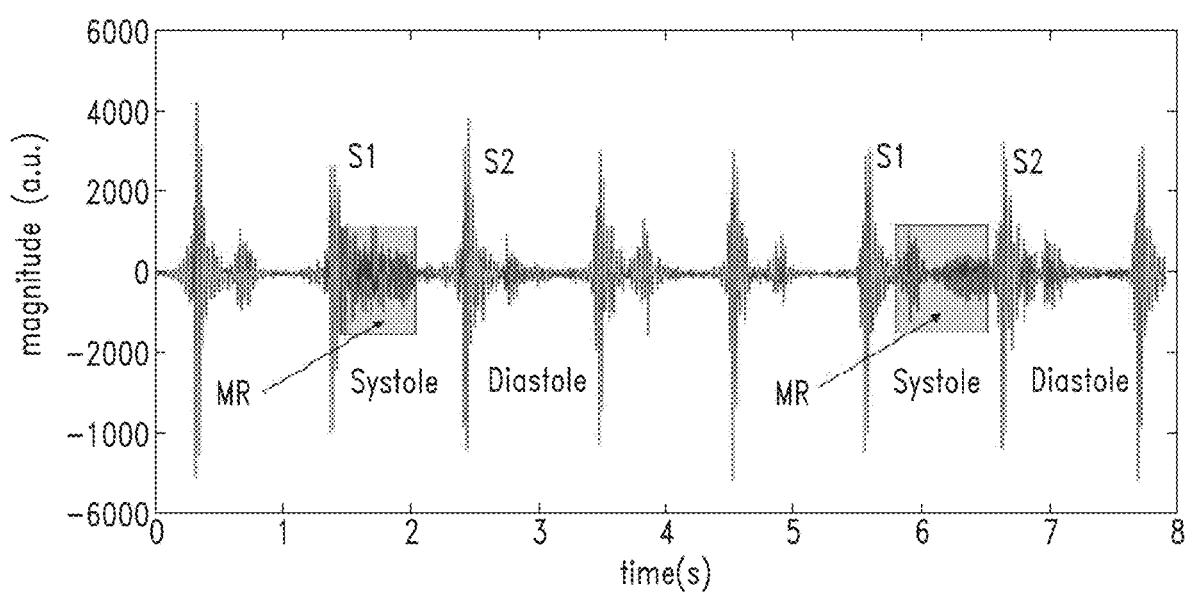
FIG. 11 shows biomedical data, more specifically a time course (x-axis) of an intensity of mechanical energy signals (y-axis) received by a physical stress sensor implanted in the vicinity of the heart of a human who is experiencing mitral valve regurgitation.

FIG. 11 shows biomedical data derived from the mechanical energy signals that were received by an exemplary mechanical stress sensor of the present technology having a physical stress sensor, e.g., IMD 200. The mechanical stress sensor was implanted into a human who had been previously diagnosed with, and was soon to receive surgical treatment for, MR. The data plotted in FIG. 11 shows a similar time pattern of mechanical energy signals as compared to the biomedical data plotted in FIG. 10B, thereby depicting the detectability of a heart abnormality or heart disease state, like MR, by the example in vivo mechanical stress sensor for a human subject. The data of FIG. 11 shows the presence of mechanical energy signals emanating from the host's heart that are attributed to the malfunctioning of the mitral valve, in analogy to the data of FIG. 10A and FIG. 10B. The exemplary data shown in FIGS. 10B and 11 demonstrating highly sensitive, discernable biological stress signals of the respective subject's heart function (e.g., MR of the heart) utilized an example embodiment of an implantable unimorph piezoelectric stress sensor (e.g., the unimorph piezoelectric stress sensor 311B) in compilation with an external ECG monitor worn by the subject. Yet, in some embodiments of the IMD 100, the ECG sensor can be integrated in the device housing 101 (e.g., as at least one of the one or more auxiliary sensor(s) 119) of the IMD 100 to simultaneously detect electrocardiogram data of the heart while the exemplary physical stress sensor 111 detects mechanical signals (e.g., acoustic signals) indicative of heart function (e.g., blood flow, valve performance, etc.) of the heart and indicative of respiration (e.g., free and/or obstructive air flow) of the lungs and airways.

IMD with Stress-Mediated Sensor and ECG

Figure 12:
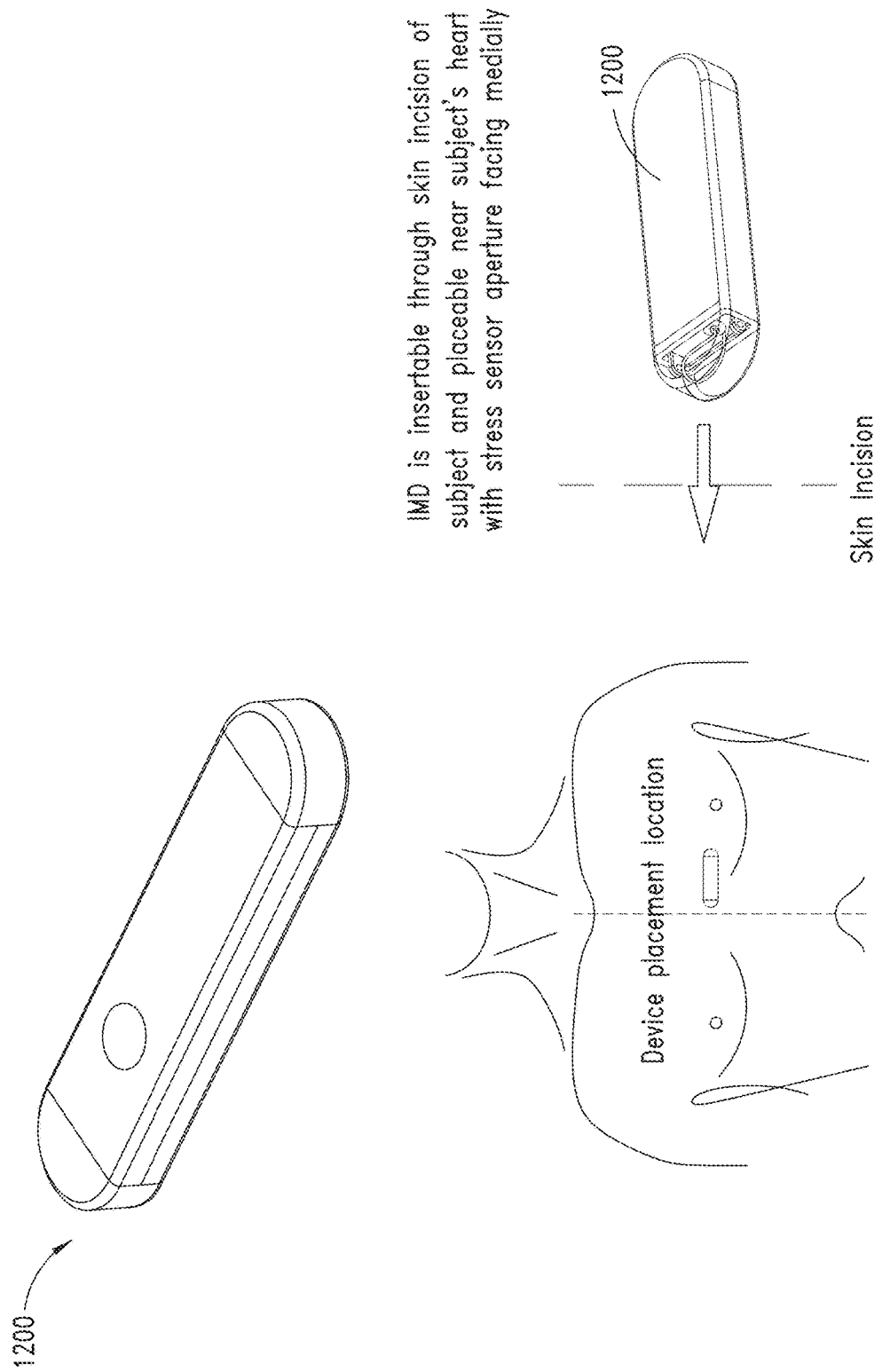
FIG. 12 shows an illustration of the example embodiment of the IMD including an exemplary physical stress sensor and auxiliary electrocardiogram (ECG) sensor, in accordance with the present technology, to continuously measure mechanical energy signals and electrophysiological signals of the cardiovascular system and/or the pulmonary system in human and non-human subjects.

FIG. 12 shows an illustration of the example embodiment of the IMD 100, labeled IMD 1200 in the drawing, to measure mechanical energy signals and electrophysiological signals (i.e., ECG) of the cardiovascular system (e.g., the heart and major arteries and veins) and/or the pulmonary system (e.g., the lungs and airways) in human and non-human living subjects. In some implementations, for example, the IMD 1200 is configured to continuously measure mechanical energy signals and electrophysiological signals (i.e., ECG) of the cardiovascular system and/or the pulmonary system in human and non-human living subjects; whereas, in some implementations, for example, the IMD 1200 is configured to periodically or intermittently measure mechanical energy signals and electrophysiological signals (i.e., ECG) of the cardiovascular system and/or the pulmonary system in human and non-human living subjects. In some implementations of the IMD 1200, for example, the IMD 1200 can be implanted subcutaneously in the chest area of the subject, e.g., which enables the implantation of the IMD 1200 to be in a non-hospital clinic, such as the primary care physician clinic of the subject. For instance, the IMD 1200 can be inserted through a single skin incision of the subject and placed near the subject's heart (under the skin but above skeletal tissue), in which the IMD 1200 is oriented during implantation to have the exemplary physical stress sensor 111 facing toward the subject's heart. The sensor unit and electronics unit of the IMD 1200 are hermetically-sealed within a housing of the IMD 1200. In various examples of the IMD 1200, the entirety or at least a portion of the hermetically sealed IMD 1200 can be coated in a dielectric material, e.g., parylene, in a manner discussed above with respect to the exemplary unimorph piezoelectric stress sensors. Example embodiments of the IMD 1200 are shown in FIGS. 13A and 13B.

Figure 13A:
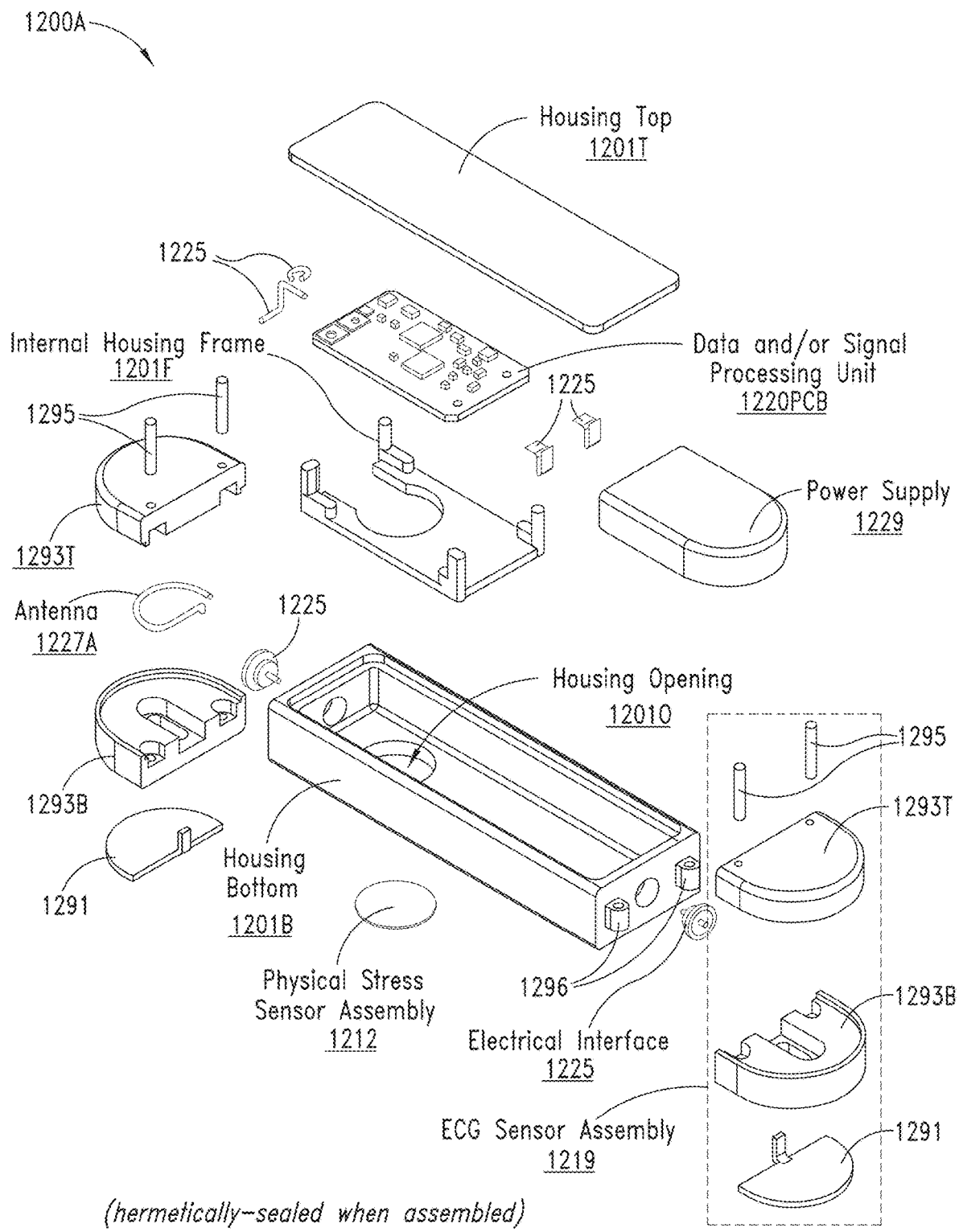
FIGS. 13A and 13B show exploded diagrams of example embodiments of the IMD shown in FIG. 12.
Figure 13B:
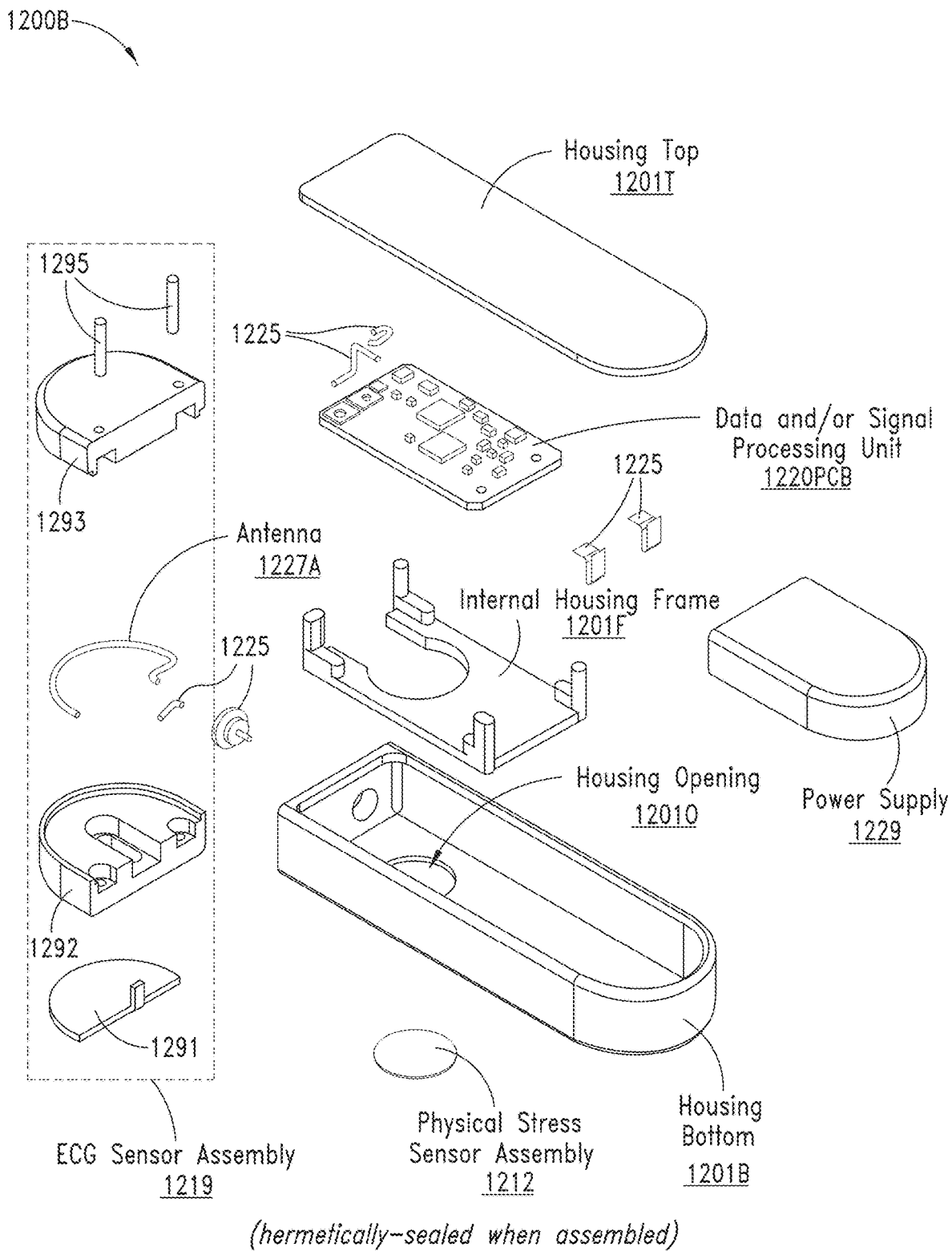

FIG. 13A shows an exploded view of an example embodiment of the IMD 1200, labeled IMD 1200A in FIG. 13A, featuring components of an example embodiment of the physical stress sensor 111 (e.g., unimorph piezoelectric stress sensor 311A, 311B, 311C, 311D, 311E, 311F, 311G, 311J, 311K, etc.) and an example embodiment of the electronics unit 120, which are hermetically-sealed within a housing 1201. In some embodiments, for example, the housing 1201 of the IMD 1200A includes a chamber enclosed by a housing top 1201T and a housing bottom 1201B. In some embodiments of the IMD 1200A, for example, a physical stress sensor assembly 1212 of the example physical stress sensor 111 is configured at a housing opening 1201O of the housing bottom 1201B to position the physical stress sensor assembly 1212 at a location of the IMD 1200A able to receive mechanical energy indicative of the anatomy of interest where the IMD 1200A is implanted. For example, in some embodiments of the example physical stress sensor 111, the physical stress sensor assembly 1212 includes a piezoelectric material and at least one electrically-conductive non-piezoelectric, biocompatible material coupled to the piezoelectric material to receive the transduced electrical signals generated upon applied stress to the example physical stress sensor 111 that is received by the piezoelectric material. In some embodiments, for example, the at least one electrically-conductive non-piezoelectric, biocompatible material is positioned on an interior-facing side of the piezoelectric material and configured at the housing opening 1201O of the housing bottom 1201B. In some embodiments, for example, the IMD 1200A includes an internal housing frame 1201F to at least partially encase the physical stress sensor assembly 1212 to position and orient the physical stress sensor assembly 1212 in the housing 1201.

The IMD 1200A includes an example embodiment of the electronics unit 120. In some embodiments, the example electronics unit 120 of the IMD 1200A includes a data and/or signal processing unit 1220PCB, which can be embodied by any of the exemplary embodiments of the data processing unit 121 and/or the optional signal conditioning unit 123, respectively, disclosed herein. In the example shown in FIG. 13A, the data and/or signal processing unit 1220PCB includes a processor coupled to a memory which receives digital signal data from a signal processing circuit, all mounted on a printed circuit board (PCB). In some example embodiments, for example, the signal processing circuit includes a differential amplifier and/or charge amplifier (like that shown in FIG. 3I, for example) to amplify the electrical signals received from the example physical stress sensor 111 (e.g., a unimorph piezoelectric stress sensor, such as from the at least one electrically-conductive non-piezoelectric material) via the electrical interface component(s) 1225 that connect the example physical stress sensor 111 to the example electronics unit 120). In some example embodiments, for example, the data and/or signal processing unit 1220PCB includes an analog-to-digital (A/D) converter to digitize the electrical signals. In some example embodiments, for example, the signal processing circuit includes filter circuit(s) to remove signal outside frequency range(s) of non-interest, which can include low-pass, bandpass, and/or high-pass filters, e.g., to improve signal-to-noise ratio of the detected mechanical energy signal of interest. The exemplary data and/or signal processing unit 1220PCB can be programmable for some embodiments. In some embodiments, for example, the data and/or signal processing unit 1220PCB can be secured and/or positioned within a chamber of the housing bottom 1201B by the example internal housing frame 1201F.

In some embodiments, for example, the IMD 1200A may optionally include an inertial measurement unit (IMU) to monitor motion (in multiple degrees of freedom) and/or determine an orientation of the IMD 1200A (and thereby of the example embodiment of the physical stress sensor 111 in the IMD 1200A). The IMU is configured in electrical communication with the electronics unit 120 via the electrical interconnection(s), e.g., in communication with the exemplary embodiments of the data processing unit 121 and/or the optional signal conditioning unit 123. In some embodiments, the IMU can be configured on the printed circuit board of the data and/or signal processing unit 1220PCB (not shown). In some embodiments, for example, the IMU can include an accelerometer and/or a rotational rate sensor (e.g., gyroscope) to monitor patient motion and/or position. In some embodiments, for example, the IMU can include a magnetometer.

In some embodiments, for example, the IMD 1200A may optionally include at least one of the secondary sensor(s) 119. For instance, in some embodiments, the IMD 1200A may include a temperature sensor to measure the temperature (e.g., core body temperature) in the region proximate the location where the IMD 1200A is deployed, which can monitor changes in core body temperature such as between the host resting, active (e.g., exercise), and sleeping. In some embodiments, the IMD 1200A includes a separate step counter sensor (e.g., comprising at least one accelerometer and/or one or more rotational rate sensors) that is separate from an exemplary (optional) IMU of the IMD 1200A. Yet, in some embodiments, the IMD 1200A can utilize the (optional) IMU to track steps or otherwise serve as a step counter of the host. In some embodiments, the IMD 1200A may include an analyte sensor to measure a parameter (e.g., concentration) of an analyte in the region proximate the location (e.g., surrounding tissue) where the implantable stress sensor device 100 is deployed within the host, such as at or proximate the heart, lungs and/or gastrointestinal tract. In some embodiments, the IMD 1200A may include a pH sensor to measure the pH level in the region proximate the location where the IMD 1200A is deployed.

The electronics unit 120 of the IMD 1200A includes a power supply 1229 electrically connected, via components (e.g., wires or other connectors) of the electrical interface 1225, to the data and/or signal processing unit 1220PCB and other components of the electronic unit 120 (or other unit(s) of the IMD 1200A, such as some embodiments of the physical stress sensor 111, when electrical power is needed to be supplied to such units). The power supply 1229 can be embodied by any of the exemplary embodiments of the power supply 129 disclosed herein. For example, the power supply 1229 can include a battery (e.g., primary or rechargeable), fuel cell, or other power source to supply power to the components of the electronics unit 120 (and, optionally, the physical stress sensor 111). In some example embodiments, for example, the power supply 1229 can be an electrical receiving port to receive a wire that can supply the IMD 1200A from a remote power source, e.g., such an implantable (in vivo) power supply (e.g., a battery associated with one or more other implanted medical device(s)) and/or a wearable (in vitro) power supply (e.g., a battery worn by the user with the wire connecting the battery to another in vivo device implanted into the body of the patient).

Figure 17:
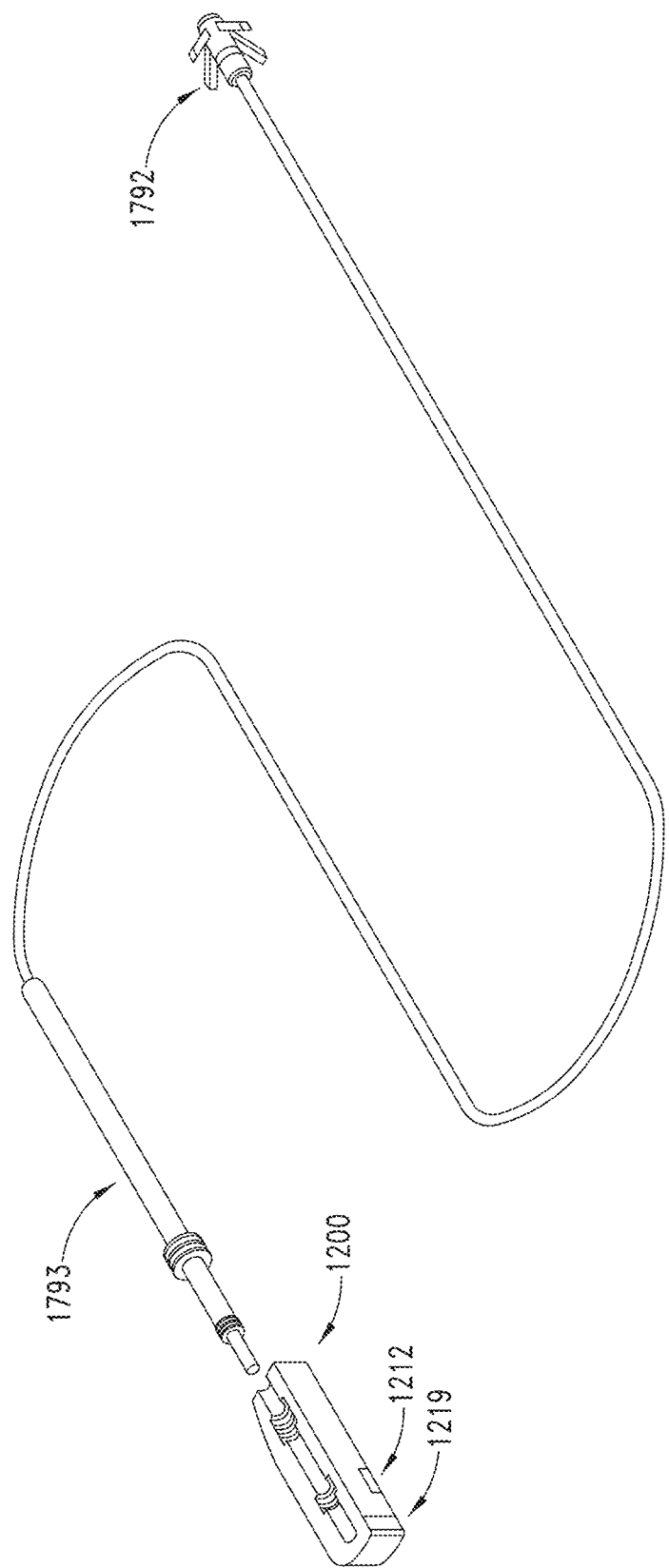
FIG. 17 shows a diagram of an example embodiment of an IMD, in accordance with the present technology, which electrically interfaces with a remote power source via a wire or cable.

FIG. 17 shows a diagram of an example embodiment of an example embodiment of the IMD 1200 with a wire or cable 1793 (e.g., having biocompatible and electrically shielding cover) to be in wired communication with a remote power source (not shown) via terminal 1792 of the wire or cable 1793.

Referring back to FIG. 13A, in some embodiments of the IMD 1200A, for example, the example electronics unit 120 includes a wireless communications unit that includes an antenna 1227A, which is electrically connected, via components (e.g., wires or other connectors) of the electrical interface 1225, to the data and/or signal processing unit 1220PCB and other components of the wireless communications unit of the electronic unit 120 (or other unit of the IMD 1200A, such as some embodiments of the physical stress sensor assembly 1212, e.g., for transmitting raw electrical signals transduced by the sensor). The wireless communication unit of the IMD 1200A can include a wireless transmitter, receiver, and/or transceiver device, e.g., which can include antenna 1227A, which is capable of communicating with an external device to communicate raw, partially-processed, or fully-processed data from the data and/or signal processing unit 1220PCB. For example, the wireless communications unit can be configured to manage the communication protocol for transmission or reception via the antenna 1227A. The wireless communication unit can be embodied by any of the exemplary embodiments of the wireless communication unit 127 disclosed herein. Examples of the antenna 1227A can include, but are not limited to, a whip antenna, a loop antenna, a chip antenna, a planar inverted F antenna (PIFA), a bipolar antenna, and/or a conformal antenna.

The IMD 1200A includes a plurality of ECG sensor assemblies, with a first ECG sensor assembly 1219 configured on a first end of the housing 1201 and a second ECG sensor assembly 1219 configured on a second end of the housing 1201, which is separated from the first ECG sensor assembly 1219 by a distance of at least the length of the housing bottom 1201. Each ECG sensor assembly 1219 includes an end case having an end case housing top 1293T and an end case housing bottom 1293B that are joinable together and which position an ECG electrode 1291 with respect to the end case. For instance, in some embodiments, the ECG electrode 1291 is configured on a side of the IMD 1200A that is the same side as the housing opening 1201O where the physical stress sensor assembly 1212 is positioned. In the example shown in FIG. 13A, for each ECG sensor assembly 1219, the ECG electrode 1291 is configured to couple with an outward-facing portion of the end case housing bottom 1293B such that it (i) exposes at least a portion of the surface of the ECG electrode 1291 to the outer environment of the IMD 1200A and (ii) is electrically connected, via components (e.g., wires or other connectors) of the electrical interface 1225, to be in electrical communication with the data and/or signal processing unit 1220PCB.

In some embodiments, for example, like that shown in FIG. 13A, the end case housing top 1293T and the end case housing bottom 1293B are both joined together and connected to the end portions of the housing bottom 1201B via connection pins 1295, e.g., which connection pins are able to be retained in protrusion channels 1296 rigidly connected to the outer wall of the housing bottom 1201B. In some embodiments of the ECG sensor assembly 1219, like that shown in FIG. 13A, the antenna 1227A can be housed, at least partially, in a region within the ECG sensor assembly 1219, e.g., such as a cavity between the end case housing top 1293T and the end case housing bottom 1293B. For example, the IMD 1200A may be configured such that only one of the plurality of ECG sensor assemblies includes the antenna 1227A in one of the end cases; whereas in other examples, the IMD 1200A may include two antennas 1227A each housed in the end case structures of the respective ECG sensor assembly 1219 for the plurality of ECG sensor assemblies.

The example ECG sensor assembly 1219 is operable to measure an electrical signal (e.g., spike) corresponding to the electrophysiological signals of the cardiac muscle tissue for controlling the patient's heartbeat, where the spikes give rise to the ECG signal of the host. For example, the IMD 1200A, having both an example embodiment of the physical stress sensor 111 and an example embodiment of an ECG sensor (e.g., the ECG sensor assembly 1219), the IMD 1200A is capable of estimating the pulmonary arterial pressure (PAP) of the host when implanted in the host near the host's heart (e.g., in a subcutaneous region of the host's chest area). For instance, the physical stress sensor of the IMD 1200A is responsive to, i.e., can detect, mechanical waves generated by the host's heart as it proceeds through the aortic (A2) and the pulmonary (P2) components of the second heart sound (S2); and, simultaneously, the ECG sensor collects ECG data that is used to identify the S2 region of the data obtained from the stress sensor. That detection of A2 and P2 allows for the data from the device to be used to determine the A2-P2 splitting interval (S1), i.e., the time interval between the A2 and the P2, which is recognized to be a useful parameter for estimating the PAP.

In the example IMD 1200A, the ECG sensor assembly 1219 includes two ECG electrodes 1291 configured at opposing ends of the IMD housing (e.g., housing bottom 1201B). Yet, it is understood that the ECG sensor assembly 1291 can be configured with a single ECG electrode 1291, as shown and discussed in another embodiment of the IMD 1200 shown in FIG. 13B (i.e., IMD 1200B).

FIG. 13B shows an exploded view of another example embodiment of the IMD 1200, labeled IMD 1200B in FIG. 13B. The IMD 1200B is configured similarly (e.g., includes the same or similar features) to the IMD 1200A, but with only one ECG sensor assembly 1219 configured on one end of the IMD 1200B, e.g., the end closest to the housing opening 1201O.

The disclosed devices, systems, and methods for in vivo monitoring of internal mechanical energy can be advantageous over conventional devices, systems, and techniques, e.g., including but not limited to the continuous and multi-situational data (e.g., data from the patient at rest, at activity (e.g., exercise), and during sleep); the elimination of patient participation or compliance in the in vivo monitoring process; by the access to otherwise difficult or impossible signal data to acquire, and by improved the signal detection parameters themselves, such as signal resolution, signal-to-noise quality, etc.

Thus, the present technology provides methodology for in vivo monitoring of internal mechanical energy associated with physiological phenomena originating from an anatomic structure within a host, comprising: measuring, via an implantable medical device of the present technology, an internal mechanical energy signal; processing, via a data processing device, the measured internal mechanical energy signal to produce biomedical data; and using the biomedical data to diagnose and/or detect and/or quantify a health and/or disease state of the host, where the physiological phenomena is beating and the anatomic structure is the heart, which may also be referred to as periodic systole and diastole, the host is a mammal, and the health state of the host is mitral regurgitation (MR).

In some embodiments there are provided methods for in vivo monitoring of internal mechanical energy associated with physiological phenomena originating from a lung within a host, where the physiological phenomena may be expansion and contraction of the lung volume, e.g., breathing, and the host is a mammal.

For example, in conventional phonocardiography, a physician will target stethoscope placement based on the organ of interest, such as the chest for heart auscultation and the back for lungs auscultation to obtain the best, discernable audio signal to listen to the patient's heartbeat and breathing, respectively. Yet, with the IMD in accordance with the present technology, both the heart and the lungs acoustic data can be captured and analyzed from a single implant location.

In some implementations, for example, an example embodiment of the IMD 100 that is implanted in the subject near the subject's heart can isolate the subject's respiratory acoustic signature, e.g., from raw data acquired by the example physical stress sensor 111 of the IMD that is filtered by an example embodiment of the signal conditioning unit 123 (e.g., charge amplifier 380') for higher frequency data, e.g., in the 256-512 Hz band. For example, the exemplary filter(s) of the signal conditioning unit 123 (e.g., charge amplifier 380') can remove signal from most of the cardiac signature, while maintaining the respiratory signature, even with an implant placed on the chest. For example, in some implementations, the raw data can be filtered for both the cardiac signature and the respiratory signature in parallel, allowing for simultaneous monitoring from a single implantable device.

Example implementations of dual cardiac signature and respiratory signature monitoring were experimented with an example embodiment of the IMD 100 including an exemplary physical stress sensor 111 (e.g., unimorph piezoelectric stress sensor 311A), which was implanted in the subcutaneous space on the chest of a pig and (as a control) also implanted in a subcutaneous space on the back in the pig to identify and characterize the respiratory signal.

Figure 14:
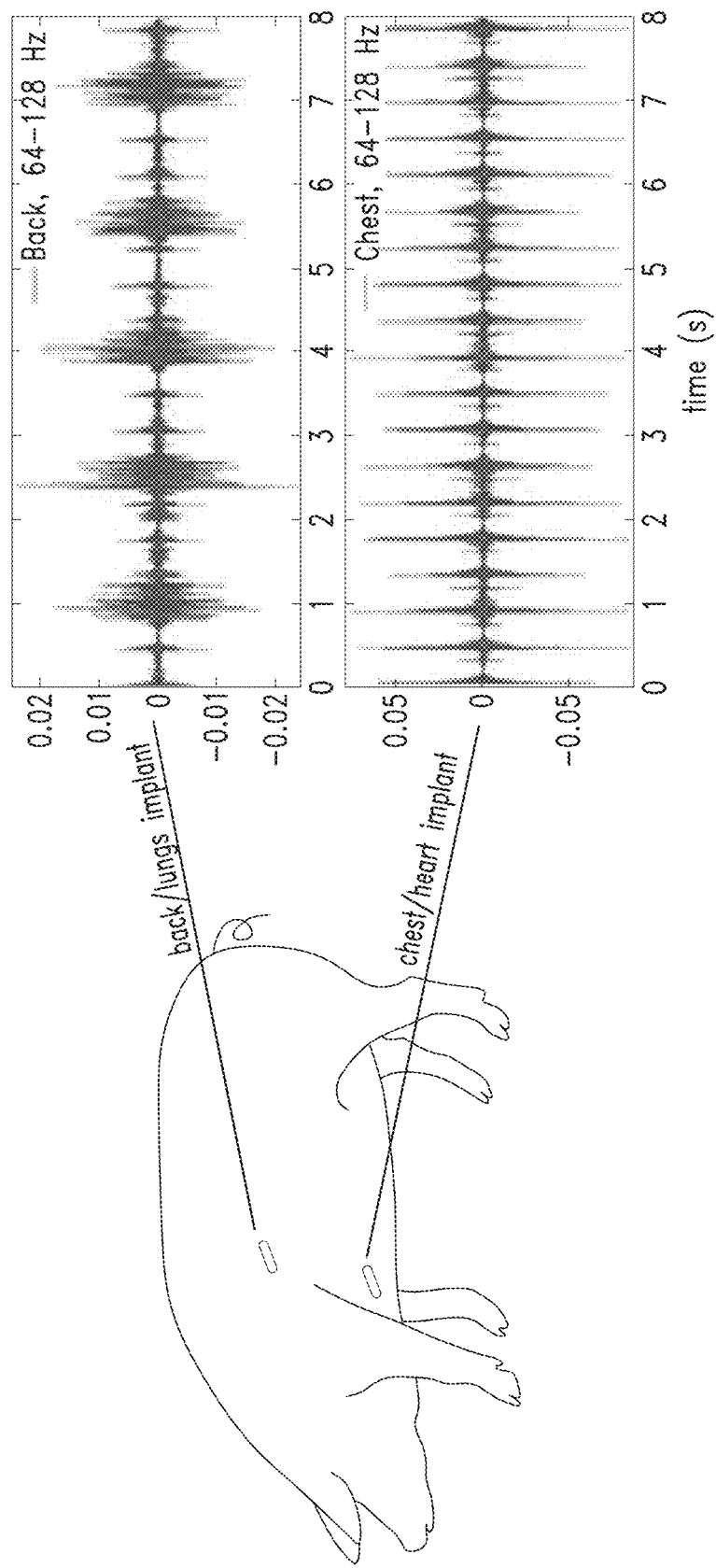
FIG. 14 shows a diagram and example data of example embodiments of multiple IMDs, in accordance with the present technology, implanted in subcutaneous spaces on the back and on chest area of the subject.

FIG. 14 shows a diagram and example data of example embodiments of the IMD 100 implanted in subcutaneous spaces on the back and on chest area of the subject (e.g., pig). The example data in FIG. 14 shows that the exemplary IMD 100 on the back (top) captured primarily respiratory data in a 10 Hz to 1,000 Hz frequency range (e.g., particularly in the 64-128 Hz frequency band for the particular exemplary implementation corresponding to FIG. 114), and the exemplary IMD 100 on the chest (bottom) captured primarily cardiac data in the same frequency band. The IMD 100 can be implemented to capture respiratory data in a 10 Hz to 2,000 Hz frequency range for some exemplary applications, particularly when investigating respiratory phenomena associated with higher frequency respiratory signals. The IMD 100 can be implemented to capture cardiac data in a 10 Hz to 1,000 Hz frequency range (e.g., 16 Hz to 128 Hz for heartbeats).

Figure 15A:
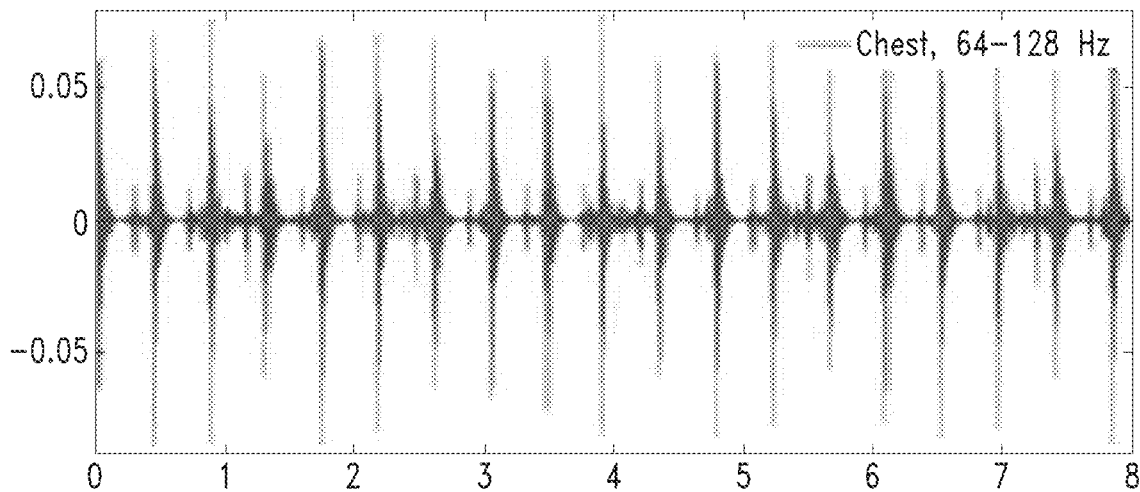
FIGS. 15A and 15B show data plots depicting example data of an example embodiment of the IMD, in accordance with the present technology, that was implanted in only the chest region of a subject and used to capture data indicative of both cardiac signals and respiratory signals of the subject.
Figure 15B:
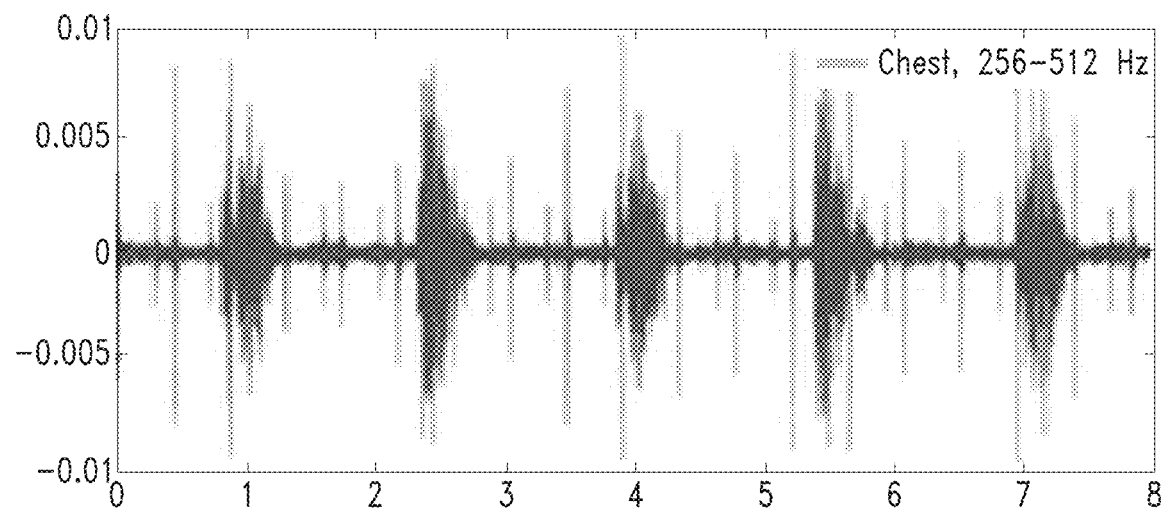

FIGS. 15A and 15B show data plots depicting example data of an example embodiment of the IMD 100 implanted just in the chest region of the subject (e.g., pig), which was used to capture data indicative of both the cardiac signals and the respiratory signals of the pig. For example, the IMD 100 can be configured to determine both cardiac and respiratory signals from the single IMD 100 implanted in the chest region. As demonstrated by the example data in FIGS. 15A and 15B, the signal from the implant on the pig's chest can be filtered for the cardiac signal (e.g., 64-128 Hz frequency band, shown in FIG. 15A) and for the respiratory signal (e.g., 256-512 Hz frequency band, shown in FIG. 15B). For example, by filtering the raw signal from the chest implant to the higher frequency (e.g., 256-512 Hz) band, the respiratory rate can be measured as breaths per minute, following the same processing techniques to calculate the heart rate. The measured respiration rate calculations were confirmed against the respiration rate that was measured by counting the number of breaths taken by the pig during a one-minute interval.

The example implementations also included experiments using the example embodiment of the IMD 100 to collect and filter data for respiratory signals that can be further analyzed to determine whether any breathing abnormalities are present in the subject. Example respiratory abnormalities can include rhonchi, crackles, and wheezing, which each display a characteristic signature in acoustic recordings.

Figure 16A:
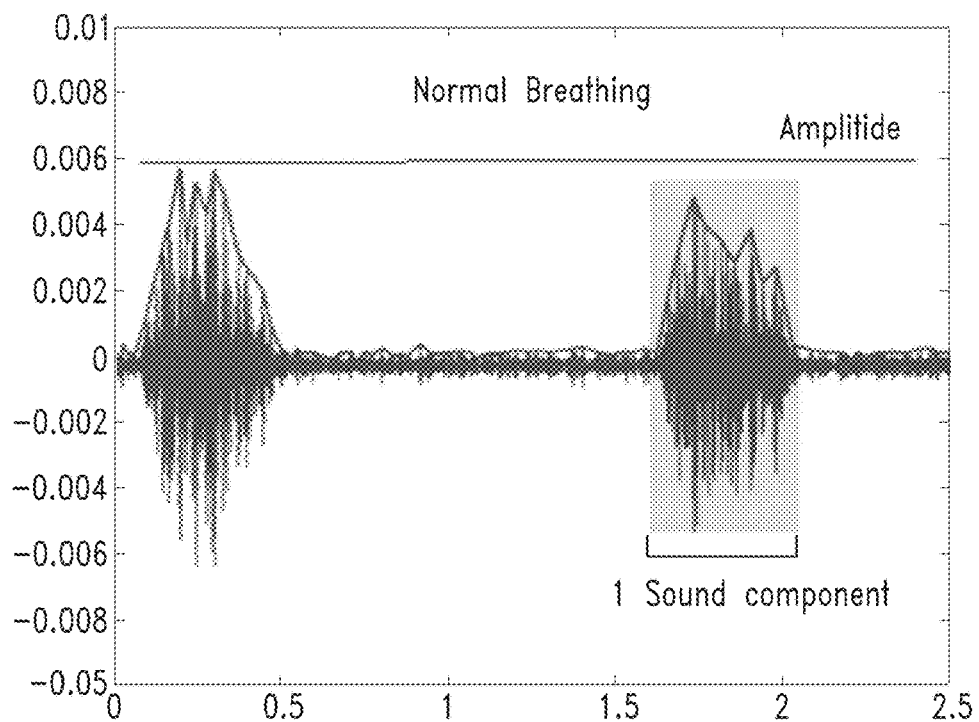
FIGS. 16A and 16B show data plots depicting example data of an example embodiment of the IMD, in accordance with the present technology, which was implanted in a subject and used to monitor respiratory signals under normal conditions (e.g., healthy breathing) and abnormal conditions (e.g., disease, disorder or ventilator controlled breathing).
Figure 16B:
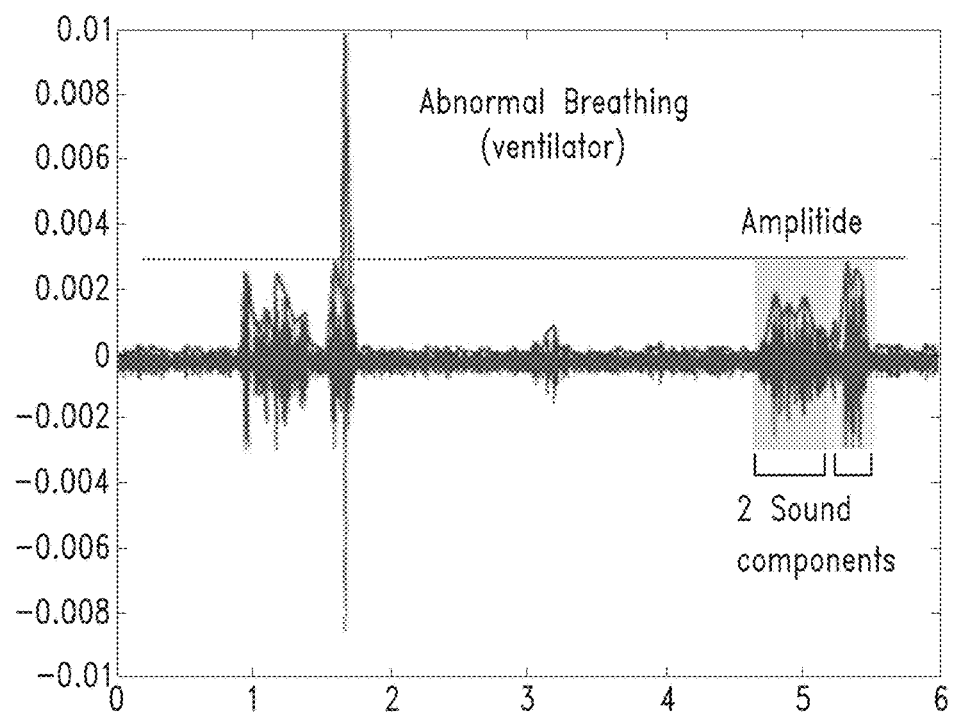

FIGS. 16A and 16B show data plots depicting example data of the example IMD 100 implanted in the pig subject and used to monitor respiratory signals under normal conditions (e.g., healthy breathing) and abnormal conditions (e.g., disease, disorder or ventilator-controlled breathing). As shown in FIGS. 16A and 16B, the example data demonstrates the capability of the IMD 100 to detect differences between normal/natural breathing and ventilated breathing. The ventilator breathing included a separation of the subject's main breath into multiple components, as well as differences in the shape of the sound. The example data showed that the acoustic respiratory signal is measurably different between the natural and the ventilator breathing in terms of the number of distinct sound components, the amplitude, the power, and the integral of each sound component, and the amount of time each sound component covers, relative to the total time for each breath. Additionally, the separate sound components from the ventilator breathing are a good representation of a sound signature of rhonchi, and the short duration spikes are a good representation of the wheezing sound signature, thereby demonstrating the capability of the IMD 100 to distinguish between normal and abnormal conditions and distinguish among the variety of abnormal conditions.

In some example embodiments in accordance with the present technology, a method for assessing a clinical condition of a patient, the method comprising detecting an internal mechanical energy signal associated with a physiological phenomenon of an internal body structure from within the patient, wherein the detecting is accomplished by an implantable medical device that comprises a physical stress sensor. In some embodiments, the method may also include processing the detected internal mechanical energy signal to produce biomedical data; and using the biomedical data to determine (e.g., diagnose and/or quantify) a health and/or disease state of the patient.

For example, the internal mechanical energy signal may be an internal mechanical pressure wave, as non-limiting examples. The physiological phenomenon may be a movement, e.g., a movement of a fluid or of an organ, as non-limiting examples. The internal body structure may include a heart, a blood vessel, a lung or lungs, and/or a region of a gastrointestinal system, as non-limiting examples. The physical stress sensor may be detecting a fluid turbulence (as the internal mechanical energy signal) within an internal body structure, e.g., breathing turbulence or blood flow turbulence as blood travels through the heart or a blood vessel, as non-limiting examples. The physical stress sensor may be detecting tissue contact, e.g., a heart valve or valves closing, such as two or more heart valve structure contacting each other as the valves close. For example, the physical stress sensor may be detecting blood flow through a lesion caused, for example, by restenosis (restenosis is a recurrence of stenosis, which is a narrowing of a blood vessel that leads to restricted blood flow).

In some example embodiments in accordance with the present technology, a method for assessing a clinical condition of a patient, the method comprising simultaneously detecting a first internal mechanical energy signal and a second internal mechanical energy signal associated with a first physiological phenomenon and a second physiological phenomenon, respectively, of a first internal body structure and a second internal body structure, respectively, from within the patient, wherein the detecting is accomplished by a single implantable medical device that comprises a physical stress sensor.

For example, the first internal mechanical energy signal may be an internal mechanical pressure wave generated by the heart or fluid flow within the heart or at least one proximate blood vessel, and the second internal mechanical energy signal may be an internal mechanical pressure wave generated by the lung or lungs or fluid inhaled by, within, or expelled by the lung or lungs, as non-limiting examples. The first physiological phenomenon may be a movement of blood in the heart or heart valves opening or closing, as non-limiting examples. The second physiological phenomenon may be a movement of air into, within, or out of the lung or lungs, as non-limiting examples. The first internal body structure may include a heart and/or a blood vessel, and the second internal body structure may include a lung or lungs, as non-limiting examples. The physical stress sensor may be detecting a fluid turbulence (as the internal mechanical energy signal) within an internal body structure, e.g., breathing turbulence or blood flow turbulence as blood travels through the heart or a blood vessel, as non-limiting examples. The physical stress sensor may be detecting tissue contact, e.g., a heart valve or valves closing, such as two or more heart valve structure contacting each other as the valves close. For example, the physical stress sensor may be detecting blood flow through a lesion caused, for example, by restenosis (restenosis is a recurrence of stenosis, which is a narrowing of a blood vessel that leads to restricted blood flow).

In some example embodiments in accordance with the present technology, a method for assessing a clinical condition of a patient, the method comprising simultaneously detecting an internal mechanical energy signal and an electrophysiological energy signal associated with a physiological phenomenon of at least one internal body structure, from within the patient, wherein the detecting is accomplished by a single implantable medical device that comprises a physical stress sensor and an electrophysiological sensor (e.g., electrocardiogram (ECG) sensor).

In some example embodiments in accordance with the present technology, a method for assessing a clinical condition of a patient, the method comprising simultaneously detecting (i) an internal mechanical energy signal associated with a physiological phenomenon of at least one internal body structure, from within the patient, and (ii) a position, orientation, and/or a movement of the patient, wherein the detecting is accomplished by a single implantable medical device that comprises a physical stress sensor and an inertial measurement unit (IMU) (e.g., the IMU comprising at least one of an accelerometer, a rotational rate sensor, or a magnetometer).

For example, the position, orientation, and/or movement of the patient detected by the IMU is used to determine whether the patient is (1) at rest (i.e., awake and stationary and/or exhibiting low activity), (2) undergoing activity (e.g., exercise or substantial movement or activity), or (3) is sleeping (e.g., laying down in a horizontal or substantially reclined position).

In some example embodiments in accordance with the present technology, a method for assessing a clinical condition of a patient, the method comprising simultaneously detecting (i) an internal mechanical energy signal associated with a physiological phenomenon of at least one internal body structure, from within the patient and (ii) a core body temperature of the patient, wherein the detecting is accomplished by a single implantable medical device that comprises a physical stress sensor and a temperature sensor, respectively.

In some example embodiments in accordance with the present technology, a method for assessing a clinical condition of a patient, the method comprising simultaneously detecting (i) an internal mechanical energy signal associated with a physiological phenomenon of at least one internal body structure, from within the patient, (ii) a position, orientation, and/or a movement of the patient, and (iii) a core body temperature of the patient, wherein the detecting is accomplished by a single implantable medical device that comprises a physical stress sensor, an inertial measurement unit (IMU) (e.g., the IMU comprising at least one of an accelerometer, a rotational rate sensor, or a magnetometer), and a temperature sensor, respectively.

In some example embodiments in accordance with the present technology, a method for assessing a clinical condition of a patient, the method comprising simultaneously detecting (i) an internal mechanical energy signal and (ii) an electrophysiological energy signal associated with a physiological phenomenon of at least one internal body structure, from within the patient, (iii) a position, orientation, and/or a movement of the patient, and (iv) a core body temperature of the patient, wherein the detecting is accomplished by a single implantable medical device that comprises (i) a physical stress sensor and (ii) an electrophysiological sensor (e.g., electrocardiogram (ECG) sensor), (iii) an inertial measurement unit (IMU) (e.g., the IMU comprising at least one of an accelerometer, a rotational rate sensor, or a magnetometer), and (iv) a temperature sensor, respectively. In some embodiments, the method may also include processing the detected internal mechanical energy signal and at least one of the detected electrophysiological energy (e.g., ECG), core body temperature, and/or position, orientation, and/or a movement of the patient to produce biomedical data; and using the biomedical data to determine (e.g., diagnose and/or quantify) a health and/or disease state of the patient.

For example, in some implementations of the method, the clinical condition includes mitral valve regurgitation (MVR), which is a disease state of the patient that can be determined by implementation of the method. MVR or other disease state of the patient can be determined by a compilation of the detected internal mechanical energy with at least one of the detected electrophysiological energy (e.g., ECG), core body temperature, and/or position, orientation, and/or a movement of the patient. For example, the position, orientation, and/or movement of the patient detected by the IMU can be used to determine whether the patient is (1) at rest (i.e., awake and stationary and/or exhibiting low activity), (2) undergoing activity (e.g., exercise or substantial movement or activity), or (3) is sleeping (e.g., laying down in a horizontal or substantially reclined position).

In some example embodiments in accordance with the present technology, a method for monitoring an anatomic structure from an implantable medical device includes: providing the implantable medical device that comprises a physical stress sensor, where the implantable medical device is positioned proximate to an anatomic structure of interest (e.g., heart and/or lungs) of a subject's body; receiving, at the physical stress sensor, an internal mechanical energy signal that emanates within the subject's body from the anatomic structure of interest; and converting, by the physical stress sensor, the received internal mechanical energy signal to an electrical signal indicative of a physiological function by the internal body structure.

In some embodiments, the implantable medical device is positioned to be coupled to the anatomic structure of interest or positioned within 50 mm or less, or 100 mm or less, or 200 mm or less, or 500 mm or less of the anatomic structure. For example, in some embodiments, the implantable medical device in inserted subcutaneously in the chest of the subject's body, where the anatomic structure of interest is includes the heart, a lung or the lungs, or both the heart and the lung(s) of the subject. In some embodiments, the implantable medical device further comprises an electrophysiological sensor (e.g., electrocardiogram (ECG) sensor), and the method further includes simultaneously detecting (i) the internal mechanical energy signal and (ii) an electrophysiological energy signal associated with a physiological phenomenon of at least one internal body structure, from within the subject, e.g., by receiving, at the electrophysiological sensor, the electrophysiological energy signal that emanates within the subject's body from the anatomic structure of interest, and converting, by the electrophysiological energy signal, the electrophysiological energy signal to a second electrical signal indicative of an electrophysiological function by the internal body structure. In some embodiments, the implantable medical device further comprises an inertial measurement unit (IMU), and the method further includes simultaneously detecting (i) the internal mechanical energy signal and (ii) a position, orientation, and/or a movement of the subject, e.g., by transducing, at the IMU, the position, orientation, and/or movement by the subject to a third electrical signal indicative of physical function of the subject and thereby associated with the internal body structure. For example, the position, orientation, and/or movement of the patient detected by the IMU can be used to determine whether the patient is (1) at rest (i.e., awake and stationary and/or exhibiting low activity), (2) undergoing activity (e.g., exercise or substantial movement or activity), or (3) is sleeping (e.g., laying down in a horizontal or substantially reclined position). In some embodiments, the implantable medical device further comprises a temperature sensor, and the method further includes simultaneously detecting (i) the internal mechanical energy signal and (iv) a core body temperature of the subject, e.g., by transducing, at the temperature sensor, a temperature measurement of the subject to a fourth electrical signal indicative of core body temperature of the subject within a region where the implantable medical device is implanted. In some embodiments, the implantable medical device comprises each of the physical stress sensor, the electrophysiological sensor, the IMU, and the temperature sensor, and the method includes the detecting as described above.

In some embodiments, the implantable medical device may be used in a method for assessing a clinical condition of a patient having a beating heart, where the clinical condition is pulmonary arterial pressure (PAP), the method comprising: (a) detecting ECG data generated by the beating heart while simultaneously (b) detecting mechanical pressure wave data generated by the beating heart, (i) the detecting ECG data and the detecting mechanical pressure wave data occurring simultaneously while the heart proceeds through an aortic (A2) and a pulmonary (P2) component of a second heart sound (S2) of a heartbeat, (ii) wherein the mechanical pressure wave and the ECG data are obtained simultaneously by a single implantable medical device comprising a stress sensor and an electrophysiological (e.g., ECG) sensor; (c) optionally, analyzing the ECG data to identify a time point when the beating heart is in an S2 region of the heartbeat; (d) optionally, analyzing the ECG data to identify a time point when A2 and a time point when P2 are taking place in an S2 region; (e) optionally, determining a A2-P2 splitting interval (S1), where S1 is a time interval between the time point of A2 and the time point of P2 of a heartbeat, where the time interval is normalized to the heart rate; (f) optionally, calculating a pulmonary arterial pressure (PAP) based on the determined S1.

Performance Systems for Subjects (e.g., Humans or Animals)

Figure 5:
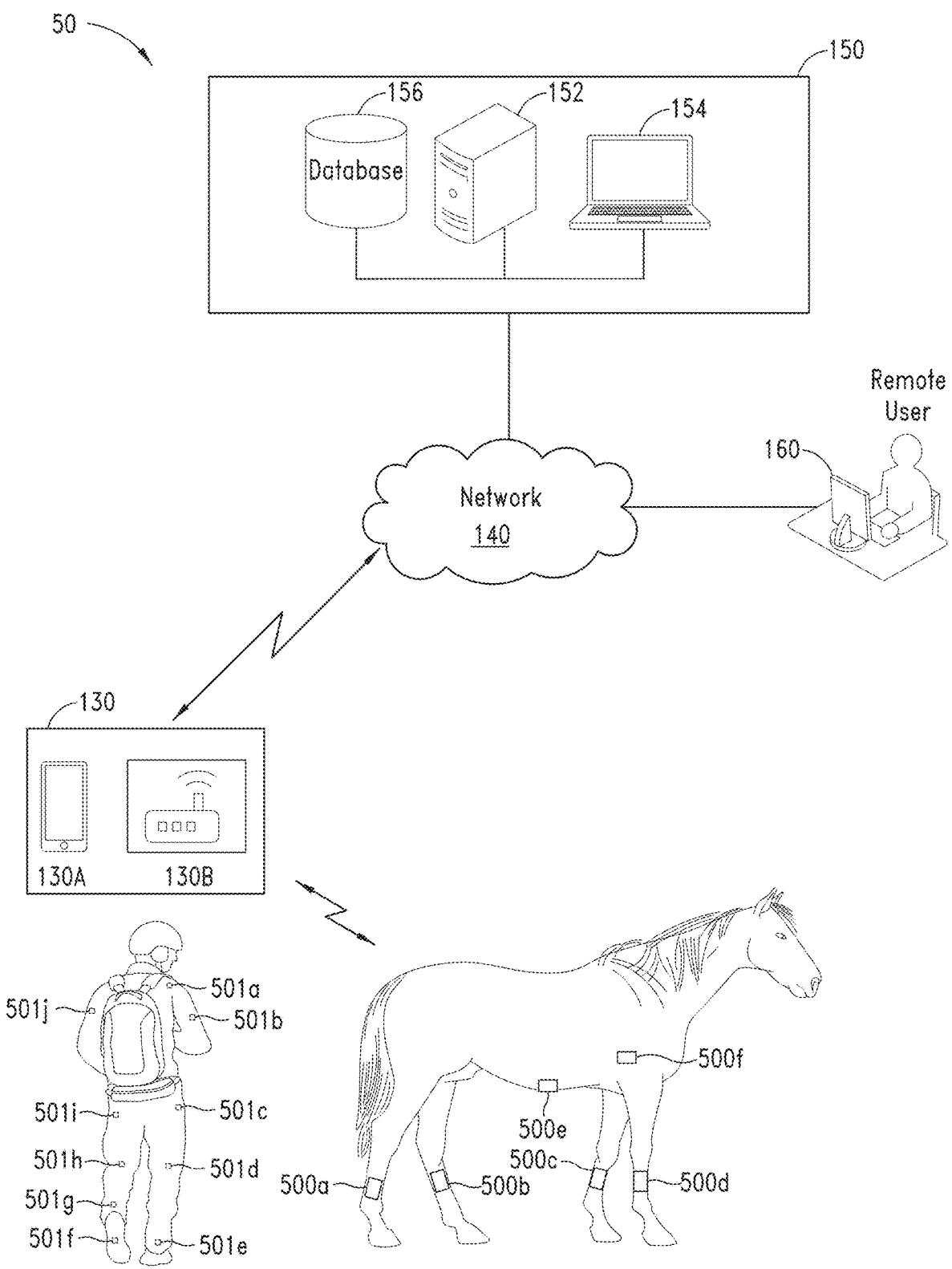
FIG. 5 is a diagram of an example embodiment of a system for monitoring, analyzing, and reporting biomarkers of a subject such as a human or an animal, e.g., a horse, based on information from one or more sensor devices that are associated with the animal.

FIG. 5 is a diagram of an example embodiment of a sensor system 50 for monitoring, analyzing, and reporting biomarkers of a subject (e.g., a human or an animal). The sensor system 50 includes one or more sensor devices 500a-500f or 501a-501j that are configured to be associated with the body of the subject. While FIG. 5 shows the subject as a human and/or horse, the sensor system may be used with other animals, such as dogs, cats, cows, etc. In addition, the sensor system may be used on both humans and animals (e.g., horses) at the same time (e.g., in a horse race or playing polo).

A sensor device 500a-500f or 501a-501j can be an external device (e.g., that is worn by or placed upon a subject (e.g., a human or an animal) and/or an implantable device configured to be implanted within the subject. For example, an implantable sensor device 500a-500f or 501a-501j can be configured as described above with reference to the sensor device 100 shown in FIGS. 1A and 1B. As another example, an implantable sensor device 500a-500f or 501a-501j can be in the form of a cartridge like those described in WO 2023/196655 (which is incorporated by reference herein) that are configured to be inserted into a recess formed in a bony structure, e.g., hoof, of the animal. As another example, an implantable embodiment of the sensor device 500a-500f or 501a-501j can be in the form of a screw or pin like those described in WO 2021/168337 (which is incorporated by reference herein) that is configured to be screwed or inserted into in a bony structure, e.g., hoof, of the animal.

A sensor device 500a-500f or 501a-501j can be an external device configured to be attached to the body of the subject. For example, an external embodiment of the sensor device 500a-500f or 501a-501j can be configured as described above with reference to FIGS. 1A and 1B. As another example, an external embodiment of the sensor device 500a-500f or 501a-501j can be in the form of a cartridge like those described in WO 2023/196655 that is configured to be integrated with an accessory, e.g., a boot, worn by the animal.

The sensor devices 500a-500f or 501a-501j include one or more sensors. "Sensor" refers to a device that can be utilized to do one or more of detect, measure and/or monitor one or more different aspects of a body (anatomy, physiology, metabolism, and/or function/mechanics). Representative examples of sensors suitable for use within the sensor devices include, for example, fluid pressure sensors, fluid volume sensors, contact sensors, position sensors, pulse pressure sensors, blood volume sensors, blood flow sensors, acoustic sensors (including ultrasound), chemistry sensors (e.g., for blood and/or other fluids), metabolic sensors (e.g., for blood and/or other fluids), accelerometers, gyroscopes, mechanical stress sensors and temperature sensors. Within certain embodiments the sensor can be a wireless sensor, or, within other embodiments, a sensor connected to a wireless microprocessor.

"Biomarker," as used herein, refers to an objective indication of a medical state or physical condition, which can be measured accurately and reproducibly, and used to monitor and treat progression of the medical state or physical condition. Biomarkers individually or collectively include physiological measurements, anatomical measurements, metabolic measurements (e.g., glucose and/or oxygen), and functional/mechanical measurements, such as may be provided by the above-described sensors. Biomarkers also include quantifiable aspects or characteristics of the aforementioned measurements. For example, biomarkers include kinematic parameters, such as cadence, stride length, walking speed, tibia range of motion, knee range of motion, step count and distance traveled, that may be derived from kinematic data. Examples of kinematic data that can be monitored, analyzed, and reported by the system of FIG. 5 are disclosed in WO 2023/278775 (which is incorporated by reference herein). Examples of metabolic measurements for metabolic functions such as glucose and/or oxygen can be found in U.S. Pat. Nos. 11,013,440, 11,000,216, 11,000,213, 10,980,452, 10,973,443, 10,966.644, 10,959,654, 10,952, 653, 10,945,649, 10,945,647, 10,881,341, 10,874,338,10, 827,954, 10,820,842, 10,702,215, 10,702,193, and 10,993, 642, all of which are incorporated by reference in their entirety.

Continuing with FIG. 5, the system 50 can include the external receiver device 130 (discussed above in connection with FIG. 1A) in communication with the sensor devices 500a-500f or 501a-501j and operable to receive a wireless transmission carrying data indicative of detected signals acquired by the sensor devices. The external receiver device 130 can (i) process, at least partially, the received data for display on a display screen of the external receiver device 130 and/or for transfer of the received data to an external computer or computing system, such as a data processing system 150, for further processing. In some embodiments, for example, the system 50 optionally includes a software application ("app") that is resident on the receiver device 130 to control various data processing, storage, and communication functionalities for management of the received data.

In some embodiments, the sensor devices 500a-500f or 501a-501j and/or the external receiver device 130 is/are in communication with the data processing system 150 via the network 140 of computers in communication with each other and accessible through the Internet (e.g., referred to as the "cloud"), where the data from the implantable stress sensor device 100 and/or the external receiver device 130 can be transferred to the data processing system 150. Similarly, information from the data processing system 150 can be transferred to the external receiver device 130 and/or the sensor devices 100. Additional details on the external receiver device 130 and the data processing system 150, which can be employed by the system 50) are provided above with reference to FIG. 1A.

In a first example configuration, a system 50 includes one or more of sensor devices 500a, 500b, 500c, 500d, 500e, or 500f, or, 501a, 501b, 501c, 501d, 501e, 501f, 501g, 501h, 501i, or 501j are configured to be associated with a leg of a subject (e.g., a human or an animal) for purposes of monitoring, analyzing, and reporting kinematic biomarkers of the animal.

Figure 6A:
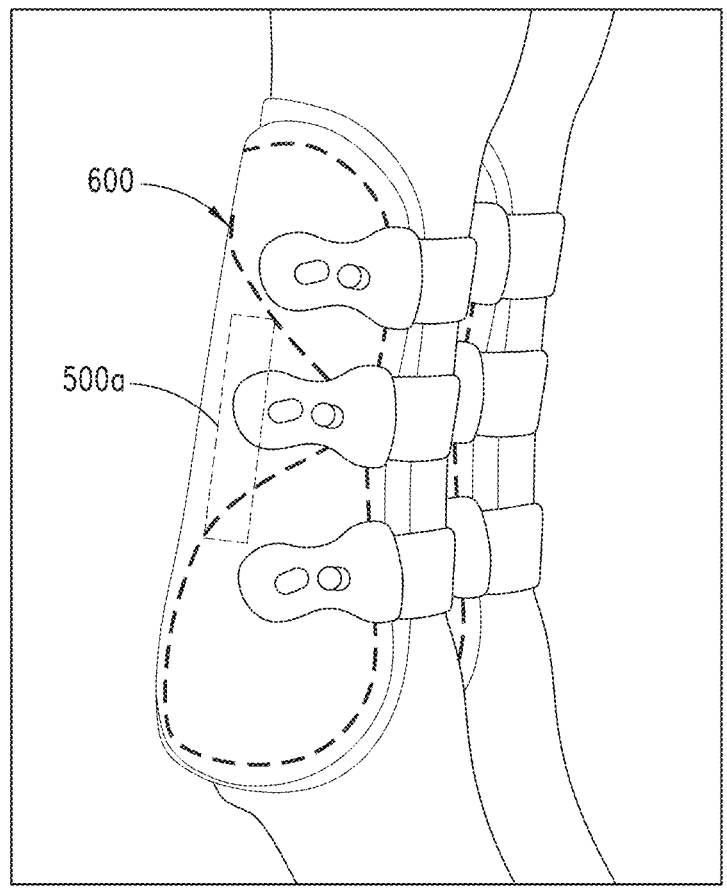
FIG. 6A is an illustration of a sensor device of the system of FIG. 5 associated with a leg of a horse by way of a boot attached to the leg.

In some embodiments, like that shown in FIG. 6A, the sensor devices 500a-500f or 501a-501j are external devices configured to be placed adjacent to an anatomical structure, e.g., foot, ankle, knee, hip, arms wrists, hands, shoulders or head of a human or hoof, bone, or tendon, of the leg of an animal. For example, with reference to FIG. 6A, a sensor device 500a can be an external device that is integrated with a wearable apparatus 600 configured to be secured to the leg of a subject. With additional reference to FIG. 6B, the sensor device 500a (shown in FIG. 6A) can be integrated with the wearable apparatus 600 (shown in FIG. 6A) such that when the apparatus is attached to the leg, the sensor device is adjacent either the long pastern bone or the cannon bone shown in FIG. 6B. Alternatively, the sensor device can be integrated with a wearable apparatus that is attached to other locations, e.g., above the cannon bone, along the length of the leg. The sensor device 500a can be integrated with a wearable apparatus as a separate component that has a from factor (shape and size of a housing that contains components of the sensor device) that fits within a recess or pocket of the wearable apparatus 600, thus allowing for removal and replacement as needed. Alternatively, the sensor device 500a can be built into the wearable apparatus 600 during manufacture of the apparatus.

Figure 6B:
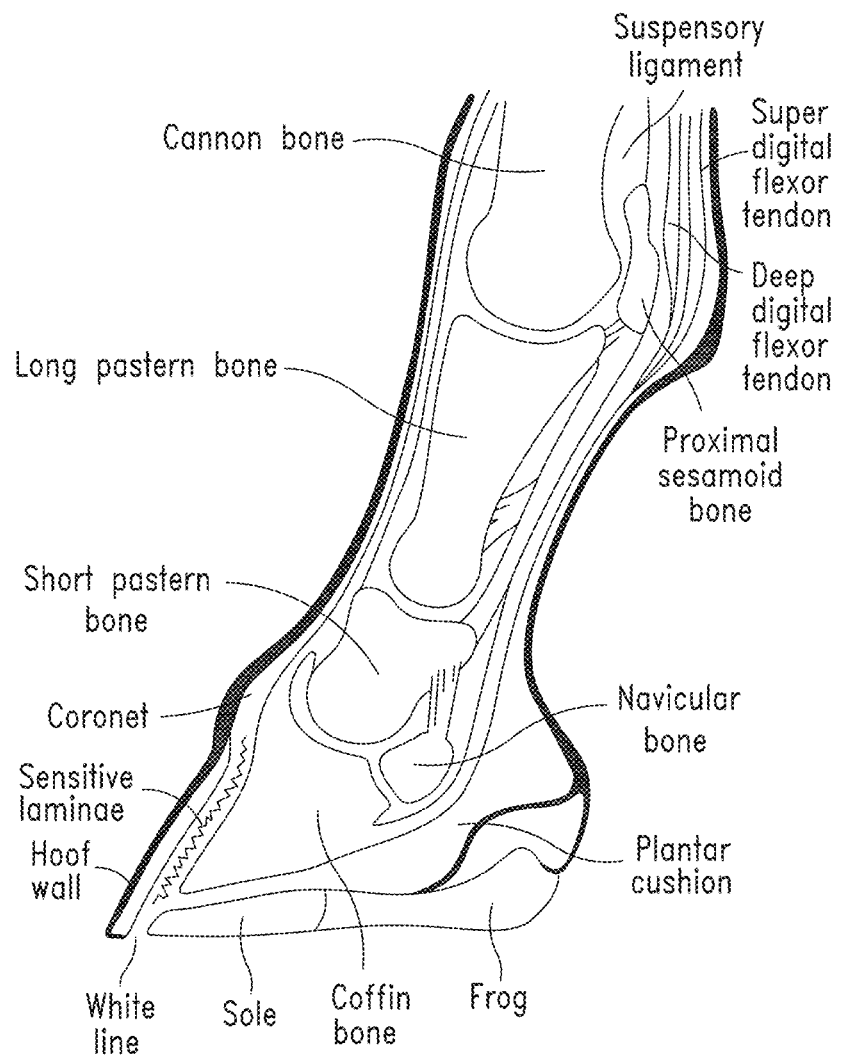
FIG. 6B is an illustration of the anatomy of a lower leg of a horse.
Figure 7:
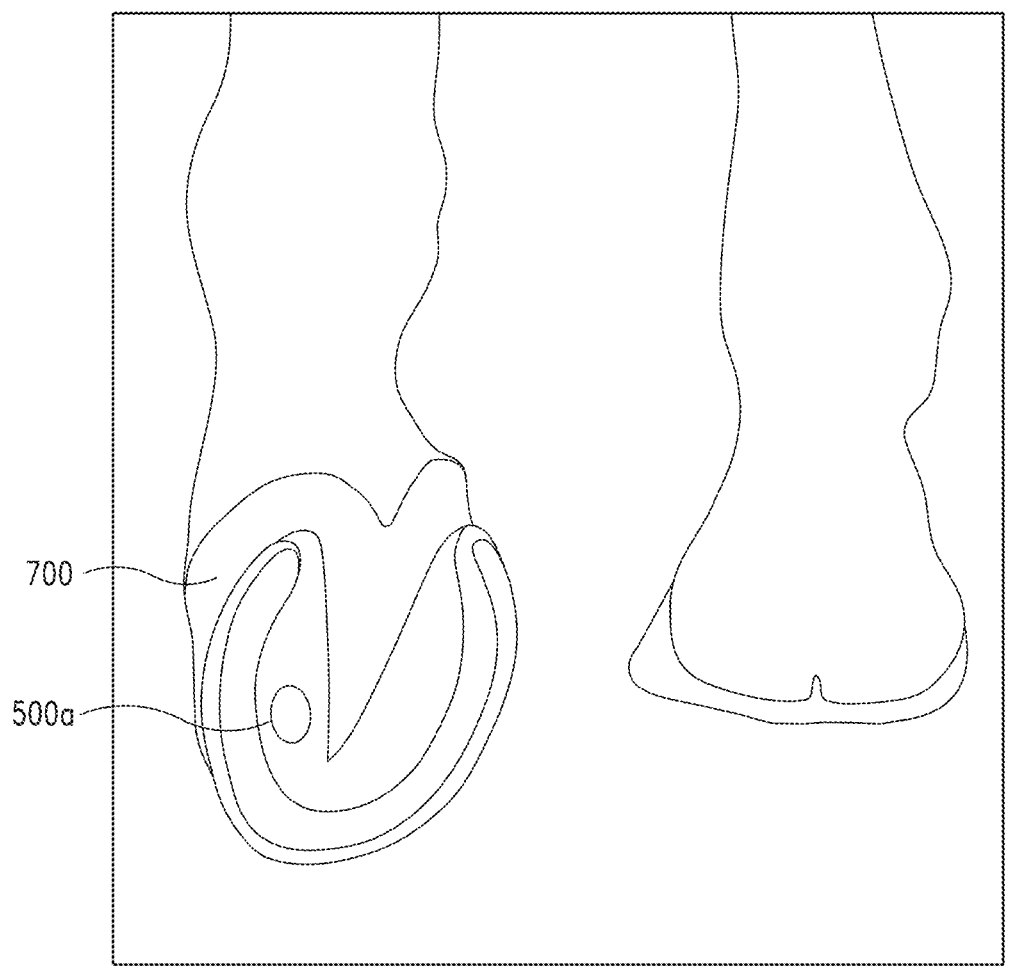
FIG. 7 is an illustration of a sensor device of the system of FIG. 5 associated with a leg of a horse by way of implantation in a hoof of the horse.

In some embodiments, like that shown in FIG. 7, the sensor devices 500a-500f or 501a-501j are implantable devices having a form factor (shape and size of a housing that contains components of the sensor device) that is configured to be implanted in the subject, either subcutaneously (beneath the skin and adjacent an anatomical structure, e.g., bone or tendon, of the leg), or within an anatomical structure, e.g., hoof, bone, or tendon, of the leg. For example, with reference to FIG. 7, in some embodiments, a sensor device 500a has a form factor configured to be implanted in a hoof 700 of the horse. With reference to FIG. 6B, in another example, a sensor device (not shown) has a form factor configured to be implanted subcutaneously beneath the skin and adjacent either the long pastern bone or the cannon bone. With reference to FIG. 6B, in another example, a sensor device (not shown) has a form factor configured to be implanted within either the long pastern bone or the cannon bone. Alternatively, the sensor device can have a form factor configured to be implanted at any location along the length of the leg.

While the system 50 shown in FIG. 5 includes four sensor devices 500a, 500b, 500c, 500d, or at least four sensor devices among 501c, 501d, 501e, 501f, 501g, 501h, and/or 501i associated with each limb (or a segment thereof) of the subject (e.g., horse or human subject), it is understood that more or less sensor devices can be configured with each limb of the subject. For example, for a leg, more or less sensor devices may be included, depending on the number of legs the system is intended to monitor, analyze, and report biomarkers. Also, while the system 50 shown in FIG. 5 includes four sensor devices 500a, 500b, 500c, 500d, each located at the lower portion of the leg, the system 50 can include multiple sensor devices positioned at different location along the length of a leg, between the hoof and the shoulder.

In this first example configuration, the sensor devices 500a-500d or 501c-501i are primarily configured to collect kinematic data corresponding to movement of the leg. To this end, the sensor devices 500a-500d or 501c-501i may include an IMU having accelerometers and gyroscopes arranged to sense movement (acceleration and rotation) in multiple directions, e.g., x, y, z directions. An example of an IMU is disclosed in WO 2020/247890 (which is incorporated by reference). The kinematic data can be processed by receiving device 130 and the data processing system 150 of the system 50 to provide information on gait mechanics of the leg. The sensor devices 500a-500d may also include secondary sensors, such as temperature sensors. In an example configuration, a series of temperature sensors are spaced apart along a length of the sensor devices 500a-500d or 501c-501i and can be positioned adjacent and along an anatomical structure, e.g., major tendon, muscle, of the leg. If the length of the anatomical structure, e.g., major tendon, muscle, of the leg is too long to be covered by a series of temperature sensors on a single sensor device, additional sensor devices with temperature sensors may be added to the system and attached at different location along the length of a leg to encompass the anatomical structure, e.g., major tendon, muscle.

In an example application of this configuration of the system 50, the system monitors lameness in one or more limbs of a subject (e.g., legs) based on kinematic, e.g., gait mechanics, cadence, step, information and temperature information provided by the sensor devices 500a-500d or 501c-501i. To this end, the receiving device 130 of the system 50 is configured to establish normal/baseline gait mechanics, cadence, and/or step and normal/baseline temperatures for each bodily structure based on kinematic information and temperature information provided by the sensor devices 500a-500d or 501c-501i. The receiving device 130 of the system 50 is configured to monitor the kinematic information and temperature information over time for a deviation from the normal/baseline that is indicative of lameness. The amount of deviation between current and baseline gait mechanics, cadence, and/or step provides a measure of the severity of lameness, while the amount of deviation between current and baseline temperature along the length of the component, e.g., major tendon, muscle, of the leg may provide information on the source/location of the lameness. One or more computing devices of the data processing system 150 of the system 50 can also be configured to establish the baselines and monitor the kinematic information and temperature information over time.

Figure 8A:
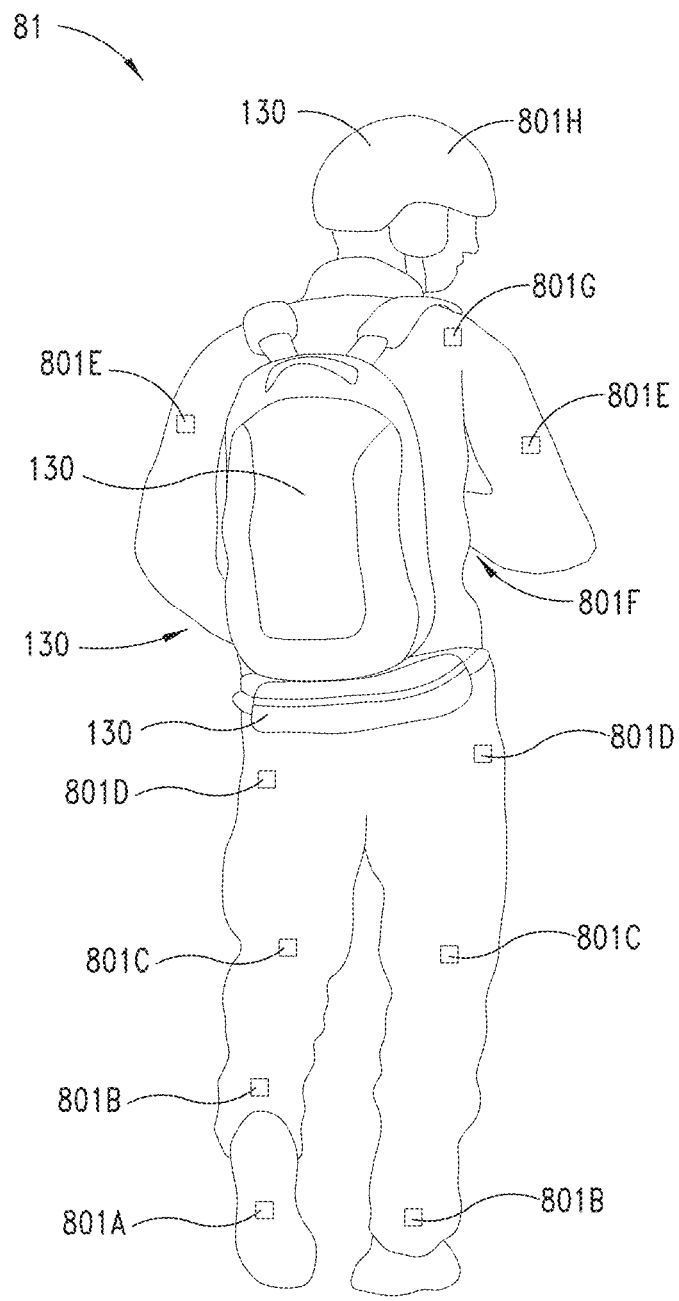
FIG. 8A is an illustration of a system of FIG. 5 in a sports environment, where a sensor device is associated with each foot or leg of the subject and a receiver device is associated with a wearable device such as a helmet, backpack or fanny pack.

With reference to FIG. 8A, in another example application of this configuration of the system 50, shown as system 81 in FIG. 8A, the system 81, via the sensors 501a-501j, monitors the kinematics of a subject's feet 801A, ankles 801B, knees 801C, hips 801D, arms 801E, wrists 801F, shoulders 801G and/or head 801H (e.g., measuring gait mechanics, cadence, and/or step, information, or, other biological or physiological measurements (e.g., pressure and strain). The information may be transmitted to a receiver device 130 associated with a backpack, fanny pack, helmet or wearable device (e.g., a watch), where it is processed and analyzed for future reference. The information may be transmitted to a receiver device 130, where it is processed, analyzed. The system 81 can includes an additional sensor device (not shown) that is configured to be associated with the cardiac system of the subject to collect ECG data corresponding to the functionality of the heart of the subject. A system configuration with cardiac monitoring is described further below.

Figure 8B:
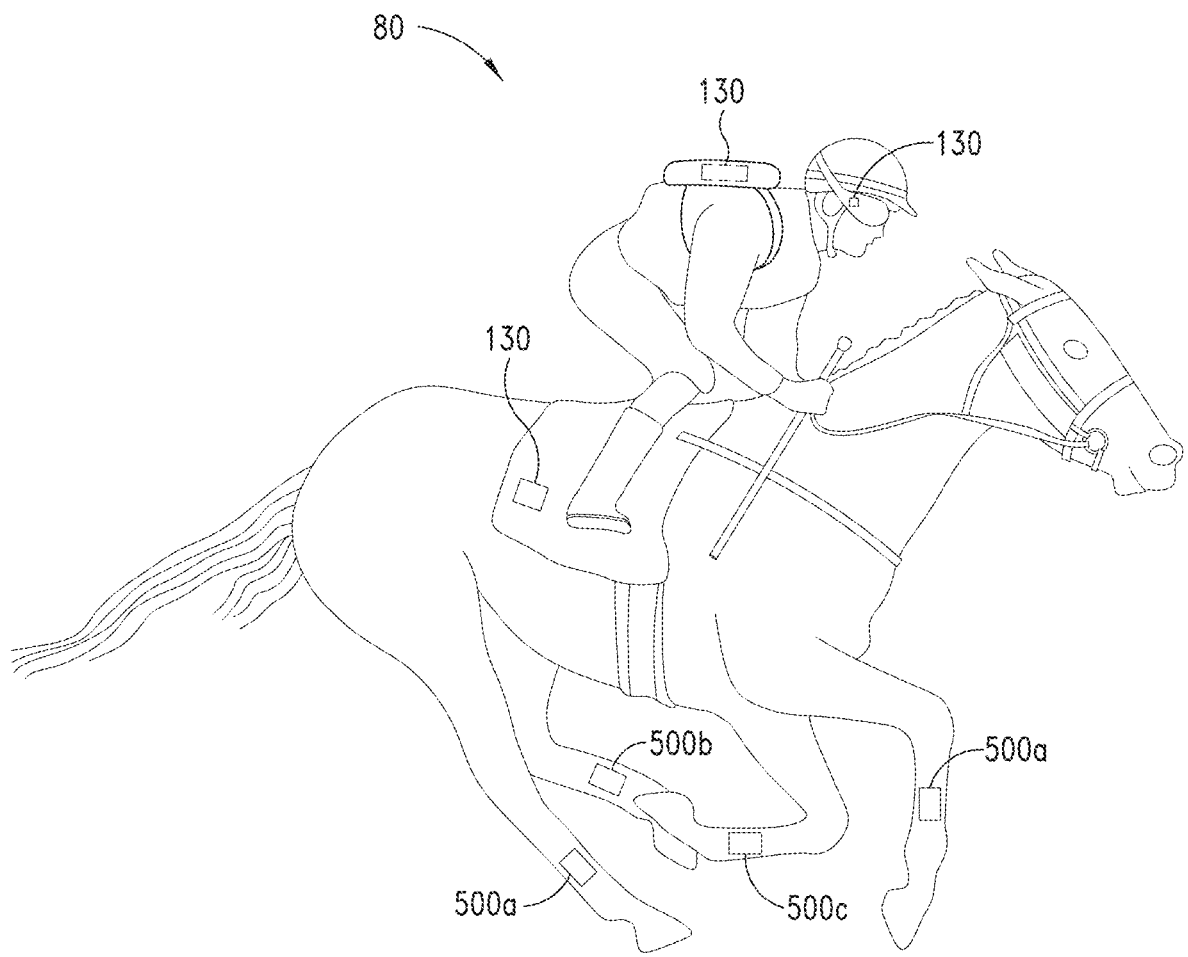
FIG. 8B is an illustration of a system of FIG. 5 in a horse racing application, where a sensor device is associated with each leg of the horse and a receiver device is associated with either of a saddle worn by the horse, or goggles worn by the rider.

With reference to FIG. 8B, in another example application of this configuration of the system 50, shown as system 80 in FIG. 8B, the system 80, via the sensors 500a-500d, monitors the kinematics of the legs of a horse during a race based on kinematic, e.g., gait mechanics, cadence, and/or step, information. The information may be transmitted to a receiver device 130 associated with a saddle worn by the horse or a backpack worn by the rider, where it is processed and analyzed for future reference. The information may be transmitted to a receiver device 130 associated with augmented reality goggles worn by the rider, where it is processed, analyzed, and displayed in real-time. The system 80 can includes an additional sensor device (not shown) that is configured to be associated with the cardiac system of the animal to collect ECG data corresponding to the functionality of the heart of the animal. A system configuration with cardiac monitoring is described further below.

Figure 9A:
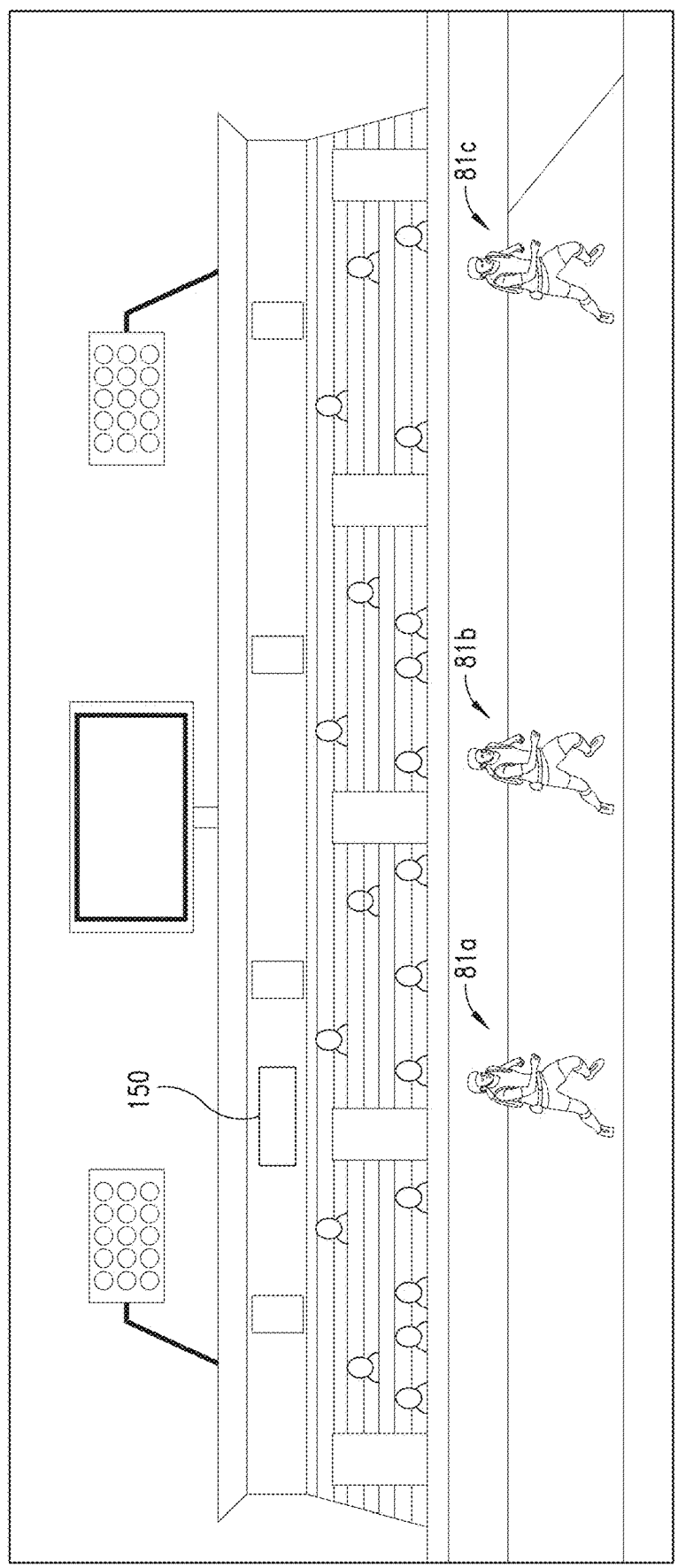
FIG. 9A is an illustration of an example embodiment of a system for monitoring, analyzing, and reporting biomarkers of a subject during a sporting event.

With reference to FIG. 9A, a system 81a, 81b, 81c may be associated with each of a number of players in a game. In this case, the receiver device 130 of each system 81a, 81b, and 81c transmits kinematic, e.g., gait mechanics, cadence, and/or step, information and cardiac information (if an ECG sensor is included in the system) to the data processing system 150 where it is processed, analyzed, and displayed in real-time.

Figure 9B:
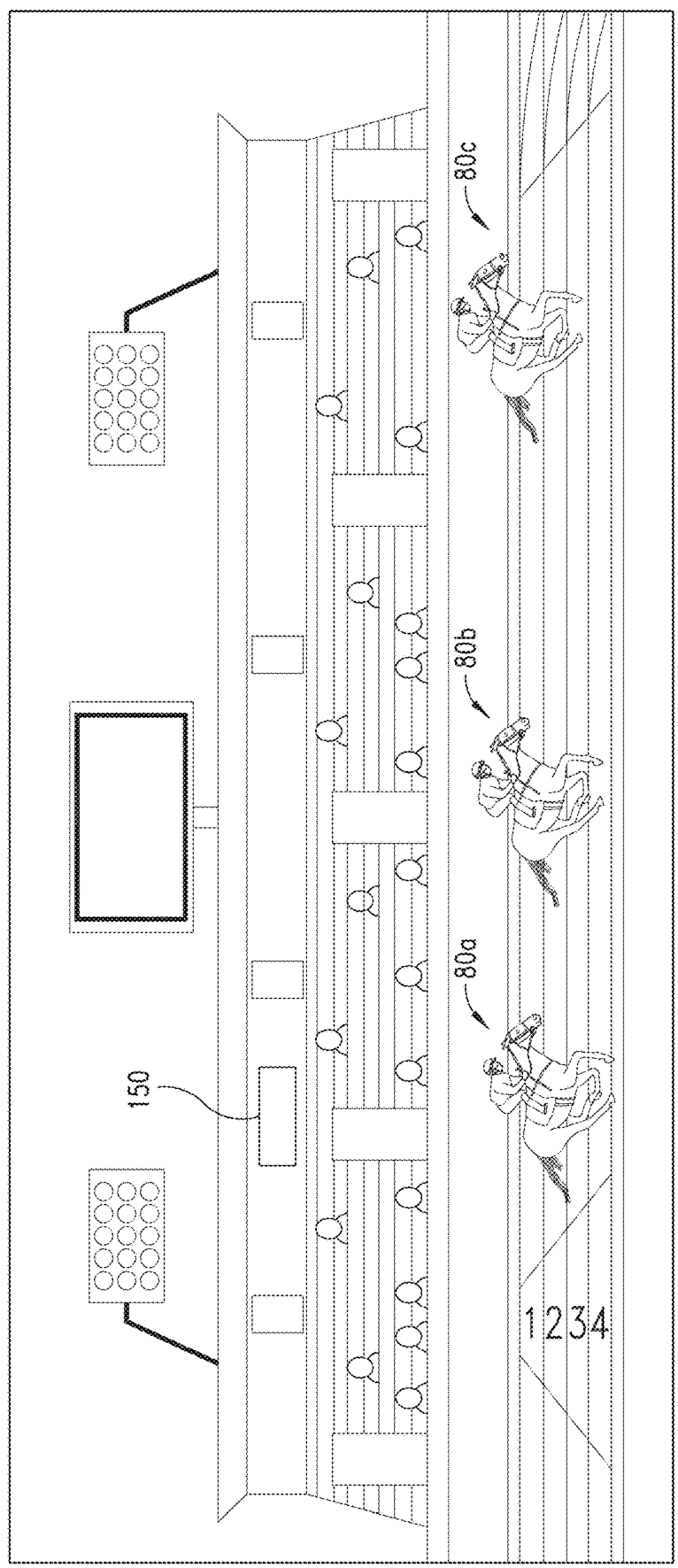
FIG. 9B is an illustration of an example embodiment of a system for monitoring, analyzing, and reporting biomarkers of a number of horses running a race.

With reference to FIG. 9B, a system 80a, 80b, 80c may be associated with each of a number of horses in a race. In this case, the receiver device 130 of each system 80a, 80b, 80c transmits kinematic, e.g., gait mechanics, cadence, and/or step, information and cardiac information (if an ECG sensor is included in the system) to the data processing system 150 where it is processed, analyzed, and displayed in real-time.

In a second example configuration, the system 50 includes a sensor device 500e that is configured to be associated with the abdomen of the animal. This sensor device 500e is primarily configured to collect sound/motion/stress data corresponding to the functionality of the digestive system of the animal. To this end, the sensor device 500e can include a mechanical stress sensor as disclosed above with reference to FIGS. 1B, 2A, and 2B. The sensor device 500e may also include secondary sensors, including but not limited to a temperature sensor.

In an example application of this configuration of the system 50, the system monitors for a digestive disorder, e.g., colic, based on sound/motion/stress information and temperature information provided by the sensor device 500e. To this end, the receiving device 130 of the system 50 is configured to establish normal/baseline digestive sound/motion/stress and normal/baseline temperatures for the digestive system of the animal based on sound/motion/stress information and temperature information provided by the sensor device 500e. The receiving device 130 of the system 50 is also configured to monitor the sound/motion/stress information and temperature information over time for a deviation from the baselines that is indicative of a digestive disorder, e.g., colic, and to provide an alert if a digestive disorder is detected or a measure indicative of the digestive disorder. For example, the amount of deviation from the baselines may provide a measure of the severity of the digestive disorder. One or more computing devices of the data processing system 150 of the system 50 can also be configured to monitor the sound/motion/stress information and temperature information over time.

In a third example configuration, a system 50 includes a sensor device 500f that is configured to be associated with the cardiac system of the animal. This sensor device 500f is primarily configured to collect ECG data corresponding to the functionality of the heart of the animal. To this end, the sensor device 500f can include an ECG sensor such as disclosed above with reference to FIG. 1B. The sensor device 500f may also include a physical stress sensor and a temperature sensor.

In an example application of this configuration of the system 50, the system monitors cardiac performance based on one or more of ECG information, sound/motion/stress information (if a physical stress sensor is present), and temperature information (if a temperature sensor is present) provided by the sensor device 500f. To this end, the receiving device 130 of the system 50 is configured to establish normal/baseline ECG information, sound/motion/stress information and temperature information of the animal based on ECG information, sound/motion/stress information and temperature information provided by the sensor device 500f while the animal is at rest. The receiving device 130 of the system 50 is configured to monitor ECG information, heart rate information (derived from ECG information), respiration (derived from stress information), and temperature information based on sound/motion/stress information and temperature information provided by the sensor device 500f while the animal is exercising and while the animal is recovering after exercise, and is configured to provide a representation based on the information. Examples of representations include an alert of cardiac arrythmia, a measure of heart rate, and an ECG waveform. One or more computing devices of the data processing system 150 of the system 50 can also be configured to monitor the ECG information, sound/motion/stress information and temperature information over time.

The third example configuration of the system 50 may also include one or more kinematic sensors 500a, 500b, 500c, 500d that provides kinematic information. In this case, the receiving device 130 of the system 50 is also configured to monitor kinematics information (gait, cadence, step count) during exercise and during recovery after exercise for comparison against normal/baseline kinematic information. One or more computing devices of the data processing system 150 of the system 50 can also be configured to monitor the kinematic information over time.

EXAMPLES

The following are some exemplary, i.e., non-limiting, embodiments of the present technology.

In some embodiments in accordance with the present technology (example A1), a medical device is provided where the medical device includes a mechanical stress sensor. Within various embodiments of this example A1 the medical device is implantable (i.e., is placed in vivo during operation). Within other embodiments the medical device of this example A1 is non-implantable (also referred to as non-invasive, i.e., is not placed in vivo during operation), e.g., it is placed upon or worn by a subject. Embodiments of this example A1 include a medical device selected from:
  a. an implantable medical device, comprising an in vivo mechanical stress sensor;
  b. a non-implantable medical device, comprising an in vivo mechanical stress sensor; and
  c. a non-implantable medical device, comprising an ex vivo mechanical stress sensor.

Example A2 includes the device of example A1 or any of examples A1-A35, wherein the in vivo mechanical sensor is configured to detect an internal mechanical energy signal associated with a physiological phenomenon of an internal body structure from within a host in which the implantable medical device is deployed.

Example A3 includes the device of example A2 or any of examples A1-A35, wherein the in vivo mechanical stress sensor includes a hermetically sealed housing, where the housing is optionally sterile, and a transducer element configured to receive the internal mechanical energy signal that emanates within the host from the internal body structure such that the transducer element converts the internal mechanical energy signal to an electrical signal indicative of a physiological function by the internal body structure, wherein the transducer element is enclosed in the hermetically sealed housing.

Example A4 includes the device of example A2 or example A3 or any of examples A1-A35, wherein the in vivo mechanical stress sensor includes a stress-mediated sensor operable to measure stress caused by the internal mechanical energy signal applied on a transducer element.

Example A5 includes the device of example A1 or any of examples A1-A35, wherein the in vivo mechanical stress sensor includes a unimorph piezoelectric sensor device.

Example A6 includes the device of example A1 or any of examples A1-A35, wherein the transducer element includes a piezoelectric material.

Example A7 includes the device of example A6 or any of examples A1-A35, wherein the piezoelectric material includes one or more of lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$).

Example A8 includes the device of example A6 or any of examples A1-A35, wherein the unimorph piezoelectric sensor includes: a first layer coupled to a first side of the piezoelectric material and configured in the hermetically sealed housing to face outward of the in vivo mechanical stress sensor, the first layer comprising a biocompatible, electrically conductive, non-piezoelectric material having a Young's modulus within 2×-3× of the Young's modulus of the piezoelectric material; and a second layer coupled to a second side of the piezoelectric material opposite the first side, the second layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically conductive, non-piezoelectric material is transferred through and into the piezoelectric material to transduce stress into electrical energy corresponding to the electrical signal indicative of a physiological function by the internal body structure, wherein the first layer and the second layer are electrically addressable to detect the electrical signal by an electrical circuit.

Example A9 includes the device of example A8 or any of examples A1-A35, wherein the biocompatible, electrically conductive, non-piezoelectric material of the first layer includes one or more of titanium, a biocompatible stainless-steel, a cobalt-chromium alloy, nitinol, or a combination thereof.

Example A10 includes the device of example A8 or any of examples A1-A35, wherein the electrically conductive, non-piezoelectric material of the second layer includes one or more of titanium, gold, platinum, silver, copper, nickel, aluminum, palladium, or other conductive material, including an alloy or other combination thereof.

Example A11 includes the device of example A8 or any of examples A1-A35, wherein the second layer is configured as two electrode structures, which include a center electrode, and an annular electrode that is positioned around and separated from the center electrode by a gap.

Example A12 includes the device of example A11 or any of examples A1-A35, wherein the unimorph piezoelectric sensor is configured to have a cylindrical geometry and a circular shape.

Example A13 includes the device of any of examples A8-A11 or any of examples A1-A35, wherein the unimorph piezoelectric sensor is configured to have a rectangular, elliptical, triangular, or other polygonal shape geometry and/or shape.

Example A14 includes the device of example A6 or any of examples A1-A35, wherein the unimorph piezoelectric sensor includes: a first layer configured in the hermetically sealed housing to face outward of the in vivo mechanical stress sensor, the first layer comprising a biocompatible, electrically insulative, non-piezoelectric material having a Young's modulus within 2×-3× of the Young's modulus of the piezoelectric material, a second layer coupled to a first side of the piezoelectric material, the second layer comprising an electrically conductive, non-piezoelectric material, and a third layer coupled to a second side of the piezoelectric material opposite the first side and to an inward-facing side of the first layer, the third layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically insulative, non-piezoelectric material is transferred through and into the piezoelectric material to transduce stress into electrical energy corresponding to the electrical signal indicative of a physiological function by the internal body structure, wherein the second layer and the third layer are electrically addressable to detect the electrical signal by an electrical circuit.

Example A15 includes the device of example A14 or any of examples A1-A35, wherein the biocompatible, electrically insulative, non-piezoelectric material of the first layer includes a high-purity ceramic.

Example A16 includes the device of example A15 or any of examples A1-A35, wherein the high-purity ceramic includes alumina ($Al_2O_3$).

Example A17 includes the device of example A14 or any of examples A1-A35, wherein the electrically conductive, non-piezoelectric material of the second layer and/or the third layer includes one or more of titanium, gold, platinum, silver, copper, nickel, aluminum, palladium, or other conductive material, including an alloy or other combination thereof.

Example A18 includes the device of any of examples A4-A17 or any of examples A1-A35, wherein the stress-mediated sensor does not involve a displacement of the transducing element.

Example A19 includes the device of example A9 or any of examples A1-A35, wherein the in vivo mechanical stress sensor further comprises a casing structure that provides a firm, inflexible material and is configured to secure and/or position the transducer element in the hermetically sealed housing.

Example A20 includes the device of example A19 or any of examples A1-A35, wherein the casing structure part of the hermetically sealed housing.

Example A21 includes the device of example A19 or example A20 or any of examples A1-A35, wherein the casing structure includes titanium (Ti).

Example A22 includes the device of example A1 or any of examples A1-A35, wherein the internal mechanical energy signal includes a transmission of mechanical energy that propagates in an in vivo medium including one or more of a gas, liquid, or solid.

Example A23 includes the device of any of examples A1-A22 or any of examples A1-A35, wherein the implantable medical device includes an electronics unit in electrical communication with the in vivo mechanical stress sensor, wherein the electronics unit is in a hermetically sealed casing.

Example A24 includes the device of example A23 or any of examples A1-A35, wherein the electronics unit comprises a power supply.

Example A25 includes the device of example A24 or any of examples A1-A35, wherein the electronics unit comprises a signal processing unit and a wireless communications unit configured to process electrical signals associated with the detected internal mechanical energy signal as data and wirelessly transmit the data to an external processor.

Example A26 includes the device of example A25 or any of examples A1-A35, wherein the signal processing unit includes a signal conditioning circuit configured to process the electrical signals associated with the received internal mechanical energy signal by one or more of amplifying the electrical signals, filtering the electrical signals, or converting the electrical signals from analog to digital.

Example A27 includes the device of example A26 or any of examples A1-A35, wherein the electronics unit comprises a data processing unit in communication with the signal conditioning circuit, the data processing unit comprising a processor and a memory and configured to process the amplified, filtered, or converted electrical signals as biomedical data.

Example A28 includes the device of example A23 or any of examples A1-A35, wherein the electronics unit comprises a printed circuit board (PCB) having a substrate and electrical interconnections disposed on the substrate, wherein the electrical interconnections are coupled to a plurality of electrical interconnection wires that span from the in vivo mechanical stress sensor.

Example A29 includes the device of any of examples A23-A28 or any of examples A1-A35, wherein the implantable medical device includes a secondary sensor in communication with the electronics unit and operable to measure a secondary measurement in compilation with an internal mechanical energy signal measurement by the in vivo mechanical stress sensor, wherein the secondary measurement includes one or more of a biological parameter, a physiological parameter, an electrophysiological parameter, or a physical parameter of the host within which the implantable medical device is deployed.

Example A30 includes the device of example A29 or any of examples A1-A35, wherein the secondary sensor includes an inertial measurement unit (IMU) configured to detect motion of the implantable medical device in multiple degrees of freedom.

Example A31 includes the device of example A29 or any of examples A1-A35, wherein the secondary sensor includes an electrophysiological sensor configured to detect an electrophysiological signal of an anatomic structure of the host, wherein the electrophysiological sensor includes an electrocardiogram (ECG) sensor.

Example A32 includes the device of example A31 or any of examples A1-A35, wherein the secondary sensor includes an ultrasound sensor configured to detect one or more of a vascular blood flow, a vessel wall thickness, and/or a vessel diameter at a reference point in a cardiac cycle of the host or as a function of time during the cardiac cycle.

Example A33 includes the device of example A29 or any of examples A1-A35, wherein the secondary sensor includes an analyte sensor configured to detect an analyte of a biological fluid of the host in a region where the implantable medical device is deployed.

Example A34 includes the device of example A29 or any of examples A1-A35, wherein the secondary sensor includes a pH sensor configured to detect a pH level of a biological fluid of the host in a region where the implantable medical device is deployed.

Example A35 includes the device of example A29 or any of examples A1-A34, wherein the secondary sensor includes a temperature sensor configured to detect temperature of a biological fluid of the host in a region where the implantable medical device is deployed.

In some embodiments in accordance with the present technology (example A36), a system for in vivo monitoring of internal mechanical energy associated with physiological phenomena originating from an anatomic structure includes the implantable medical device of any of examples A1-A35; and a data processing system, comprising a processor and a memory, in data communication with the implantable medical device and configured to receive the data from the implantable medical device and process the received data to determine an internal mechanical energy signal parameter associated with a physiological function of the anatomic structure.

In some embodiments in accordance with the present technology (example A37), a method for in vivo monitoring of internal mechanical energy associated with physiological phenomena originating from an anatomic structure within a host includes measuring, via an implantable medical device of any of examples A1-A35, an internal mechanical energy signal; processing, via a data processing device, the measured internal mechanical energy signal to produce biomedical data; and using the biomedical data to diagnose and/or detect and/or quantify a health and/or disease state of the host.

In some embodiments in accordance with the present technology (example A38), an animal monitoring system includes at least one sensor device configured to be associated with a subject (e.g., a human or an animal), the sensor device including: one or more sensors configured to detect and/or measure one or more biomarkers of the animal, and an electronics unit in electrical communication with the one or more sensors and configured to process signals from the one or more sensors and transmit data corresponding to the processed signals; and a receiver device configured to receive the data transmitted by the sensing unit and to process the received data and output a representation of the processed data.

Example A39 includes the system of example A38 or any of examples A38-A59, wherein the sensor device is configured to be associated with an external portion of the subject (e.g., human or an animal).

Example A40 includes the system of example A39 or any of examples A38-A59, wherein the sensor device is configured to be integrated with a wearable apparatus that is configured to attach to the external portion of the subject (e.g., a human or an animal).

Example A41 includes the system of example A40 or any of examples A38-A59, wherein the external portion of the subject is a limb (e.g., a leg) and the wearable apparatus places the sensor device on a surface of the subject adjacent to an internal anatomical structure.

Example A42 includes the system of example A40 or any of examples A38-A59, wherein the external portion of the subject (e.g., a human or an animal) is an abdomen and the wearable apparatus places the sensor device on a surface of the animal adjacent to the digestive system of the animal.

Example A43 includes the system of example A40 or any of examples A38-A59, wherein the external portion of the subject (e.g., a human or an animal) is a chest and the wearable structure places the sensor device on a surface of the animal adjacent to the heart of the animal.

Example A44 includes the system of example A38 or any of examples A38-A59, wherein the sensor device is configured to be associated with an internal anatomical structure of the subject (e.g., human or an animal).

Example A45 includes the system of example A44 or any of examples A38-A59, wherein the internal anatomical structure is a bone.

Example A46 includes the system of example A44 or any of examples A38-A59, wherein the internal anatomical structure is an organ or system of the subject.

Example A47 includes the system of example A46 or any of examples A38-A59, wherein the organ or system comprises one or more of the cardiovascular system, the heart, the gastrointestinal or digestive system, and the stomach.

Example A48 includes the system of example A38 or any of examples A38-A59, wherein the one or more sensors comprises an inertial measurement unit.

Example A49 includes the system of example A48 or any of examples A38-A59, wherein the sensor device transmits kinematic data corresponding to movement of a body portion with which the sensor device is associated, and the receiver device is configured to analyze the kinematic data to provide representations (waveform graphs, measures, counts, etc.) of gait, cadence, and/or step.

Example A50 includes the system of example A48 or any of examples A38-A59 wherein the sensor device transmits kinematic data during each of a plurality of different time periods, and the receiver device analyzes the kinematic data to provide representations of gait, cadence, and/or step for each of the plurality of different times.

Example A51 includes the system of example A38 or any of examples A38-A59, wherein the one or more sensors comprises a mechanical stress sensor.

Example A52 includes the system of example A51 or any of examples A38-A59, wherein the sensor device transmits data corresponding to sounds and the receiver device is configured to process the sounds to provide representations (an alert of detected disorder, a measure of sound (dB), a sound waveform, a sound frequency) of a digestive disorder (e.g., colic).

Example A53 includes the system of example A38 or any of examples A38-A59, wherein the one or more sensors comprises an ECG sensor.

Example A54 includes the system of example A53 or any of examples A38-A59, wherein the sensor device transmits data corresponding to one or more of ECG waveforms and/or heart rate, and the receiver device is configured to process the ECG waveform and/or heart rate to provide representations (an alert of cardiac arrythmia, a measure of heart rate, an ECG waveform) of cardiac condition.

Example A55 includes the system of example A38 or any of examples A38-A59, wherein the one or more sensors comprises a temperature sensor.

Example A56 includes the system of examples A55 or any of examples A38-A59, wherein the sensor device transmits data corresponding to temperature, and the receiver device is configured to process the temperature information to provide representations (a temperature above a threshold indicative of infection, a temperature above a threshold indicative of inflammation) of a condition (infection, inflammation etc.).

Example A57 includes the system of example A38 or any of examples A38-A59, wherein the one or more sensors comprises a metabolic sensor.

Example A58 includes the system of example A57 or any of examples A38-A59, wherein the metabolic sensor is a blood glucose sensor and the sensor device transmits data corresponding to blood glucose level and the receiving device is configured to process the blood glucose level information and to provide representations (a measure of the current level, a display of the level over time, an alert if the level is above a threshold).

Example A59 includes the system of example A38 or any of examples A38-A58, further comprising a computing device configured to receive data from the receiver device and to analyze the data and generate representations of the data.

In some embodiments in accordance with the present technology (example A60), there is provided a sensor device configured to be associated with an animal, the sensor device including: an apparatus configured to be attached to the animal; and one or more sensors integrated with the apparatus and configured to detect and/or measure one or more biomarkers of the animal.

Example A61 includes the sensor device of example A60, further comprising an electronics unit in electrical communication with the one or more sensors and configured to process signals from the one or more sensors and transmit data corresponding to the processed signals.

In some embodiments in accordance with the present technology (example A62), an implantable medical device for monitoring mechanical stress from within a host includes a hermetically sealed housing; and a unimorph piezoelectric sensor encased within the housing and configured to receive internal mechanical energy signal that emanates within the host from an internal body structure and to transduce the received internal mechanical energy signal to an electrical signal indicative of a physiological function by the internal body structure.

Example A63 includes the device of example A62 or any of examples A62-A101, wherein the unimorph piezoelectric sensor comprises: a piezoelectric material layer; a first layer coupled to a first side of the piezoelectric material layer and configured in the hermetically sealed housing to face outward of the implantable medical device, the first layer comprising a biocompatible, electrically conductive, non-piezoelectric material having a Young's modulus within 2×-3× of a Young's modulus of the piezoelectric material layer; and a second layer coupled to a second side of the piezoelectric material layer opposite the first side, the second layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically conductive, non-piezoelectric material is transferred through the first layer and into the piezoelectric material to transduce the stress into electrical energy corresponding to the electrical signal indicative of the physiological function by the internal body structure, wherein the first layer and the second layer are electrically addressable to detect the electrical signal by an electrical circuit.

Example A64 includes the device of example A63 or any of examples A62-A101, wherein the piezoelectric material layer includes one or more of lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$).

Example A65 includes the device of example A63 or any of examples A62-A101, wherein the biocompatible, electrically conductive, non-piezoelectric material of the first layer includes one or more of titanium, a biocompatible stainless-steel, a cobalt-chromium alloy, nitinol, or a combination thereof.

Example A66 includes the device of example A63 or any of examples A62-A101, wherein the first layer further comprises a biocompatible, electrically insulative, non-piezoelectric material that includes a high-purity ceramic.

Example A67 includes the device of example A66 or any of examples A62-A101, wherein the high-purity ceramic includes alumina ($Al_2O_3$).

Example A68 includes the device of example A63 or any of examples A62-A101, wherein the electrically conductive, non-piezoelectric material of the second layer includes one or more of titanium, gold, platinum, silver, copper, nickel, aluminum, palladium, or other conductive material, including an alloy or other combination thereof.

Example A69 includes the device of example A63 or any of examples A62-A101, wherein the second layer is configured as two electrode structures, comprising: a center electrode; and an annular electrode that is positioned around and separated from the center electrode by a gap, or wherein the second layer of the unimorph piezoelectric sensor is configured to have a length or a diameter that is equal to the length or the diameter of the piezoelectric material layer of the unimorph piezoelectric sensor.

Example A70 includes the device of example A62 or any of examples A62-A101, wherein the unimorph piezoelectric sensor comprises: a piezoelectric material layer; a first layer configured in the hermetically sealed housing to face outward of the implantable medical device, the first layer comprising a biocompatible, electrically insulative, non-piezoelectric material having a Young's modulus within 2×-3× of a Young's modulus of the piezoelectric material layer; a second layer coupled to a first side of the piezoelectric material, the second layer comprising an electrically conductive, non-piezoelectric material; and a third layer coupled to a second side of the piezoelectric material layer opposite the first side and coupled to a side of the first layer, the third layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically insulative, non-piezoelectric material is transferred through the first layer and through the third layer and into the piezoelectric material to transduce the stress into electrical energy corresponding to the electrical signal indicative of the physiological function by the internal body structure, wherein the second layer and the third layer are electrically addressable to detect the electrical signal by an electrical circuit.

Example A71 includes the device of example A70 or any of examples A62-A101, wherein the piezoelectric material layer includes one or more of lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$).

Example A72 includes the device of example A70 or any of examples A62-A101, wherein the third layer includes one or more of titanium, gold, platinum, silver, copper, nickel, aluminum, palladium, or other conductive material, including an alloy or other combination thereof.

Example A73 includes the device of example A70 or any of examples A62-A101, wherein the biocompatible, electrically insulative, non-piezoelectric material of the first layer includes a high-purity ceramic.

Example A74 includes the device of example A73 or any of examples A62-A101, wherein the high-purity ceramic includes alumina ($Al_2O_3$).

Example A75 includes the device of example A70 or any of examples A62-A101, wherein the electrically conductive, non-piezoelectric material of the second layer includes one or more of titanium, gold, platinum, silver, copper, nickel, aluminum, palladium, or other conductive material, including an alloy or other combination thereof.

Example A76 includes the device of example A70 or any of examples A62-A101, wherein the second layer is configured as two electrode structures, comprising a center electrode; and an annular electrode that is positioned around and separated from the center electrode by a gap, or wherein the second layer of the unimorph piezoelectric sensor is configured to have a length or a diameter that is equal to the length or the diameter of the piezoelectric material layer of the unimorph piezoelectric sensor.

Example A77 includes the device of any of examples A62-A76 or any of examples A62-A101, wherein the unimorph piezoelectric sensor is configured to have a cylindrical geometry and a circular shape.

Example A78 includes the device of any of examples A62-A77 or any of examples A62-A101, wherein the unimorph piezoelectric sensor is configured to have a rectangular, elliptical, triangular, or other polygonal shape geometry and/or shape.

Example A79 includes the device of any of examples A62-A78 or any of examples A62-A101, wherein the unimorph piezoelectric sensor does not transduce displacement caused by the received internal mechanical energy signal to transduce the received internal mechanical energy signal to the electrical signal indicative of the physiological function by the internal body structure.

Example A80 includes the device of any of examples A62-A79 or any of examples A62-A101, further comprising a dielectric material layer surrounding an outside of the hermetically sealed housing.

Example A81 includes the device of example A80 or any of examples A62-A101, wherein the dielectric material layer includes at least one of parylene, sapphire, a urethane, a silicone, or an $Al_2O_3$ material.

Example A82 includes the device of example A62 or any of examples A62-A101, wherein the hermetically sealed housing includes titanium (Ti).

Example A83 includes the device of example A62 or any of examples A62-A101, wherein the internal mechanical energy signal includes a transmission of mechanical energy that propagates in an in vivo medium including one or more of a gas, liquid, or solid.

Example A84 includes the device of example A62 or any of examples A62-A101, wherein the unimorph piezoelectric sensor is configured to transduce a pressure differential upon at least a portion of the unimorph piezoelectric sensor that is caused by the internal mechanical energy signal.

Example A85 includes the device of example A84 or any of examples A62-A101, wherein the unimorph piezoelectric sensor is configured to undergo no displacement of greater than 10 nm.

Example A86 includes the device of example A84 or any of examples A62-A101, wherein the unimorph piezoelectric sensor is configured to measure the pressure differential between an inside and an outside of the unimorph piezoelectric sensor with respect the hermetically sealed housing of the implantable medical device.

Example A87 includes the device of example A84 or any of examples A62-A101, wherein the unimorph piezoelectric sensor is configured to measure the pressure differential that creates a stress inside the hermetically sealed housing of the implantable medical device that is detectable and measurable by the unimorph piezoelectric sensor that directly or indirectly contacts an inside wall or surface of the hermetically sealed housing.

Example A88 includes the device of any of examples A62-A87 or any of examples A62-A101, comprising an electronics unit in electrical communication with the in vivo mechanical stress sensor, wherein the electronics unit is in a hermetically sealed casing.

Example A89 includes the device of example A88 or any of examples A62-A101, wherein the electronics unit comprises a power supply.

Example A90 includes the device of example A88 or any of examples A62-A101, wherein the electronics unit comprises a signal processing unit and a wireless communications unit configured to process electrical signals associated with the detected internal mechanical energy signal as data and wirelessly transmit the data to an external processor.

Example A91 includes the device of example A90 or any of examples A62-A101, wherein the signal processing unit includes a signal conditioning circuit configured to process the electrical signals associated with the received internal mechanical energy signal by one or more of amplifying the electrical signals, filtering the electrical signals, or converting the electrical signals from analog to digital.

Example A92 includes the device of example A90 or any of examples A62-A101, wherein the electronics unit comprises a data processing unit in communication with the signal conditioning circuit, the data processing unit comprising a processor and a memory and configured to process the amplified, filtered, or converted electrical signals as biomedical data.

Example A93 includes the device of example A88 or any of examples A62-A101, wherein the electronics unit comprises a printed circuit board (PCB) having a substrate and electrical interconnections disposed on the substrate, wherein the electrical interconnections are coupled to a plurality of electrical interconnection wires that span from the unimorph piezoelectric sensor.

Example A94 includes the device of any of examples A88-A93 or any of examples A62-A101, comprising at least one secondary sensor in communication with the electronics unit and operable to measure a secondary measurement in compilation with an internal mechanical energy signal measurement by the unimorph piezoelectric sensor, wherein the secondary measurement includes one or more of a biological parameter, a physiological parameter, an electrophysiological parameter, or a physical parameter of the host within which the implantable medical device is deployed.

Example A95 includes the device of example A94 or any of examples A62-A101, wherein the at least one secondary sensor includes an inertial measurement unit (IMU) configured to detect motion of the implantable medical device in multiple degrees of freedom.

Example A96 includes the device of example A94 or any of examples A62-A101, wherein the at least one secondary sensor includes an electrophysiological sensor configured to detect an electrophysiological signal of an anatomic structure of the host, wherein the electrophysiological sensor includes an electrocardiogram (ECG) sensor.

Example A97 includes the device of example A96 or any of examples A62-A101, wherein the at least one secondary sensor includes a step counter comprising one or more of at least one accelerometer or at least one rotational rate sensor to detect a quantity of steps moved by the host over a period of time.

Example A98 includes the device of example A94 or any of examples A62-A101, wherein the at least one secondary sensor includes an analyte sensor configured to detect an analyte of a biological fluid of the host in a region where the implantable medical device is deployed.

Example A99 includes the device of example A94 or any of examples A62-A101, wherein the at least one secondary sensor includes a pH sensor configured to detect a pH level of a biological fluid of the host in a region where the implantable medical device is deployed.

Example A100 includes the device of example A94 or any of examples A62-A101, wherein the at least one secondary sensor includes a temperature sensor configured to detect temperature of a tissue structure or an area within the host in a region where the implantable medical device is deployed.

Example A101 includes the device of example A94 or any of examples A62-A100, wherein the at least one secondary sensor includes an ultrasound sensor configured to detect one or more of a vascular blood flow, a vessel wall thickness, and/or a vessel diameter at a reference point in a cardiac cycle of the host or as a function of time during the cardiac cycle.

In some embodiments in accordance with the present technology (example A102), a system for in vivo monitoring of internal mechanical energy associated with physiological phenomena originating from an anatomic structure, comprising: the implantable medical device of any of examples A62-A101; and a data processing system, comprising a processor and a memory, in data communication with the implantable medical device and configured to receive the data from the implantable medical device and process the received data to determine an internal mechanical energy signal parameter associated with a physiological function of the anatomic structure.

In some embodiments in accordance with the present technology (example A103), a method for assessing a clinical condition of a patient includes detecting an internal mechanical energy signal associated with a physiological phenomenon of an internal body structure from within the patient, wherein the detecting is accomplished by an implantable medical device that comprises a physical stress sensor.

Example A104 includes the method of example A103 or any of examples A103-A113, further comprising processing the detected internal mechanical energy signal to produce biomedical data; and using the biomedical data to determine a health and/or disease state of the patient.

Example A105 includes the method of example A103 or any of examples A103-A113, wherein the internal mechanical energy signal is an internal mechanical pressure wave.

Example A106 includes the method of example A103 or any of examples A103-A113, wherein the physiological phenomenon is a movement of a fluid or of an organ.

Example A107 includes the method of example A103 or any of examples A103-A113, wherein the internal body structure includes at least one of a heart, a blood vessel, a lung or lungs, or a region of a gastrointestinal system.

Example A108 includes the method of example A103 or any of examples A103-A113, wherein the physical stress sensor detects a fluid turbulence within or proximate of the internal body structure.

Example A109 includes the method of example A108 or any of examples A103-A113, wherein the fluid turbulence includes at least one of a breathing turbulence or blood flow turbulence as blood travels through a heart or a blood vessel of the patient.

Example A110 includes the method of example A103 or any of examples A103-A113, wherein the physical stress sensor detects a tissue contact of the internal body structure.

Example A111 includes the method of example A110 or any of examples A103-A113, wherein the tissue contact includes a heart valve or at least two heart valves closing.

Example A112 includes the method of example A103 or any of examples A103-A113, wherein the physical stress sensor detects a blood flow through a lesion caused by a restenosis of a blood vessel.

Example A113 includes the method any of examples A103-A112, wherein the implantable medical device is the implantable medical device of any of examples A1-A35 or any of examples A62-A101.

In some embodiments in accordance with the present technology (example A114), a method for assessing a clinical condition of a patient includes simultaneously detecting a first internal mechanical energy signal and a second internal mechanical energy signal associated with a first physiological phenomenon and a second physiological phenomenon, respectively, of a first internal body structure and a second internal body structure, respectively, from within the patient, wherein the detecting is accomplished by a single implantable medical device that comprises a physical stress sensor.

Example A115 includes the method of example A114 or any of examples A114-A124, further comprising processing the detected first internal mechanical energy signal and the detected second internal mechanical energy signal to produce biomedical data; and using the biomedical data to determine a health and/or disease state of the patient.

Example A116 includes the method of example A114 or any of examples A114-A124, wherein the first internal mechanical energy signal is an internal mechanical pressure wave generated by a heart of the patient or a fluid flow within the heart or at least one proximate blood vessel of the patient, and wherein the second internal mechanical energy signal may is internal mechanical pressure wave generated by a lung or lungs of the patient or a fluid inhaled by, within, or expelled by the lung or lungs.

Example A117 includes the method of example A114 or any of examples A114-A124, wherein the first physiological phenomenon is a movement of blood in a heart or through one or more heart valves opening or closing, and wherein the second physiological phenomenon is a movement of air into, within, or out of a lung or lungs of the patient.

Example A118 includes the method of example A114 or any of examples A114-A124, wherein the first internal body structure includes one or more of a heart or at least one blood vessel of the patient, and wherein the second internal body structure includes a lung or lungs of the patient.

Example A119 includes the method of example A114 or any of examples A114-A124, wherein the physical stress sensor detects a fluid turbulence within or proximate of the internal body structure.

Example A120 includes the method of example A119 or any of examples A114-A124, wherein the fluid turbulence includes at least one of a breathing turbulence or blood flow turbulence as blood travels through a heart or a blood vessel of the patient.

Example A121 includes the method of example A114 or any of examples A114-A124, wherein the physical stress sensor detects a tissue contact of the internal body structure.

Example A122 includes the method of example A121 or any of examples A114-A124, wherein the tissue contact includes a heart valve or at least two heart valves closing.

Example A123 includes the method of example A114 or any of examples A114-A124, wherein the physical stress sensor detects a blood flow through a lesion caused by a restenosis of a blood vessel.

Example A124 includes the method any of examples A114-A123, wherein the implantable medical device is the implantable medical device of any of examples A1-A35 or any of examples A62-A101.

In some embodiments in accordance with the present technology (example A125), a method for assessing a clinical condition of a patient includes simultaneously detecting (i) an internal mechanical energy signal and (ii) an electrophysiological energy signal associated with a physiological phenomenon of at least one internal body structure, from within the patient, wherein the detecting is accomplished by a single implantable medical device that comprises (i) a physical stress sensor and (ii) an electrophysiological sensor including an electrocardiogram (ECG) sensor, respectively.

Example A126 includes the method of example A125 or any of examples A125-A127, further comprising processing the detected internal mechanical energy signal and the detected electrophysiological energy signal to produce biomedical data; and using the biomedical data to determine a health and/or disease state of the patient.

Example A127 includes the method any of examples A125-A126, wherein the implantable medical device is the implantable medical device of any of examples A1-A35 or any of examples A62-A101.

In some embodiments in accordance with the present technology (example A128), a method for assessing a clinical condition of a patient includes simultaneously detecting (i) an internal mechanical energy signal associated with a physiological phenomenon of at least one internal body structure, from within the patient, and (ii) a position, orientation, and/or a movement of the patient, wherein the detecting is accomplished by a single implantable medical device that comprises (i) a physical stress sensor and (ii) an inertial measurement unit (IMU), respectively.

Example A129 includes the method of example A128 or any of examples A128-A132, further comprising processing the detected internal mechanical energy signal and the detected position, orientation, and/or a movement of the patient to produce biomedical data; and using the biomedical data to determine a health and/or disease state of the patient.

Example A130 includes the method of example A128 or any of examples A128-A132, wherein the IMU comprises one or more of at least one accelerometer, at least one rotational rate sensor, or at least one magnetometer.

Example A131 includes the method of example A128 or any of examples A128-A132, wherein position, orientation, and/or movement of the patient detected by the IMU is used to determine whether the patient is (1) awake and at rest, (2) undergoing activity, or (3) is sleeping.

Example A132 includes the method any of examples A128-A131, wherein the implantable medical device is the implantable medical device of any of examples A1-A35 or any of examples A62-A101.

In some embodiments in accordance with the present technology (example A133), a method for assessing a clinical condition of a patient includes simultaneously detecting (i) an internal mechanical energy signal associated with a physiological phenomenon of at least one internal body structure, from within the patient and (ii) a core body temperature of the patient, wherein the detecting is accomplished by a single implantable medical device that comprises (i) a physical stress sensor and (ii) a temperature sensor, respectively.

Example A134 includes the method of example A133 or any of examples A133-A135, further comprising processing the detected internal mechanical energy signal and the detected core body temperature of the patient to produce biomedical data; and using the biomedical data to determine a health and/or disease state of the patient.

Example A135 includes the method any of examples A133-A134, wherein the implantable medical device is the implantable medical device of any of examples A1-A35 or any of examples A62-A101.

In some embodiments in accordance with the present technology (example A136), a method for assessing a clinical condition of a patient includes simultaneously detecting (i) an internal mechanical energy signal associated with a physiological phenomenon of at least one internal body structure, from within the patient, (ii) a position, orientation, and/or a movement of the patient, and (iii) a core body temperature of the patient, wherein the detecting is accomplished by a single implantable medical device that comprises (i) a physical stress sensor, (ii) an inertial measurement unit (IMU), and (iii) a temperature sensor, respectively.

Example A137 includes the method of example A136 or any of examples A136-A139, further comprising processing the detected internal mechanical energy signal, the detected position, orientation, and/or a movement of the patient, and the detected core body temperature of the patient to produce biomedical data; and using the biomedical data to determine a health and/or disease state of the patient.

Example A138 includes the method of example A136 or any of examples A136-A139, wherein the IMU comprises one or more of at least one accelerometer, at least one rotational rate sensor, or at least one magnetometer.

Example A139 includes the method any of examples A136-A138, wherein the implantable medical device is the implantable medical device of any of examples A1-A35 or any of examples A62-A101.

In some embodiments in accordance with the present technology (example A140), a method for assessing a clinical condition of a patient includes simultaneously detecting (i) an internal mechanical energy signal and (ii) an electrophysiological energy signal associated with a physiological phenomenon of at least one internal body structure, from within the patient, (iii) a position, orientation, and/or a movement of the patient, and (iv) a core body temperature of the patient, wherein the detecting is accomplished by a single implantable medical device that comprises (i) a physical stress sensor, (ii) an electrophysiological sensor including an electrocardiogram (ECG) sensor, (iii) an inertial measurement unit (IMU), and (iv) a temperature sensor, respectively.

Example A141 includes the method of example A140 or any of examples A140-A145, further comprising processing the detected internal mechanical energy signal, the detected electrophysiological energy signal, the detected position, orientation, and/or a movement of the patient, and the detected core body temperature of the patient to produce biomedical data; and using the biomedical data to determine a health and/or disease state of the patient.

Example A142 includes the method of example A140 or any of examples A140-A145, wherein the IMU comprises one or more of at least one accelerometer, at least one rotational rate sensor, or at least one magnetometer.

Example A143 includes the method of example A140 or any of examples A140-A145, wherein position, orientation, and/or movement of the patient detected by the IMU is used to determine whether the patient is (1) awake and at rest, (2) undergoing activity, or (3) is sleeping.

Example A144 includes the method of example A140 or any of examples A140-A145, wherein the clinical condition includes mitral valve regurgitation (MVR).

Example A145 includes the method any of examples A140-A144, wherein the implantable medical device is the implantable medical device of any of examples A1-A35 or any of examples A62-A101.

In some embodiments in accordance with the present technology (example A146), a method for monitoring an anatomic structure from an implantable medical device, the method comprising providing the implantable medical device that comprises a physical stress sensor, wherein the implantable medical device is positioned proximate to an anatomic structure of interest in a subject's body; receiving, at the physical stress sensor, an internal mechanical energy signal that emanates within the subject's body from the anatomic structure of interest; and converting, by the physical stress sensor, the received internal mechanical energy signal to an electrical signal indicative of a physiological function by the anatomic structure of interest.

Example A147 includes the method of example A146 or any of examples A146-A157, wherein the anatomic structure of interest includes a heart of the subject, a lung or lungs of the subject, or both the heart and the lung or lungs of the subject.

Example A148 includes the method of example A146 or any of examples A146-A157, wherein the implantable medical device is positioned to be coupled to the anatomic structure of interest or positioned within 50 mm or less of the anatomic structure.

Example A149 includes the method of any of examples A146-A148 or any of examples A146-A157, wherein the implantable medical device further comprises an electrophysiological sensor that includes an electrocardiogram (ECG) sensor, and the method further comprising simultaneously detecting (i) the internal mechanical energy signal that emanates from the anatomic structure of interest detected by the physical stress sensor and (ii) an electrophysiological energy signal associated with a physiological phenomenon of at least one internal body structure detected by the electrophysiological sensor, from within the subject.

Example A150 includes the method of example A149 or any of examples A146-A157, wherein the simultaneous detecting comprises receiving, at the electrophysiological sensor, the electrophysiological energy signal that is associated with the physiological phenomenon of the at least one internal body structure, and converting, by the electrophysiological sensor, the electrophysiological energy signal to a second electrical signal indicative of an electrophysiological function of the at least one internal body structure.

Example A151 includes the method of any of examples A146-A150 or any of examples A146-A157, wherein the implantable medical device further comprises an inertial measurement unit (IMU), and the method further comprising simultaneously detecting (i) the internal mechanical energy signal that emanates from the anatomic structure of interest detected by the physical stress sensor and (ii) a position, orientation, and/or a movement of the subject detected by the IMU.

Example A152 includes the method of example A151 or any of examples A146-A157, wherein the simultaneous detecting comprises producing, at the IMU, a third electrical signal indicative of the position, orientation, and/or movement by the subject.

Example A153 includes the method of example A151 or any of examples A146-A157, wherein the IMU comprises one or more of at least one accelerometer, at least one rotational rate sensor, or at least one magnetometer.

Example A154 includes the method of example A151 or any of examples A146-A157, wherein position, orientation, and/or movement of the patient detected by the IMU is used to determine whether the patient is (1) awake and at rest, (2) undergoing activity, or (3) is sleeping.

Example A155 includes the method of any of examples A146-A154 or any of examples A146-A157, wherein the implantable medical device further comprises a temperature sensor, and the method further comprising simultaneously detecting (i) the internal mechanical energy signal that emanates from the anatomic structure of interest detected by the physical stress sensor and (ii) a core body temperature of the subject detected by the temperature sensor.

Example A156 includes the method of example A155 or any of examples A146-A157, wherein the simultaneous detecting comprises producing, at the temperature sensor, a temperature measurement of the subject to a fourth electrical signal indicative of core body temperature of the subject within a region where the implantable medical device is implanted.

Example A157 includes the method any of examples A146-A156, wherein the implantable medical device is the implantable medical device of any of examples A1-A35 or any of examples A62-A101.

In some embodiments in accordance with the present technology (example A158), a method for assessing a clinical condition of a patient having a beating heart, where the clinical condition is pulmonary arterial pressure (PAP), the method comprising (a) detecting ECG data generated by the beating heart while simultaneously (b) detecting mechanical pressure wave data generated by the beating heart, (i) the detecting ECG data and the detecting mechanical pressure wave data occurring simultaneously while the heart proceeds through an aortic (A2) and a pulmonary (P2) component of a second heart sound (S2) of a heartbeat, (ii) wherein the mechanical pressure wave and the ECG data are obtained simultaneously by a single implantable medical device comprising a stress sensor and an electrophysiological (e.g., ECG) sensor; (c) optionally, analyzing the ECG data to identify a time point when the beating heart is in an S2 region of the heartbeat; (d) optionally, analyzing the ECG data to identify a time point when A2 and a time point when P2 are taking place in an S2 region; (e) optionally, determining a A2-P2 splitting interval (S1), where S1 is a time interval between the time point of A2 and the time point of P2 of a heartbeat, where the time interval is normalized to the heart rate; (f) optionally, calculating a pulmonary arterial pressure (PAP) based on the determined S1.

In some embodiments in accordance with the present technology (example B1), an implantable medical device for monitoring mechanical stress from within a host includes a hermetically sealed housing; and a physical stress sensor encased within the housing and configured to receive an internal mechanical energy signal that emanates from within the host from an internal body structure and to transduce the received internal mechanical energy signal to an electrical signal indicative of a physiological function by the internal body structure.

Example B2 includes the device of example B1 or any of examples B1-B47, wherein the physical stress sensor is a unimorph piezoelectric sensor having a rigid unimorph piezoelectric structure comprising a piezoelectric transducer coupled to a biocompatible stress absorption material and to an electrode, wherein the biocompatible stress absorption material is operable to receive the internal mechanical energy signal for the unimorph piezoelectric sensor and transfer the internal mechanical energy signal to the piezoelectric transducer, and wherein the electrode is operable to receive the electrical signal transduced by the piezoelectric transducer.

Example B3 includes the device of example B2 or any of examples B1-B47, wherein the rigid unimorph piezoelectric structure includes a thickness in a range of 300 μm to 750 μm.

Example B4 includes the device of example B3 or any of examples B1-B47, wherein the piezoelectric transducer includes a thickness in a range of 150 μm to 250 μm, the biocompatible stress absorption material includes a thickness in a range of 150 μm to 250 μm, and the electrode includes a thickness in a range of 100 nm to 250 μm.

Example B5 includes the device of example B3 or any of examples B1-B47, wherein the piezoelectric transducer includes lead zirconate titanate (PZT), the biocompatible stress absorption material includes titanium, and the electrode includes one or more of titanium, gold, platinum, silver, copper, nickel, aluminum, palladium, or combination thereof.

Example B6 includes the device of example B5 or any of examples B1-B47, wherein the biocompatible stress absorption material constitutes a portion of the hermetically sealed housing.

Example B7 includes the device of example B2 or any of examples B1-B47, wherein the rigid unimorph piezoelectric structure is configured to transduce an applied stress from the received internal mechanical energy to a measurable electrical signal proportionate to the applied stress without undergoing displacement greater than 10 nm.

Example B8 includes the device of example B2 or any of examples B1-B47, wherein the unimorph piezoelectric sensor comprises a piezoelectric material layer; a first layer coupled to a first side of the piezoelectric material layer and configured in the hermetically sealed housing to face outward of the implantable medical device, the first layer comprising a biocompatible, electrically conductive, non-piezoelectric material having a Young's modulus within 2×-3× of a Young's modulus of the piezoelectric material layer; and a second layer coupled to a second side of the piezoelectric material layer opposite the first side, the second layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically conductive, non-piezoelectric material is transferred through the first layer and into the piezoelectric material to transduce the stress into electrical energy corresponding to the electrical signal indicative of the physiological function by the internal body structure, wherein the first layer and the second layer are electrically addressable to detect the electrical signal by an electrical circuit.

Example B9 includes the device of example B8 or any of examples B1-B47, wherein the piezoelectric material layer includes one or more of lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$).

Example B10 includes the device of example B8 or any of examples B1-B47, wherein the biocompatible, electrically conductive, non-piezoelectric material of the first layer includes one or more of titanium, a biocompatible stainless-steel, a cobalt-chromium alloy, nitinol, or a combination thereof.

Example B11 includes the device of example B8 or any of examples B1-B47, wherein the first layer further comprises a biocompatible, electrically insulative, non-piezoelectric material that includes a high-purity ceramic having a Young's modulus within 0.5×-3× of a Young's modulus of the piezoelectric material layer.

Example B12 includes the device of example B11 or any of examples B1-B47, wherein the high-purity ceramic includes alumina ($Al_2O_3$).

Example B13 includes the device of example B8 or any of examples B1-B47, wherein the electrically conductive, non-piezoelectric material of the second layer includes one or more of titanium, gold, platinum, silver, copper, nickel, aluminum, palladium, or other conductive material, including an alloy or other combination thereof.

Example B14 includes the device of example B8 or any of examples B1-B47, wherein the second layer of the unimorph piezoelectric sensor is configured to have a length or a diameter that is equal to the length or the diameter of the piezoelectric material layer of the unimorph piezoelectric sensor.

Example B15 includes the device of example B8 or any of examples B1-B47, wherein the second layer of the unimorph piezoelectric sensor is configured as two electrode structures, comprising a center electrode; and an annular electrode that is positioned around and separated from the center electrode by a gap.

Example B16 includes the device of example B2 or any of examples B1-B47, wherein the unimorph piezoelectric sensor comprises a piezoelectric material layer; a first layer configured in the hermetically sealed housing to face outward of the implantable medical device, the first layer comprising a biocompatible, electrically insulative, non-piezoelectric material; a second layer coupled to a first side of the piezoelectric material, the second layer comprising an electrically conductive, non-piezoelectric material; and a third layer coupled to a second side of the piezoelectric material layer opposite the first side and coupled to a side of the first layer, the third layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically insulative, non-piezoelectric material is transferred through the first layer and through the third layer and into the piezoelectric material to transduce the stress into electrical energy corresponding to the electrical signal indicative of the physiological function by the internal body structure, wherein the second layer and the third layer are electrically addressable to detect the electrical signal by an electrical circuit.

Example B17 includes the device of example B16 or any of examples B1-B47, wherein the piezoelectric material layer includes one or more of lead zirconate titanate (PZT), lead lanthanum zirconate titanate (PLZT), zinc oxide (ZnO), quartz, polyvinylidene fluoride or polyvinylidene difluoride (PVDF) aluminum nitride (AlN), scandium aluminum nitride (ScAlN), barium titanate ($BaTiO_3$), lead titanate ($PbTiO_3$), potassium niobate ($KNbO_3$), lithium niobate ($LiNbO_3$), lithium tantalate ($LiTaO_3$), and/or sodium tungstate ($Na_2WO_4$).

Example B18 includes the device of example B16 or any of examples B1-B47, wherein the biocompatible, electrically insulative, non-piezoelectric material of the first layer includes a high-purity ceramic.

Example B19 includes the device of example B18 or any of examples B1-B47, wherein the high-purity ceramic includes alumina ($Al_2O_3$).

Example B20 includes the device of example B16 or any of examples B1-B47, wherein the electrically conductive, non-piezoelectric material of the second layer and/or the third layer includes one or more of titanium, gold, platinum, silver, copper, nickel, aluminum, palladium, or other conductive material, including an alloy or other combination thereof.

Example B21 includes the device of example B16 or any of examples B1-B47, wherein the second layer of the unimorph piezoelectric sensor is configured to have a length or a diameter that is equal to the length or the diameter of the piezoelectric material layer of the unimorph piezoelectric sensor.

Example B22 includes the device of example B16 or any of examples B1-B47, wherein the second layer of the unimorph piezoelectric sensor is configured as two electrode structures, comprising a center electrode; and an annular electrode that is positioned around and separated from the center electrode by a gap.

Example B23 includes the device of example B2 or any of examples B1-B47, wherein the unimorph piezoelectric sensor is configured to have a cylindrical shape.

Example B24 includes the device of example B2 or any of examples B1-B47, wherein the unimorph piezoelectric sensor is configured to have a rectangular, elliptical, triangular, or other polygonal shape.

Example B25 includes the device of example B2 or any of examples B1-B47, further comprising a dielectric material layer surrounding an outside of the hermetically sealed housing.

Example B26 includes the device of example B25 or any of examples B1-B47, wherein the dielectric material layer includes at least one of parylene, sapphire, a urethane, a silicone, or an $Al_2O_3$ material.

Example B27 includes the device of example B2 or any of examples B1-B47, wherein the hermetically sealed housing includes titanium (Ti).

Example B28 includes the device of example B2 or any of examples B1-B47, wherein the internal mechanical energy signal includes a transmission of mechanical energy that propagates in an in vivo medium including one or more of a gas, liquid, or solid.

Example B29 includes the device of example B28 or any of examples B1-B47, wherein the transmission of mechanical energy includes sound energy associated with one or both of blood flow in a blood vessel or a heart of the host and an airflow in an airway or a lung of the host, and wherein the physical stress sensor is operable to detect the sound energy at a distance of at least 0.5 cm from a source of the sound energy.

Example B30 includes the device of example B28 or any of examples B1-B47, wherein the unimorph piezoelectric sensor is configured to detect the transmission of mechanical energy in a frequency range of 10 Hz to 1,000 Hz indicative of one or both of blood flow in a blood vessel or a heart of the host and an airflow in an airway or a lung of the host.

Example B31 includes the device of example B1 or example B2 or any of examples B1-B47, comprising an electronics unit in electrical communication with the physical stress sensor, wherein the electronics unit is in a hermetically sealed casing.

Example B32 includes the device of example B31 or any of examples B1-B47, wherein the electronics unit comprises a power supply.

Example B33 includes the device of example B31 or any of examples B1-B47, wherein the electronics unit comprises a signal processing unit and a wireless communications unit configured to process electrical signals associated with the detected internal mechanical energy signal as data and wirelessly transmit the data to an external processor.

Example B34 includes the device of example B33 or any of examples B1-B47, wherein the signal processing unit includes a signal conditioning circuit configured to process the electrical signals associated with the received internal mechanical energy signal by one or more of amplifying the electrical signals, filtering the electrical signals, or converting the electrical signals from analog to digital.

Example B35 includes the device of example B33 or any of examples B1-B47, wherein the electronics unit comprises a data processing unit in communication with the signal conditioning circuit, the data processing unit comprising a processor and a memory and configured to process the amplified, filtered, or converted electrical signals as biomedical data.

Example B36 includes the device of example B31 or any of examples B1-B47, wherein the electronics unit comprises a printed circuit board (PCB) having a substrate and electrical interconnections disposed on the substrate, wherein the electrical interconnections are coupled to a plurality of electrical interconnection wires that span from the physical stress sensor.

Example B37 includes the device of example B31 or any of examples B1-B47, comprising at least one secondary sensor in communication with the electronics unit and operable to measure a secondary measurement in compilation with an internal mechanical energy signal measurement by the physical stress sensor, wherein the secondary measurement includes one or more of a biological parameter, a physiological parameter, an electrophysiological parameter, or a physical parameter of the host within which the implantable medical device is deployed.

Example B38 includes the device of example B37 or any of examples B1-B47, wherein the at least one secondary sensor includes an inertial measurement unit (IMU) configured to detect motion of the implantable medical device in multiple degrees of freedom.

Example B39 includes the device of example B37 or any of examples B1-B47, wherein the at least one secondary sensor includes an electrophysiological sensor configured to detect an electrophysiological signal of an anatomic structure of the host, wherein the electrophysiological sensor includes an electrocardiogram (ECG) sensor.

Example B40 includes the device of example B39 or any of examples B1-B47, wherein the at least one secondary sensor includes a step counter comprising one or more of at least one accelerometer or at least one rotational rate sensor to detect a quantity of steps moved by the host over a period of time.

Example B41 includes the device of example B37 or any of examples B1-B47, wherein the at least one secondary sensor includes an analyte sensor configured to detect an analyte of a biological fluid of the host in a region where the implantable medical device is deployed.

Example B42 includes the device of example B37 or any of examples B1-B47, wherein the at least one secondary sensor includes a pH sensor configured to detect a pH level of a biological fluid of the host in a region where the implantable medical device is deployed.

Example B43 includes the device of example B37 or any of examples B1-B47, wherein the at least one secondary sensor includes a temperature sensor configured to detect temperature of a tissue structure or an area within the host in a region where the implantable medical device is deployed.

Example B44 includes the device of example B37 or any of examples B1-B47, wherein the at least one secondary sensor includes an ultrasound sensor configured to detect one or more of a vascular blood flow, a vessel wall thickness, and/or a vessel diameter at a reference point in a cardiac cycle of the host or as a function of time during the cardiac cycle.

Example B45 includes the device of example B37 or any of examples B1-B47, wherein the at least one secondary sensor includes (a) an electrophysiological sensor including an electrocardiogram (ECG) sensor, (b) an inertial measurement unit (IMU), and (c) a temperature sensor, and wherein the implantable medical device is configured to simultaneously detect (i) the internal mechanical energy signal detectable by the physical stress sensor and (ii) a plurality of secondary signals comprising (a) an electrophysiological energy signal associated with a physiological phenomenon of at least one internal body structure, from within the host, detectable by the ECG sensor, (b) a position, orientation, and/or a movement of the host detectable by the IMU, and (c) a core body temperature of the host detectable by the temperature sensor.

Example B46 includes the device of example B45 or any of examples B1-B47, wherein the implantable medical device is configured to process the detected internal mechanical energy signal, the detected electrophysiological energy signal, the detected position, orientation, and/or a movement of the host, and the detected core body temperature of the host to produce biomedical data; and use the biomedical data to determine a health and/or disease state of the host.

Example B47 includes the device of example B45 or any of examples B1-B46, wherein position, orientation, and/or movement of the host detected by the IMU is used to determine whether the host is (1) awake and at rest, (2) undergoing activity, or (3) is sleeping.

In some embodiments in accordance with the present technology (example B48), a system for in vivo monitoring of internal mechanical energy associated with physiological phenomena originating from an anatomic structure includes the implantable medical device of any of examples B1-B47; and a data processing system, comprising a processor and a memory, in data communication with the implantable medical device and configured to receive the data from the implantable medical device and process the received data to determine an internal mechanical energy signal parameter associated with a physiological function of the anatomic structure.

In some embodiments in accordance with the present technology (example B49), a method for monitoring an anatomic structure from an implantable medical device includes receiving, at a physical stress sensor of an implantable medical device, an internal mechanical energy signal that emanates within a subject's body from an anatomic structure of interest; and converting, by the physical stress sensor, the received internal mechanical energy signal to an electrical signal indicative of a physiological function by the anatomic structure of interest.

Example B50 includes the method of example B49 or any of examples B49-B65, wherein the anatomic structure of interest includes a heart of the subject, a lung or lungs of the subject, or both the heart and the lung or lungs of the subject.

Example B51 includes the method of example B49 or any of examples B49-B65, wherein the implantable medical device is positioned to be coupled to the anatomic structure of interest or positioned within 50 mm or less of the anatomic structure.

Example B52 includes the method of example B49 or any of examples B49-B65, wherein the physical stress sensor detects transmission of the internal mechanical energy that propagates in an in vivo medium including one or more of a gas, liquid, or solid in a frequency range of 10 Hz to 1,000 Hz.

Example B53 includes the method of any of examples B49-B52 or any of examples B49-B65, wherein the implantable medical device further comprises an electrophysiological sensor that includes an electrocardiogram (ECG) sensor, and the method further comprising simultaneously detecting (i) the internal mechanical energy signal that emanates from the anatomic structure of interest detected by the physical stress sensor and (ii) an electrophysiological energy signal associated with a physiological phenomenon of at least one internal body structure detected by the electrophysiological sensor, from within the subject.

Example B54 includes the method of example B53 or any of examples B49-B65, wherein the simultaneous detecting comprises receiving, at the electrophysiological sensor, the electrophysiological energy signal that is associated with the physiological phenomenon of the at least one internal body structure, and converting, by the electrophysiological sensor, the electrophysiological energy signal to a second electrical signal indicative of an electrophysiological function of the at least one internal body structure.

Example B55 includes the method of any of examples B49-B54 or any of examples B49-B65, wherein the implantable medical device further comprises an inertial measurement unit (IMU), and the method further comprising simultaneously detecting (i) the internal mechanical energy signal that emanates from the anatomic structure of interest detected by the physical stress sensor and (ii) a position, orientation, and/or a movement of the subject detected by the IMU.

Example B56 includes the method of example B55 or any of examples B49-B65, wherein the simultaneous detecting comprises producing, at the IMU, a third electrical signal indicative of the position, orientation, and/or movement by the subject.

Example B57 includes the method of example B55 or any of examples B49-B65, wherein position, orientation, and/or movement of the subject detected by the IMU is used to determine whether the subject is (1) awake and at rest, (2) undergoing activity, or (3) is sleeping.

Example B58 includes the method of any of examples B49-B57 or any of examples B49-B65, wherein the implantable medical device further comprises a temperature sensor, and the method further comprising simultaneously detecting (i) the internal mechanical energy signal that emanates from the anatomic structure of interest detected by the physical stress sensor and (ii) a core body temperature of the subject detected by the temperature sensor.

Example B59 includes the method of example B58 or any of examples B49-B65, wherein the simultaneous detecting comprises producing, at the temperature sensor, a temperature measurement of the subject to a fourth electrical signal indicative of core body temperature of the subject within a region where the implantable medical device is implanted.

Example B60 includes the method of any of examples B49-B59 or any of examples B49-B65, further comprising providing the implantable medical device that comprises the physical stress sensor, wherein the implantable medical device is positioned proximate to the anatomic structure of interest in the subject's body.

Example B61 includes the method of example B60 or any of examples B49-B65, wherein the providing the implantable medical device includes implanting the implantable medical device in a subcutaneous space under the subject's skin.

Example B62 includes the method of any of examples B49-B61 or any of examples B49-B65, further comprising determining a health and/or disease state of the subject.

Example B63 includes the method of example B62 or any of examples B49-B65, wherein the determining the health and/or disease state of the subject comprises processing the electrical signal indicative of the physiological into an individual data set associated with the subject, and comparing the individual data set of the subject with a standard reference data set of a population of subjects to identify the health and/or disease state.

Example B64 includes the method of example B63 or any of examples B49-B65, wherein the comparing includes correlating at least a portion of the individual data set with at least a portion of the standard reference data set and identifying one or more classifications of the health and/or disease state based on the correlating.

Example B65 includes the method of any of examples B49-B64 or any of examples B49-B65, wherein the implantable medical device is the implantable medical device of any of examples B1-B47 or of any of examples A1-A35 or of any of examples A62-A101.

In some embodiments in accordance with the present technology (example B66), a method for assessing a clinical condition of a patient having a beating heart, where the clinical condition is pulmonary arterial pressure (PAP) includes (a) detecting electrocardiogram (ECG) data generated by the beating heart while simultaneously (b) detecting mechanical pressure wave data generated by the beating heart, (i) the detecting ECG data and the detecting mechanical pressure wave data occurring simultaneously while the heart proceeds through an aortic (A2) and a pulmonary (P2) component of a second heart sound (S2) of a heartbeat, (ii) wherein the mechanical pressure wave and the ECG data are obtained simultaneously by a single implantable medical device comprising a physical stress sensor and an electrophysiological sensor comprising an ECG sensor; (c) optionally, analyzing the ECG data to identify a time point when the beating heart is in an S2 region of the heartbeat; (d) optionally, analyzing the ECG data to identify a time point when A2 and a time point when P2 are taking place in an S2 region; (e) optionally, determining a A2-P2 splitting interval (S1), where S1 is a time interval between the time point of A2 and the time point of P2 of a heartbeat, where the time interval is normalized to the heart rate; (f) optionally, calculating a pulmonary arterial pressure (PAP) based on the determined S1.

Conclusion

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

The present technology may be understood more readily by reference to the following detailed description of preferred embodiments of the invention and the Examples included herein. In reading this detailed description, and unless otherwise explained, all technical and scientific terms used herein have the same meaning as commonly understood by one of ordinary skill in the art to which this disclosure belongs. The singular terms "a," "an," and "the" may include plural referents unless context clearly indicates otherwise. Similarly, the word "or" may include "and/or" unless the context clearly indicates otherwise. The term "comprises" means "includes." The abbreviation, "e.g." is derived from the Latin exempli gratia and is used herein to indicate a non-limiting example. Thus, the abbreviation "e.g." is synonymous with the term "for example."

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements, and variations can be made based on what is described and illustrated in this patent document.

What is claimed is:

1. An implantable medical device for monitoring mechanical stress from within a host, comprising:
    a hermetically sealed housing; and
    a physical stress sensor encased within the housing and configured to receive an internal mechanical energy signal that emanates from within the host from an internal body structure and to transduce the received internal mechanical energy signal to an electrical signal indicative of a physiological function by the internal body structure,
    wherein the physical stress sensor is a unimorph piezoelectric sensor having a rigid unimorph piezoelectric structure that does not deflect greater than 10 nm when exposed to the internal mechanical energy signal, the rigid unimorph piezoelectric structure comprising a piezoelectric transducer coupled to a biocompatible stress absorption material and to an electrode, wherein the biocompatible stress absorption material is operable to receive the internal mechanical energy signal for the unimorph piezoelectric sensor and transfer the internal mechanical energy signal to the piezoelectric transducer, and wherein the electrode is operable to receive the electrical signal transduced by the piezoelectric transducer.

2. The device of claim 1, wherein the rigid unimorph piezoelectric structure includes a thickness in a range of 300 µm to 750 µm.

3. The device of claim 2, wherein the piezoelectric transducer includes lead zirconate titanate (PZT), the biocompatible stress absorption material includes titanium, and the electrode includes one or more of titanium, gold, platinum, silver, copper, nickel, aluminum, palladium, or combination thereof.

4. The device of claim 1, wherein the biocompatible stress absorption material constitutes a portion of the hermetically sealed housing.

5. The device of claim 1, wherein the unimorph piezoelectric sensor comprises:
    a piezoelectric material layer operable as the piezoelectric transducer;
    a first layer coupled to a first side of the piezoelectric material layer and configured in the hermetically sealed housing to face outward of the implantable medical device, the first layer comprising a biocompatible, electrically conductive, non-piezoelectric material having a Young's modulus within 2×-3× of a Young's modulus of the piezoelectric material layer, wherein the first layer is operable as the biocompatible stress absorption material; and
    a second layer coupled to a second side of the piezoelectric material layer opposite the first side, the second layer comprising an electrically conductive, non-piezoelectric material, wherein the second layer is operable as the electrode,
    wherein the first layer is configured to receive an applied force caused from the internal mechanical energy signal emanated from the internal body structure within the host, such that stress caused by the applied force on the biocompatible, electrically conductive, non-piezoelectric material is transferred through the first layer and into the piezoelectric material to transduce the stress into electrical energy corresponding to the electrical signal indicative of the physiological function by the internal body structure,
    wherein the first layer and the second layer are electrically addressable to detect the electrical signal by an electrical circuit.

6. The device of claim 5, wherein the second layer of the unimorph piezoelectric sensor is configured to have a length or a diameter that is equal to the length or the diameter of the piezoelectric material layer of the unimorph piezoelectric sensor.

7. The device of claim 1, wherein the unimorph piezoelectric sensor comprises:
    a piezoelectric material layer operable as the piezoelectric transducer;
    a first layer configured in the hermetically sealed housing to face outward of the implantable medical device, the first layer comprising a biocompatible, electrically insulative, non-piezoelectric material, wherein first layer is operable as the biocompatible stress absorption material;
    a second layer coupled to a first side of the piezoelectric material, the second layer comprising an electrically conductive, non-piezoelectric material, wherein second layer is operable as the electrode; and
    a third layer coupled to a second side of the piezoelectric material layer opposite the first side and coupled to a side of the first layer, the third layer comprising an electrically conductive, non-piezoelectric material, wherein the first layer is configured to receive an applied force caused from the internal mechanical energy signal emanated from the internal body structure within the host, such that stress caused by the applied force on the biocompatible, electrically insulative, non-piezoelectric material is transferred through the first layer and through the third layer and into the piezoelectric material to transduce the stress into electrical energy corresponding to the electrical signal indicative of the physiological function by the internal body structure, wherein the second layer and the third layer are electrically addressable to detect the electrical signal by an electrical circuit.

8. The device of claim 1, wherein the hermetically sealed housing includes titanium (Ti).

9. The device of claim 1, wherein the internal mechanical energy signal includes a transmission of mechanical energy that propagates in an in vivo medium including one or more of a gas, liquid, or solid, wherein:
the transmission of mechanical energy includes sound energy associated with one or both of blood flow in a blood vessel or a heart of the host and an airflow in an airway or a lung of the host, and wherein the physical stress sensor is operable to detect the sound energy at a distance of at least 0.5 cm from a source of the sound energy, and/or
the unimorph piezoelectric sensor is configured to detect the transmission of mechanical energy in a frequency range of 10 Hz to 1,000 Hz indicative of one or both of blood flow in a blood vessel or a heart of the host and an airflow in an airway or a lung of the host.

10. The device of claim 1, comprising:
an electronics unit in electrical communication with the physical stress sensor, wherein the electronics unit is in a hermetically sealed casing,
wherein the electronics unit comprises:
a power supply, and
a signal processing unit and a wireless communications unit configured to process electrical signals associated with the internal mechanical energy signal as data and wirelessly transmit the data to an external processor.

11. The device of claim 10, comprising:
at least one secondary sensor in communication with the electronics unit and operable to measure a secondary measurement in compilation with an internal mechanical energy signal measurement by the physical stress sensor, wherein the secondary measurement includes one or more of a biological parameter, a physiological parameter, an electrophysiological parameter, or a physical parameter of the host within which the implantable medical device is deployed.

12. The device of claim 11, wherein the at least one secondary sensor includes one or more of the following:
an inertial measurement unit (IMU) configured to detect motion of the implantable medical device in multiple degrees of freedom,
an electrophysiological sensor configured to detect an electrophysiological signal of an anatomic structure of the host, wherein the electrophysiological sensor includes an electrocardiogram (ECG) sensor,
a step counter comprising one or more of at least one accelerometer or at least one rotational rate sensor to detect a quantity of steps moved by the host over a period of time,
an analyte sensor configured to detect an analyte of a biological fluid of the host in a region where the implantable medical device is deployed,
a pH sensor configured to detect a pH level of a biological fluid of the host in a region where the implantable medical device is deployed,
a temperature sensor configured to detect temperature of a tissue structure or an area within the host in a region where the implantable medical device is deployed, or
an ultrasound sensor configured to detect one or more of a vascular blood flow, a vessel wall thickness, and/or a vessel diameter at a reference point in a cardiac cycle of the host or as a function of time during the cardiac cycle.

13. The device of claim 12, wherein the at least one secondary sensor includes (a) an electrophysiological sensor including an electrocardiogram (ECG) sensor, (b) an inertial measurement unit (IMU), and (c) a temperature sensor, and wherein the implantable medical device is configured to:
simultaneously detect (i) the internal mechanical energy signal detectable by the physical stress sensor and (ii) a plurality of secondary signals comprising (a) an electrophysiological energy signal associated with a physiological phenomenon of at least one internal body structure, from within the host, detectable by the ECG sensor, (b) a position, orientation, and/or a movement of the host detectable by the IMU, and (c) a core body temperature of the host detectable by the temperature sensor.

14. The device of claim 13, wherein the implantable medical device is configured to:
process the detected internal mechanical energy signal, the detected electrophysiological energy signal, the detected position, orientation, and/or a movement of the host, and the detected core body temperature of the host to produce biomedical data; and
use the biomedical data to determine a health and/or disease state of the host,
wherein position, orientation, and/or movement of the host detected by the IMU is used to determine whether the host is (1) awake and at rest, (2) undergoing activity, or (3) is sleeping.

15. A system for in vivo monitoring of internal mechanical energy associated with physiological phenomena originating from an anatomic structure, comprising:
the implantable medical device of any of claim 1; and
a data processing system, comprising a processor and a memory, in data communication with the implantable medical device and configured to receive the data from the implantable medical device and process the received data to determine an internal mechanical energy signal parameter associated with a physiological function of the anatomic structure.

* * * * *